United States Patent
Fujinami

(10) Patent No.: US 10,609,157 B2
(45) Date of Patent: Mar. 31, 2020

(54) COMMUNICATION APPARATUS, COMMUNICATION METHOD, AND PROGRAM

(71) Applicant: NEC Corporation, Tokyo (JP)

(72) Inventor: Makoto Fujinami, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 15/323,265

(22) PCT Filed: Jun. 29, 2015

(86) PCT No.: PCT/JP2015/003266
§ 371 (c)(1),
(2) Date: Dec. 30, 2016

(87) PCT Pub. No.: WO2016/002196
PCT Pub. Date: Jan. 7, 2016

(65) Prior Publication Data
US 2017/0134505 A1 May 11, 2017

(30) Foreign Application Priority Data
Jun. 30, 2014 (JP) .................. 2014-133616

(51) Int. Cl.
*H04L 29/08* (2006.01)
*H04L 12/931* (2013.01)
(Continued)

(52) U.S. Cl.
CPC ............ *H04L 67/148* (2013.01); *H04L 49/70* (2013.01); *H04L 67/141* (2013.01);
(Continued)

(58) Field of Classification Search
CPC ... H04L 67/148; H04L 67/143; H04L 67/141; H04L 49/70; H04L 12/4641; H04W 36/02; H04W 80/10
See application file for complete search history.

(56) References Cited

U.S. PATENT DOCUMENTS

2009/0063690 A1* 3/2009 Verthein ................. H04L 67/14
709/228
2010/0332657 A1 12/2010 Elyashev et al.
(Continued)

FOREIGN PATENT DOCUMENTS

CN 101835226 A 9/2010
CN 102497656 A 6/2012
(Continued)

OTHER PUBLICATIONS

International Search Report, Corresponding to PCT/JP2015/003266, dated Sep. 15, 2015, 1 page.
(Continued)

*Primary Examiner* — Soe Hlaing
(74) *Attorney, Agent, or Firm* — Wilmer Cutler Pickering Hale and Dorr LLP

(57) ABSTRACT

In a communication system, when a path is switched along with communication apparatus switchover, a packet sent/received via this path may be lost. A communication apparatus according to the present invention is characterized by including: a first means capable of operating a first network node on a virtual machine; and a second means capable of forwarding a control signal for terminating communication performed via a communication session established between the first network node and a third network node, to a virtual machine operating a second network node, in response to switchover from the first network node to the second network node corresponding to the first network node.

8 Claims, 42 Drawing Sheets

(51) Int. Cl.
*H04W 36/02* (2009.01)
*H04W 80/10* (2009.01)
*H04L 12/46* (2006.01)

(52) U.S. Cl.
CPC ........... *H04L 67/143* (2013.01); *H04W 36/02* (2013.01); *H04W 80/10* (2013.01); *H04L 12/4641* (2013.01)

(56) References Cited

U.S. PATENT DOCUMENTS

| | | | |
|---|---|---|---|
| 2011/0002292 A1* | 1/2011 | Wang | H04W 64/00 370/329 |
| 2011/0019647 A1* | 1/2011 | Fujino | H04W 36/0011 370/331 |
| 2013/0336286 A1 | 12/2013 | Anschutz | |
| 2014/0064249 A1 | 3/2014 | Lee et al. | |
| 2016/0044560 A1 | 2/2016 | Anschutz | |

FOREIGN PATENT DOCUMENTS

| | | | |
|---|---|---|---|
| JP | 10-23035 A | | 1/1998 |
| JP | 2004-248165 A | | 9/2004 |
| JP | 2004248165 A | * | 9/2004 |
| JP | 2005-210378 A | | 8/2005 |
| JP | 2006-025101 A | | 1/2006 |

OTHER PUBLICATIONS

3GPP TS23.401 V12.4.0 "Technical Specifcation Group Services and System Aspects; General Packet Radio Service (GPRS) Enhancement for Evolved Universal Terrestrial Radio Access Network," (E-UTRAN), Release 12, (Mar. 2014), 302 pp.

Extended European Search Report issued by the European Patent Office for European Application No. 15814451.9 dated Nov. 17, 2017 (10 pages).

Chinese Notification of First Office Action issued in Chinese Patent Application No. 201580042495.7, dated Jun. 27, 2019, 23 pages.

* cited by examiner

FIG. 41

MANAGEMENT DB 13

| BEARER ID | ATTRIBUTE |
|---|---|
| TEID: (A) | QCI: 9 AND IDLE STATE |
| TEID: (B) | |
| TEID: (C) | |
| TEID: (D) | MTC DEVICE GROUP: X |
| TEID: (E) | |
| TEID: (F) | |
| ... | ... |

FIG. 42

| BEARER ID | BEARER ID BIT MASK | |
|---|---|---|
| TEID: (A) | UPPER 24 BITS OF TEID: X | |
| TEID: (B) | | |
| TEID: (C) | | |
| TEID: (D) | UPPER 24 BITS OF TEID: Y | |
| TEID: (E) | | |
| TEID: (F) | | |
| ... | ... | |

MANAGEMENT DB 13

COMMUNICATION APPARATUS, COMMUNICATION METHOD, AND PROGRAM

TECHNICAL FIELD

The present invention relates to a communication system, a communication apparatus, a communication method, and a program.

The present application is a national stage application of International Application No. PCT/JP2015/003266 entitled "Communication Apparatus, Communication Method, and Program" filed on Jun. 29, 2015, which claims the benefit of priority from Japanese Patent Application No. 2014-133616, filed on Jun. 30, 2014, the disclosures of which are incorporated herein in their entirety by reference thereto.

BACKGROUND ART

In a mobile communication system, a communication terminal such as a mobile telephone can access the Internet by communicating with a base station and via a core network. The communication terminal performs communication via a path (e.g., a bearer) established between the communication terminal and an apparatus (e.g., a gateway) provided in the core network.

A technique for gateway relocation in a mobile communication system as described above is disclosed in Section 5.10.4 of NPL 1. Referring to figure 5.10.4-1 of NPL 1, the gateway via which data is forwarded is switched in response to gateway relocation.

Moreover, PTL 1 discloses a technique in which when the ATM connection is switched, both a rearrangement-source connection and a rearrangement-target connection are retained for a certain period of time, thereby preventing packet loss.

Further, PTL 2 discloses a technique in which in traffic migration between paths with different properties, initiation of the processing for migrating traffic to the migration-target path is triggered by completion of the configuration of the migration-target path, thereby preventing packet loss.

CITATION LIST

Patent Literature

[PTL 1]
Japanese Patent Application Unexamined Publication No. H10-023035
[PTL 2]
Japanese Patent Application Unexamined Publication No. 2006-025101

Non Patent Literature

[NPL 1]
3GPP TS23.401 V12.4.0 "Technical Specification Group Services and System Aspects; General Packet Radio Service (GPRS) enhancement for Evolved Universal Terrestrial Radio Access Network (E-UTRAN) Access", [retrieved on Apr. 8, 2014] Internet <http://www.3gpp.org/DynaReport/23401.htm>

SUMMARY

Technical Problem

According to the technique described in NPL 1, the path via which data is forwarded is switched in response to gateway relocation, as mentioned above. Here, when the path is switched, a packet sent/received via this path may be lost.

However, NPL 1 does not disclose any technique for preventing packet loss at the time of path switchover in association with gateway relocation.

Moreover, the technique described in PTL 1 discloses a technique for preventing packet loss when the ATM connection is switched, as mentioned above. However, PTL 1 does not disclose any technique for preventing packet loss at the time of switchover between ATM switches.

Further, the technique described in PTL 2 discloses a technique for preventing packet loss when a path is switched, as mentioned above. However, PTL 2 does not disclose any technique for preventing packet loss at the time of switchover between switching nodes.

An object of the present invention is to provide a technique that can solve the above-mentioned problems and can prevent packet loss at the time of path switchover along with communication apparatus switchover.

Solution to Problem

A communication apparatus of the present invention is a communication apparatus that processes data related to a terminal, and is characterized by including: a first means capable of operating a first network node on a virtual machine; and a second means capable of forwarding a control signal for terminating communication performed via a communication session established between the first network node and a third network node, to a virtual machine operating a second network node, in response to switchover from the first network node to the second network node corresponding to the first network node.

A communication apparatus of the present invention is a communication apparatus that processes data related to a terminal, characterized by comprising: a first means capable of establishing a first session between a first network node operated on a virtual machine and the communication apparatus; and a second means capable of sending control information indicating termination of the first session, in response to switchover from the first network node to a second network node having a function corresponding to the first network node.

A communication method of the present invention is characterized by including: operating a first network node on a virtual machine; and forwarding a control signal for terminating communication performed via a communication session established between the first network node and a third network node, to a virtual machine operating a second network node, in response to switchover from the first network node to the second network node corresponding to the first network node.

A communication method of the present invention is a communication apparatus that processes data related to a terminal, characterized by comprising: establishing a first session between a communication apparatus that processes data related to a terminal and a first network node operated on a virtual machine; and sending control information indicating termination of the first session, in response to switchover from the first network node to a second network node having a function corresponding to the first network node.

A program of the present invention is characterized by causing a computer to execute: processing for operating a first network node on a virtual machine; and processing for forwarding a control signal for terminating communication performed via a communication session established between the first network node and a third network node, to a virtual machine operating a second network node, in response to switchover from the first network node to the second network node corresponding to the first network node.

A program of the present invention is characterized by causing a computer to execute: processing for establishing a first session between a communication apparatus that processes data related to a terminal and a first network node operated on a virtual machine; and processing for sending control information indicating termination of the first session, in response to switchover from the first network node to a second network node having a function corresponding to the first network node.

Advantageous Effects of Invention

The present invention has the effect that packet loss can be prevented at the time of path switchover along with communication apparatus switchover.

BRIEF DESCRIPTION OF DRAWINGS

FIG. 41 is a diagram showing an example of the structure of information stored in a management DB 13 in the sixth exemplary embodiment.

FIG. 42 is a diagram showing another example of the structure of the information stored in the management DB 13 in the sixth exemplary embodiment.

DETAILED DESCRIPTION

Figure 1:
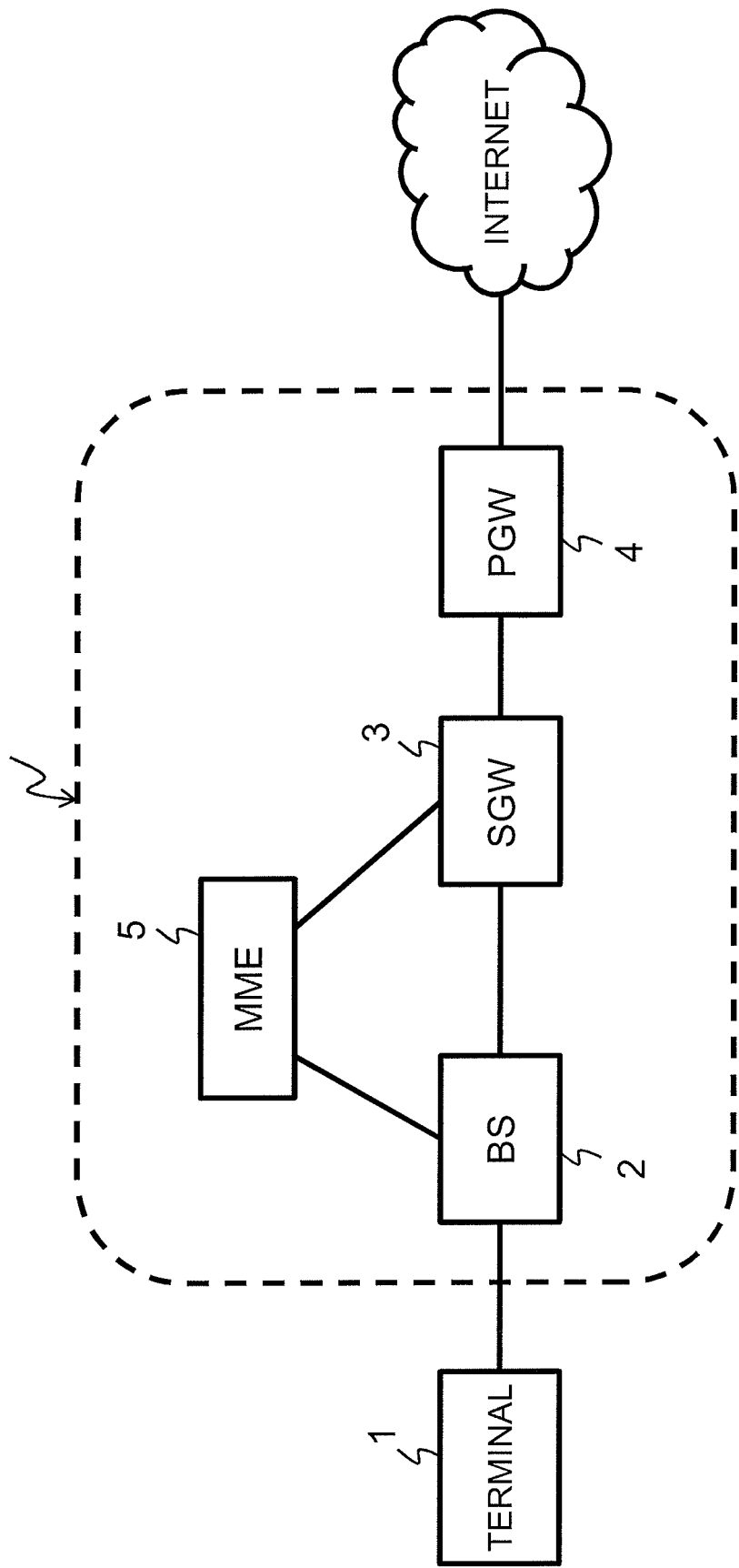
FIG. 1 is an architecture diagram showing an example of a system to which an embodiment of the present invention can be applied.

First, a description will be given of an outline of a communication system to which an embodiment of the present invention is applied, with reference to FIG. 1. Note that reference signs in the drawing mentioned in this outline are given to the elements as an example for convenience in order to facilitate understanding, and the description of this outline is not intended to impose any limitation.

The communication system illustrated in FIG. 1 illustrates LTE (Long Term Evolution). However, a communication system according to the present invention is not limited to the example shown in FIG. 1.

In the example of FIG. 1, the communication system includes a terminal 1 and a plurality of types of network nodes (hereinafter, one or more network nodes will be collectively referred to as "communication apparatus 10"). The terminal 1 communicates with an external network such as the Internet via the plurality of types of communication apparatuses 10.

The communication apparatus 10 is a network node such as, for example, a base station 2, an S-GW (Serving Gateway) 3, a P-GW (Packet Data Network Gateway) 4, and an MME (Mobility Management Entity) 5. Each network node performs various signal processing related to communication services provided by the communication system. For example, the MME 5 as a network node performs signal processing related to mobility management of the terminal 1.

The terminal 1 connects to the base station 2 and accesses the Internet or the like via a core network. The core network includes, for example, the S-GW 3, P-GW 4, and MME 5.

The network nodes in the example shown in FIG. 1 include, for example, the following network functions.

For example, the base station 2 has a function of performing data communication with the terminal 1 (U-Plane function) based on PDCP (Packet Data Convergence Protocol). Moreover, the base station 2 has a function of processing control signaling (C-Plane function).

For example, the S-GW 3 has a function of processing data packets (U-Plane function) and a function of processing control signaling (C-Plane function).

For example, the P-GW 4 has a function of processing data packets (U-Plane function), a function of managing charging status according to communication (PCEF: Policy and Charging Enforcement Function), a function of controlling policies such as QoS (PCRF: Policy and Charging Rule Function), a lawful interception (LI: Lawful Interception) function for intercepting communication, and the like.

For example, the MME 5 has a function of processing control signaling related to configuration and release of a session for communication, handover control, and the like (C-Plane function), a function of managing information on subscribers to the communication system in cooperation with an HSS (Home Subscriber Server), and the like.

1. FIRST EXEMPLARY EMBODIMENT

Hereinafter, a first exemplary embodiment of the present invention will be described with reference to FIGS. 2 to 4. Note that in each of the under-described exemplary embodiments, reference signs given in the drawings are given to the elements as an example for convenience in order to facilitate understanding, and the description of each exemplary embodiment is not intended to impose any limitation.

1.1) System Architecture

Figure 2:
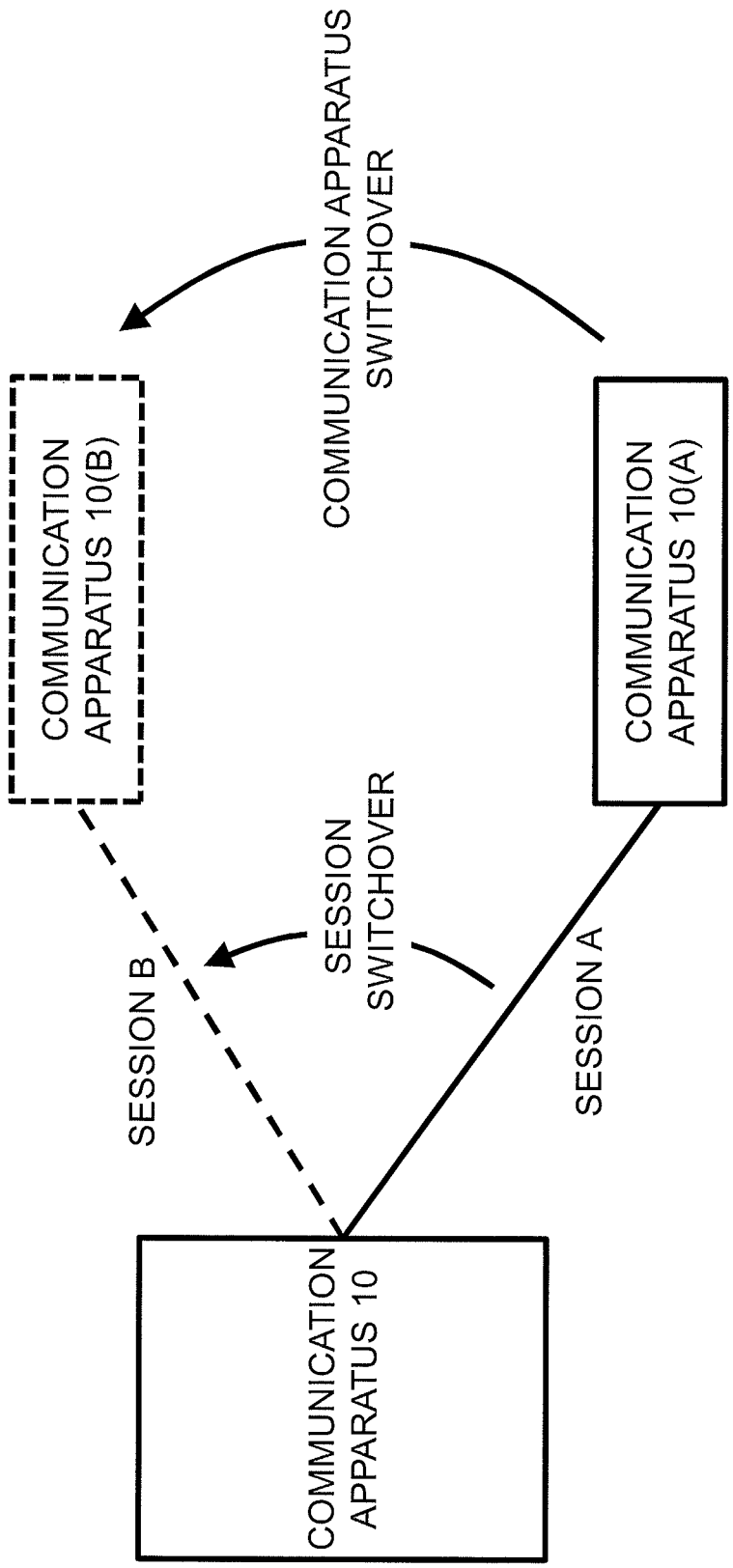
FIG. 2 is a schematic diagram showing an outline of session switchover operation in association with communication apparatus relocation in a communication system according to a first exemplary embodiment of the present invention.

FIG. 2 is a diagram for describing an example of the architecture of a communication system according to the first exemplary embodiment of the present invention and session switchover operation in association with communication apparatus relocation. In FIG. 2, communication apparatuses basically have the same configurations, which will be described later, but are distinguished by reference signs for convenience, like communication apparatuses 10, 10(A), and 10(B).

The example shown in FIG. 2 depicts a case where a communication apparatus 10(A) connected to a communication apparatus 10 is switched over to a communication apparatus 10(B). In response to the switchover from the communication apparatus 10(A) to the communication apparatus 10(B), the session with the communication apparatus 10 is also switched from a session A to a session B. In this case, packet loss may occur when the session is switched. For example, if the session is switched before the switchover-source session is terminated, a packet transmitted via the switchover-source session is not forwarded to the switchover-target communication apparatus, and as a result packet loss may occur.

Accordingly, in the present exemplary embodiment, the session is switched over in response to reception by the switchover-target communication apparatus 10(B) of a notice indicating that the switchover-source session A has been terminated. With this configuration, packet loss due to session switchover is avoided.

Figure 3:
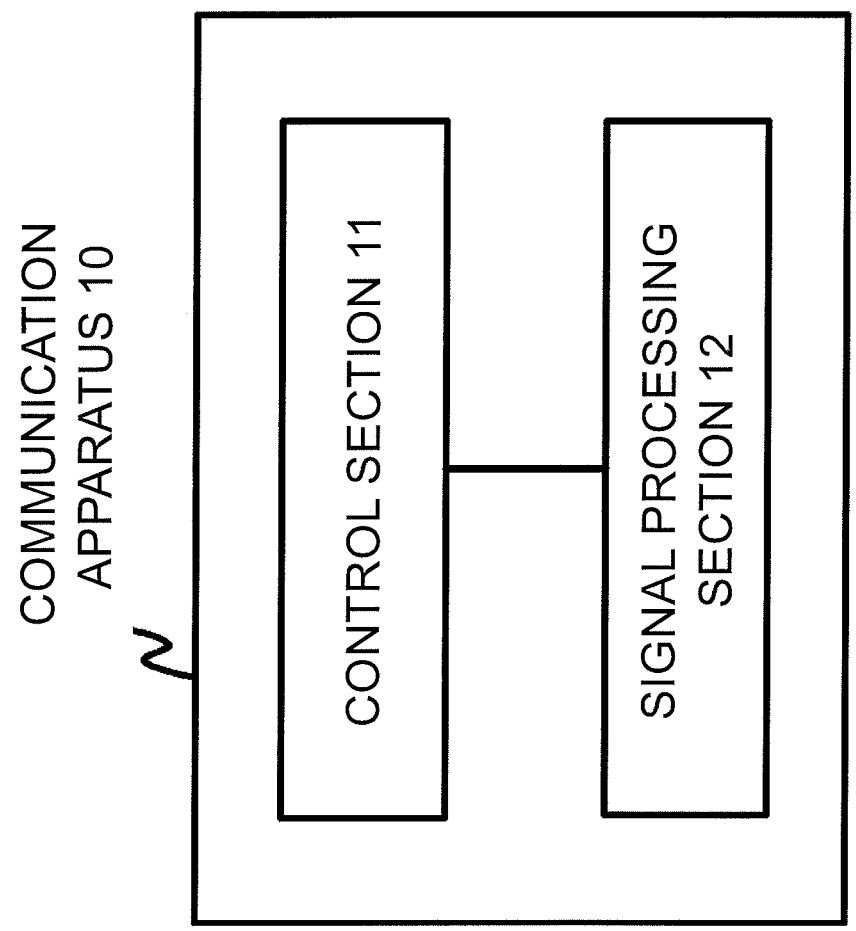
FIG. 3 is a block diagram showing an example of the configuration of a communication apparatus 10 according to the first exemplary embodiment.

Referring to FIG. 3, the communication apparatus 10 according to the present exemplary embodiment includes a control section 11 and a signal processing section 12. The control section 11 corresponds to so-called C-Plane and has a function of processing control signals transmitted in the communication system. The signal processing section 12 corresponds to so-called U-Plane and has a function of processing data transmitted in the communication system.

Note that the communication apparatus 10 does not necessarily include both the control section 11 and signal processing section 12, but may be provided with them. Moreover, the communication apparatus 10 may be any of the network nodes such as the base station 2, S-GW 3, P-GW4, and MME 5 shown in FIG. 1.

1.2) Operation

Figure 4:
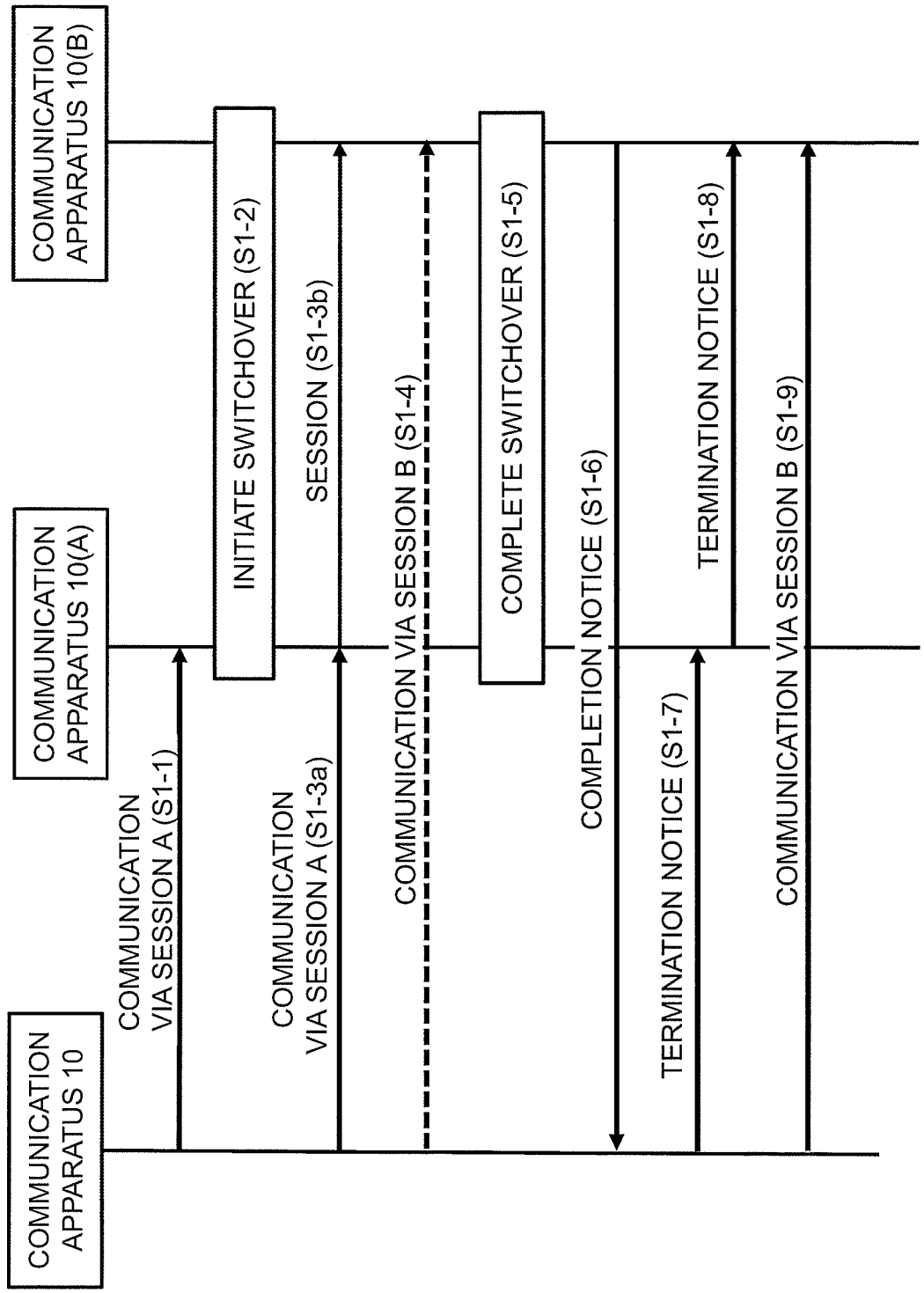
FIG. 4 is a sequence chart showing an example of operation in the communication system according to the first exemplary embodiment.

FIG. 4 is a sequence chart showing an example of operation in the communication system according to the first exemplary embodiment.

It is assumed that the signal processing section 12 of the communication apparatus 10 is performing communication with the communication apparatus 10(A) via the session A (Operation S1-1).

It is assumed that switchover from the communication apparatus 10(A) to the communication apparatus 10(B) is initiated during this communication (Operation S1-2). For example, the control section 11 of the communication apparatus 10(A) can initiate the switchover to the other communication apparatus 10(B), depending on the load on its own apparatus, or in response to occurrence of a failure in its own apparatus. Moreover, it is also possible that the control section 11 of the communication apparatus 10(B) initiates the switchover from the communication apparatus 10(A) to the communication apparatus 10(B) in response to a disconnection of heartbeat signals from the communication apparatus 10(A). Note that not limited to the above-mentioned examples, the switchover from the communication apparatus 10(A) to the communication apparatus 10(B) may be initiated in any cases such as a case where a request arises from the operator of the communication system or the like.

When the switchover from the communication apparatus 10(A) to the communication apparatus 10(B) is initiated, the signal processing section 12 of the communication apparatus 10 performs communication via the session A with the communication apparatus 10(A) and communication via the session B with the communication apparatus 10(B) (Operations S1-3a and S1-4). For example, the signal processing section 12 of the communication apparatus 10 sends the same data to each of the communication apparatuses 10(A) and 10(B) via the sessions A and B, respectively, and the signal processing section 12 of the communication apparatus 10(A) forwards the data received from the communication apparatus 10 to the communication apparatus 10(B) via a session newly established (Operation S1-3b).

In response to completion of the switchover from the communication apparatus 10(A) to the communication apparatus 10(B) (Operation S1-5), the control section 11 of the communication apparatus 10(B) notifies the communication apparatus 10 of the completion of this switchover (Operation S1-6).

In response to reception of the completion notice from the communication apparatus 10(B), the control section 11 of the communication apparatus 10 notifies the communication apparatus 10(A) of termination of the communication via the session A (Operation S1-7). For example, the control section 11 of the communication apparatus 10 may notify the session termination by controlling the signal processing section 12 to send a packet indicating the session termination to the communication apparatus 10(A). After sending the last packet to the communication apparatus 10(A), the signal processing section 12 subsequently sends an end marker packet (a termination notice packet) indicating the termination of packet forwarding. The communication apparatus 10(A) recognizes the termination of the communication via the session A by receiving the end marker packet.

In response to reception of the termination notice from the communication apparatus 10, the control section 11 of the communication apparatus 10(A) notifies the communication apparatus 10(B) of the termination of the communication via the session A (Operation S1-8). Alternatively, it is also possible that the signal processing section 12 of the communication apparatus 10(A) forwards the received end marker packet to the switchover-target communication apparatus 10(B), thereby notifying the termination of the communication via the switchover-source session.

In response to reception of the termination notice from the communication apparatus 10(A), the control section 11 of the communication apparatus 10(B) controls the signal processing section 12 to shift an operation mode for receiving packets via the sessions A and B to an operation mode for receiving packets via only the session B, thus performing communication via the session B (Operation S1-9).

1.3) Effects

As described above, according to the first exemplary embodiment of the present invention, the switchover-target communication apparatus 10(B), in response to reception of the notice of termination of the communication via the switchover-source session A, switches the session with the communication apparatus 10 to the session B. This allows the communication apparatus 10(B) to receive packets sent from the communication apparatus 10 without any loss even when the session is switched with switching over from the communication apparatus 10(A) to the communication apparatus 10(B). Accordingly, according to the first exemplary embodiment, packet loss can be prevented at the time of path switchover caused by communication apparatus switchover.

2. SECOND EXEMPLARY EMBODIMENT

A second exemplary embodiment of the present invention will be described with reference to drawings. The technique according to the second exemplary embodiment can be also applied to the above-described first exemplary embodiment and any of the techniques according to the under-described embodiments.

In the second exemplary embodiment of the present invention, the respective network functions provided by the plurality of types of communication apparatuses 10 illustrated in FIG. 1 (base station 2, S-GW 3, P-GW 4, and MME 5) are implemented by using software on virtual machines.

It is expected that longer time is required to switch over from a virtual machine in operation to another virtual machine than to switch over between hardware communication equipment. Accordingly, in the case where the network functions provided by the communication apparatuses 10 are implemented by using software on virtual machines, it is anticipated that packet loss is more likely to occur at the time of path switchover along with virtual machine switchover. For example, packet loss may occur if a path is switched without considering the timing of completion of virtual machine switchover.

Accordingly, in the second exemplary embodiment, termination of the switchover-source session is notified to the switchover-target virtual machine, whereby session switchover is executed. In this manner, a notice of termination of the switchover-source session triggers execution of session switchover, resulting in packet loss avoidance.

The network functions executed on virtual machines are, for example, network functions related to signal processing performed by the network nodes shown in FIG. 1 (base station 2, S-GW 3, P-GW 4, and/or MME 5). The network nodes perform signal processing as described above, for example, in order for the communication system to provide services such as data communication to users.

2.1) Server Configuration (First Example)

Figure 5:
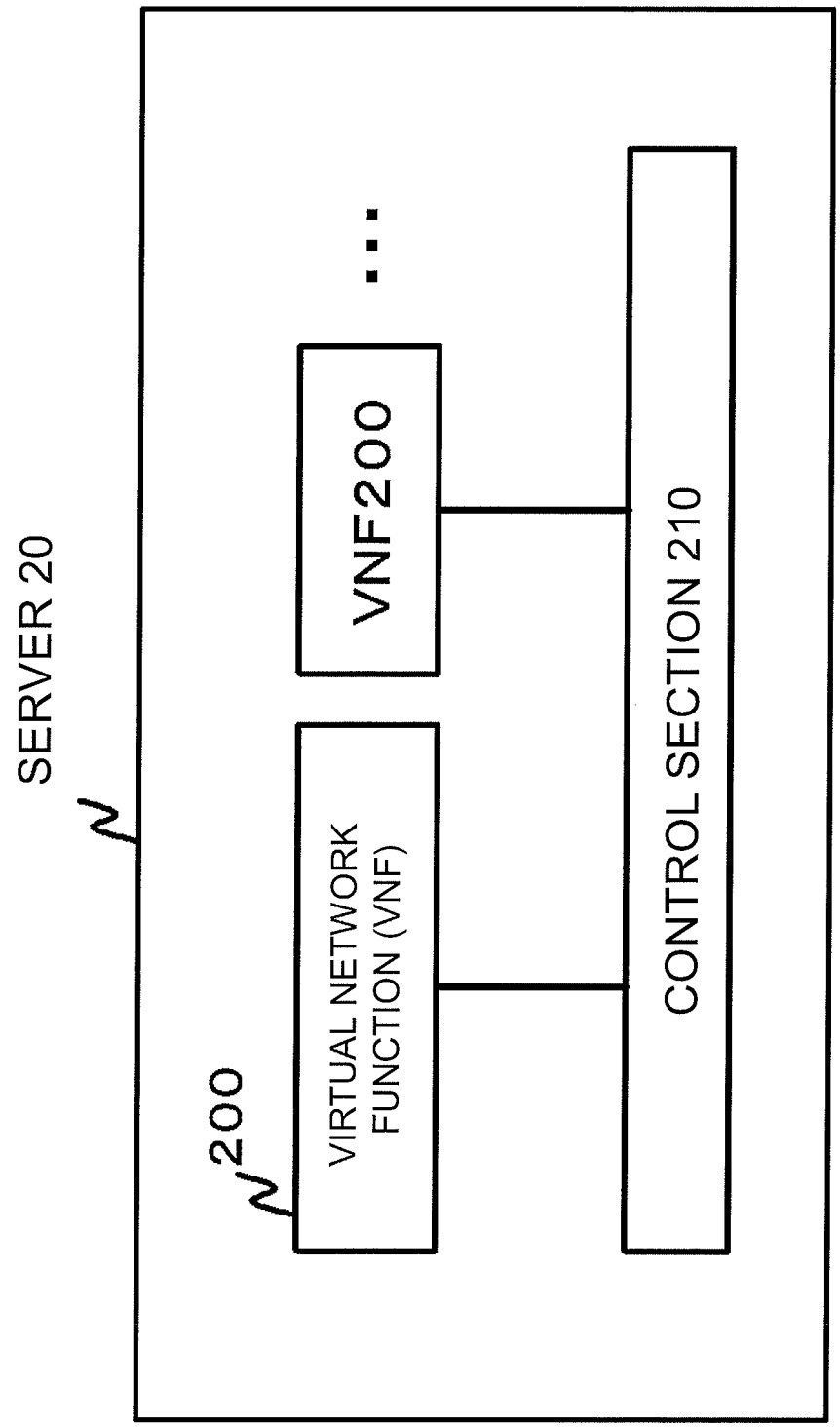
FIG. 5 is a block diagram showing a first example of the functional configuration of a server 20 that virtualizes communication apparatuses 10, according to a second exemplary embodiment of the present invention.

FIG. 5 shows an example of the configuration of a server 20 that virtualizes communication apparatuses 10, according to the second exemplary embodiment. For example, the server 20 includes a control section 210 and virtual network functions (VNF: Virtual Network Function) 200. Note that an apparatus that virtualizes communication apparatuses 10 is not limited to the server 20 but may be, for example, a router or the like.

The control section 210 can operate the network functions executed by the communication apparatuses 10 as the VNFs 200 on virtual machines. For example, the VNFs 200 can operate as virtual communication apparatuses 10 (virtual eNB, virtual MME, virtual S-GW, virtual P-GW, and the like). Note that the network functions are, for example, the functions of the individual network nodes in the example of FIG. 1 (base station 2, S-GW 3, P-GW 4, and MME 5). However, functions the control section 210 can operate on virtual machines are not limited to these examples.

For example, the base station (eNB) 2 can be executed by software such as virtual machine. For example, the control section 210 can operate the function of the base station (eNB) 2 as a VNF 200 on a virtual machine.

The base station (eNB) 2 may be separated into a function of performing digital baseband signal processing (a baseband processing section: BBH) and a function of performing analog radio frequency (RF) signal processing (a radio section: RRH).

The RRH is in charge of analog RF signal processing and provides an air interface to a mobile station. The analog RF signal processing includes D/A conversion, A/D conversion, frequency up-conversion, frequency down-conversion, amplification, and the like.

The BBU is connected to a higher-order network (e.g., a backhaul network or core network of a carrier) and performs the controlling and monitoring of a radio base station and digital baseband signal processing. The digital baseband signal processing includes layer-2 signal processing and layer-1 (physical layer) signal processing. The layer-2 signal processing includes at least one of (i) data compression/decompression, (ii) data encryption, (iii) addition/deletion of a layer-2 header, (iv) data segmentation/concatenation, and (v) generation/breakdown of a forwarding format through data multiplexing/demultiplexing. In case of E-UTRA as one of concrete examples, the layer-2 signal processing includes Radio Link Control (RLC) and Media Access Control (MAC) processing. The physical layer signal processing includes channel coding/decoding, modulation/demodulation, spreading/de-spreading, resource mapping, generation of OFDM symbol data (a baseband OFDM signal) through Inverse Fast Fourier Transform (IFFT), and the like.

The functions executed by the BBU can be executed by software such as virtual machine. For example, the control section 210 can operate the function provided by the BBU as a VNF 200 on a virtual machine.

Figure 6:
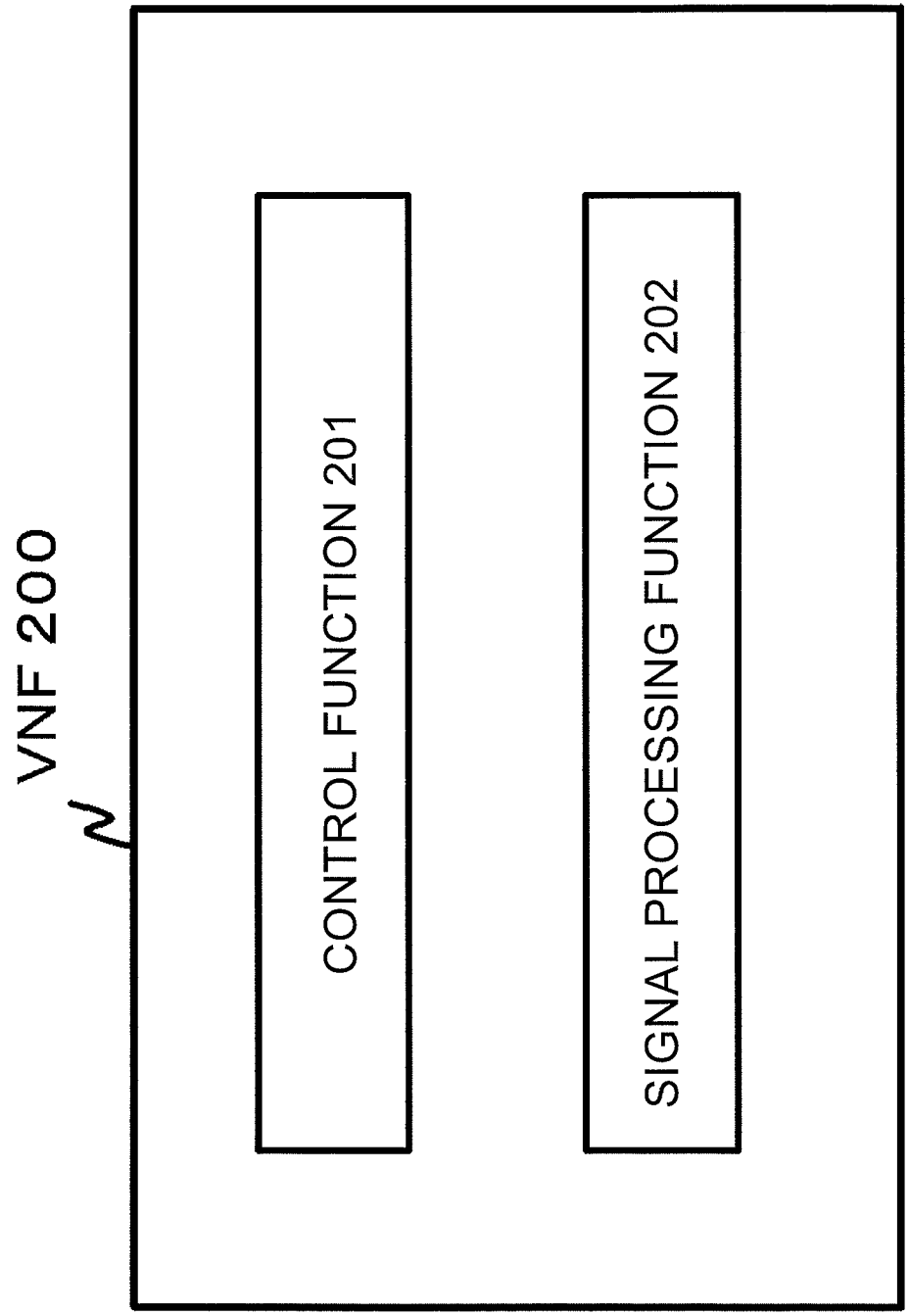
FIG. 6 is a block diagram showing an example of the functional configuration of a VNF 200 in the second exemplary embodiment.

FIG. 6 shows an example of the configuration of the VNF 200 according to the second exemplary embodiment. For example, the VNF 200 includes a control function 201 and a signal processing function 202. The control function 201 and signal processing function 202 have functions equivalent to the control section 11 and signal processing section 12 of the communication apparatus 10, respectively.

The control function 201 corresponds to so-called C-Plane and has a function of processing control signals transmitted in the communication system. The signal processing function 202 corresponds to so-called U-Plane and has a function of processing data transmitted in the communication system.

The control section 210 of the server 20 may be configured by using control software that is capable of computer virtualization such as, for example, hypervisor.

The control section 210 is capable of forwarding a received signal to a VNF 200 and causing the VNF 200 to perform signal processing corresponding to the function of the VNF 200. The signal is communication data (a packet and the like) sent/received via a bearer, a message sent/received by a network node, and the like.

Figure 7:
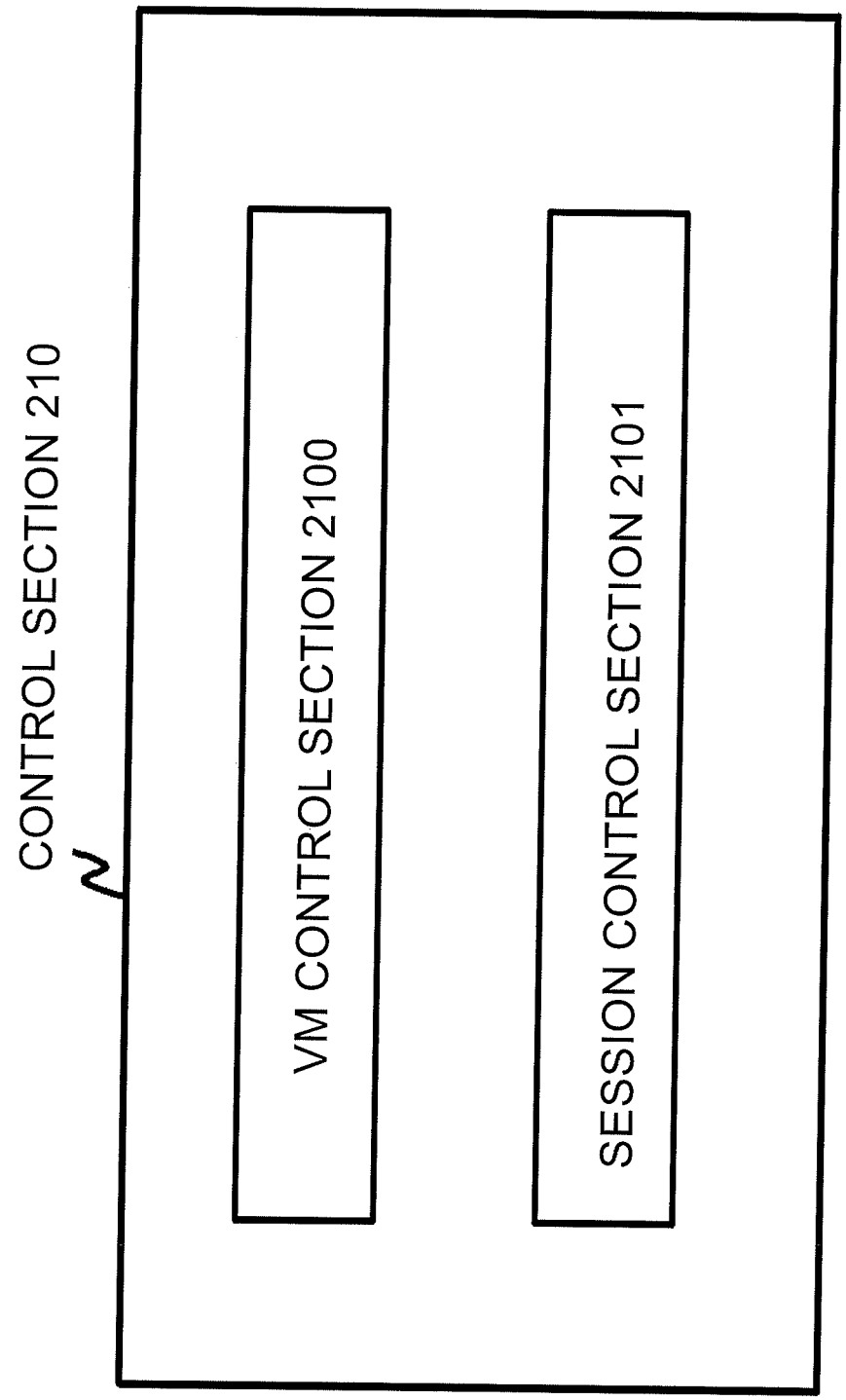
FIG. 7 is a block diagram showing an example of the functional configuration of a control section 210 in the second exemplary embodiment.

FIG. 7 shows an example of the configuration of the control section 210 in the second exemplary embodiment. For example, the control section 210 includes a VM (Virtual Machine) control section 2100 and a session control section 2101.

The VM control section 2100 controls a virtual machine for operating a VNF 200 that corresponds to signal processing performed by a network node. For example, the VM control section 2100 can perform at least one of activation, deletion, and deactivation of a virtual machine. Moreover, for example, the VM control section 2100 can also migrate a virtual machine in operation to another virtual machine. The VM control section 2100 can also control VM machine activation, deactivation, migration, and the like, depending on the status of the communication system. For example, the VM control section 2100 dynamically performs VM machine activation, deactivation, migration, and the like, depending on a communication volume in the communication system, the congestion status thereof, the load on the server 20, or the like.

The VM control section 2100 switches over a virtual machine that is executing a VNF 200 to another virtual machine, for example, in response to an instruction from the control function 201 of the VNF 200. Moreover, for example, the VM control section 2100 can instruct the control function 201 of a VNF 200 to start virtual machine switchover. The VM control section 2100 instructs the control function 201 of the VNF 200 about virtual machine switchover, for example, depending on the load on the virtual machine that is executing the VNF 200. Moreover, for example, the VM control section 2100 may instruct the control function 201 of the VNF 200 about virtual machine switchover in response to occurrence of a failure in the virtual machine in operation. Moreover, for example, the VM control section 2100 may instruct the control function 201 of the VNF 200 about virtual machine switchover in response to a disconnection of heartbeat signals from the virtual machine in operation. Note that not limited to the above-mentioned examples, virtual machine switchover may be initiated in any cases such as a case where a request arises from the operator of the communication system or the like.

The session control section 2101 can forward a received signal to a VNF 200 corresponding to this signal. Moreover, the session control section 2101 can forward a signal issued by a VNF 200 to a destination corresponding to this signal.

2.2) Server Configuration (Second Example)

Figure 8:
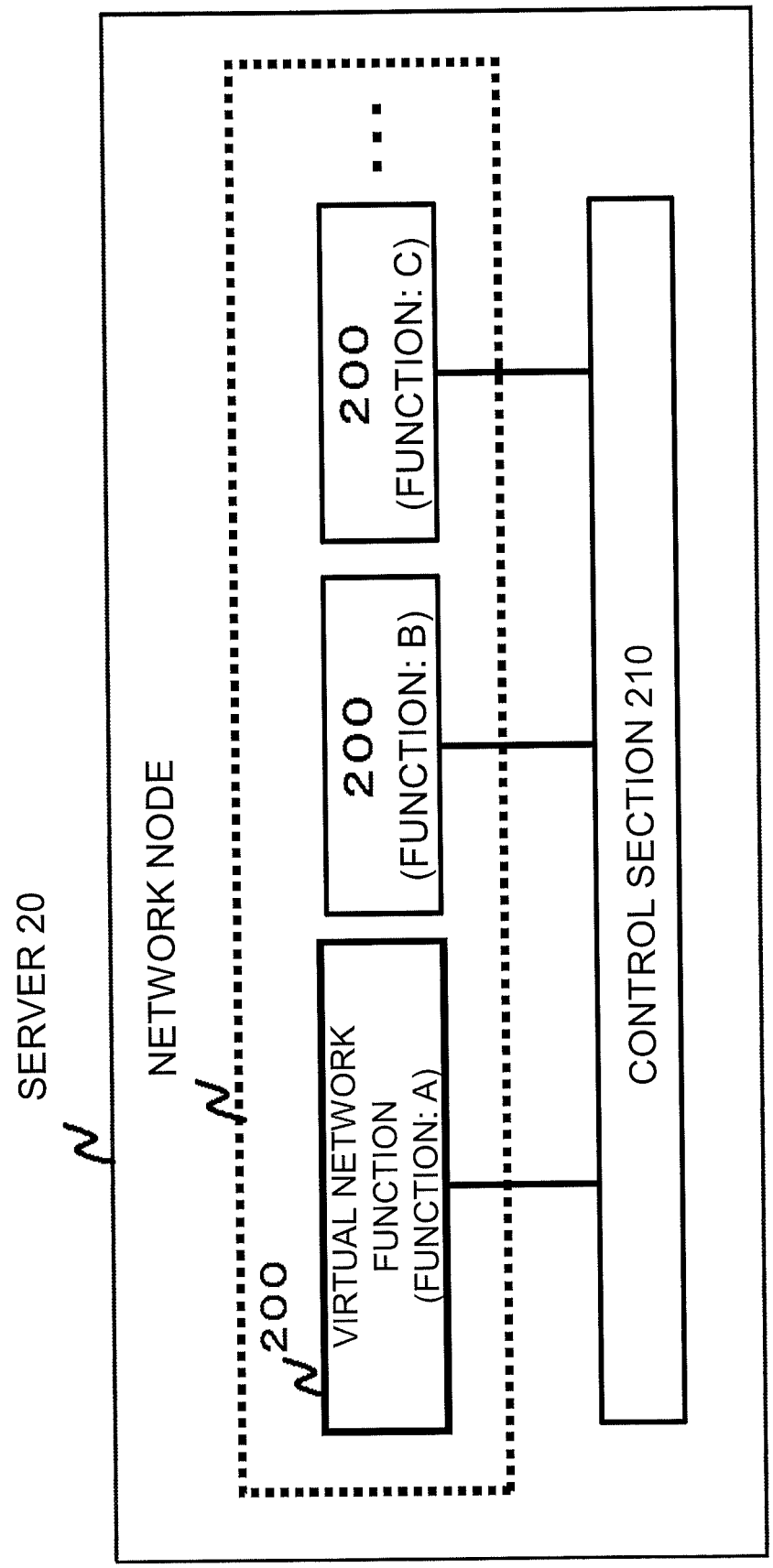
FIG. 8 is a block diagram showing a second example of the functional configuration of the server 20 that virtualizes a communication apparatus 10, according to the second exemplary embodiment.

FIG. 8 shows another example of the configuration of the server 20 that virtualizes a communication apparatus 10, according to the second exemplary embodiment. The control section 210 can execute each of a plurality of sub-functions on a corresponding one of a plurality of virtual machines, as illustrated in FIG. 8. These plurality of sub-functions are, for example, functions A, B, and C in FIG. 8 and correspond to the individual network functions of a network node illustrated in FIG. 1. The control section 210 operates a virtual machine for executing a VNF 200 corresponding to each sub-function, as illustrated in FIG. 8.

Examples of the sub-functions corresponding to the network functions of each network node are listed below.

Sub-functions of P-GW:
  Function of processing packets (User-Plane function)
  Function of managing charging status according to communication (PCEF: Policy and Charging Enforcement Function)
  Function of controlling policies such as QoS (PCRF: Policy and Charging Rule Function)
  Lawful interception (LI: Lawful Interception) function for intercepting communication Sub-functions of S-GW:
  Function of processing packets (User-Plane function)
  Function of processing control signaling (C-Plane function)

Sub-functions of MME 5:
  Function of processing control signaling (C-Plane function): e.g., configuration/release of a session for communication, handover control, and the like
  Function of managing information on subscribers to the communication system in liaison with HSS (Home Subscriber Server)

Sub-functions of base station 2:
  Function of performing digital baseband signal processing
  Function of performing analog radio frequency (RF) signal processing The control section 210 can operate a virtual machine for executing a VNF 200, for each of the above-mentioned sub-functions.

2.3) Server Configuration (Third Example)

Figure 9:
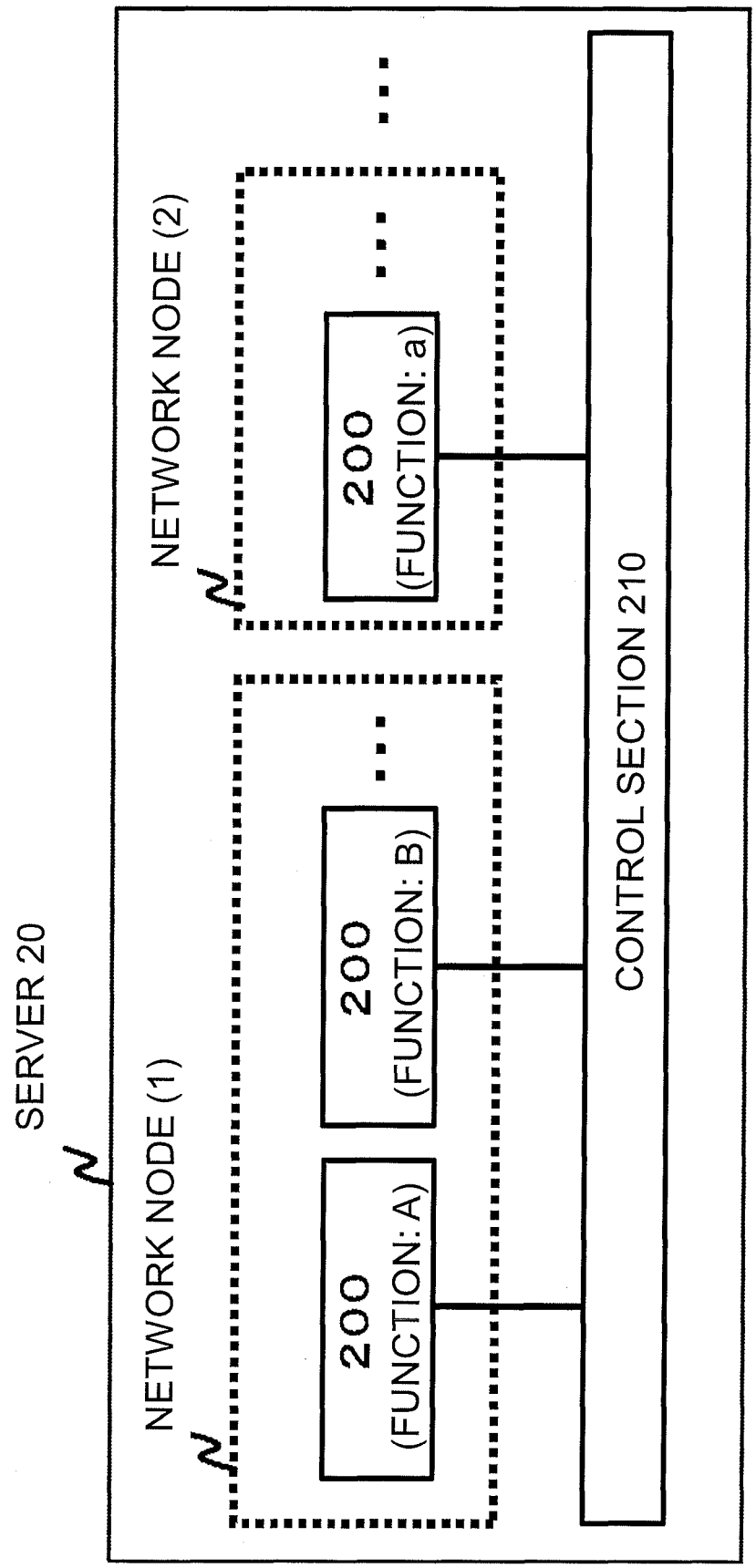
FIG. 9 is a block diagram showing a third example of the functional configuration of the server 20 that virtualizes communication apparatuses 10, according to the second exemplary embodiment.

FIG. 9 shows another example of the configuration of the server 20 that virtualizes communication apparatuses 10, according to the second exemplary embodiment. The control section 210 can also operate a plurality of types of network entities (network nodes (1) and (2) in FIG. 9) on virtual machines, as illustrated in FIG. 9.

Moreover, the VNFs 200 may be deployed separately among a plurality of servers 20. For example, in the example of FIG. 8 or 9, it is possible that the VNFs 200 corresponding to the functions "A" and "B", respectively, are deployed on a server 20(1), and the VNF 200 corresponding to the function "C" is deployed on a server 20(2).

2.4) Server Configuration (Fourth Example)

Figure 10:
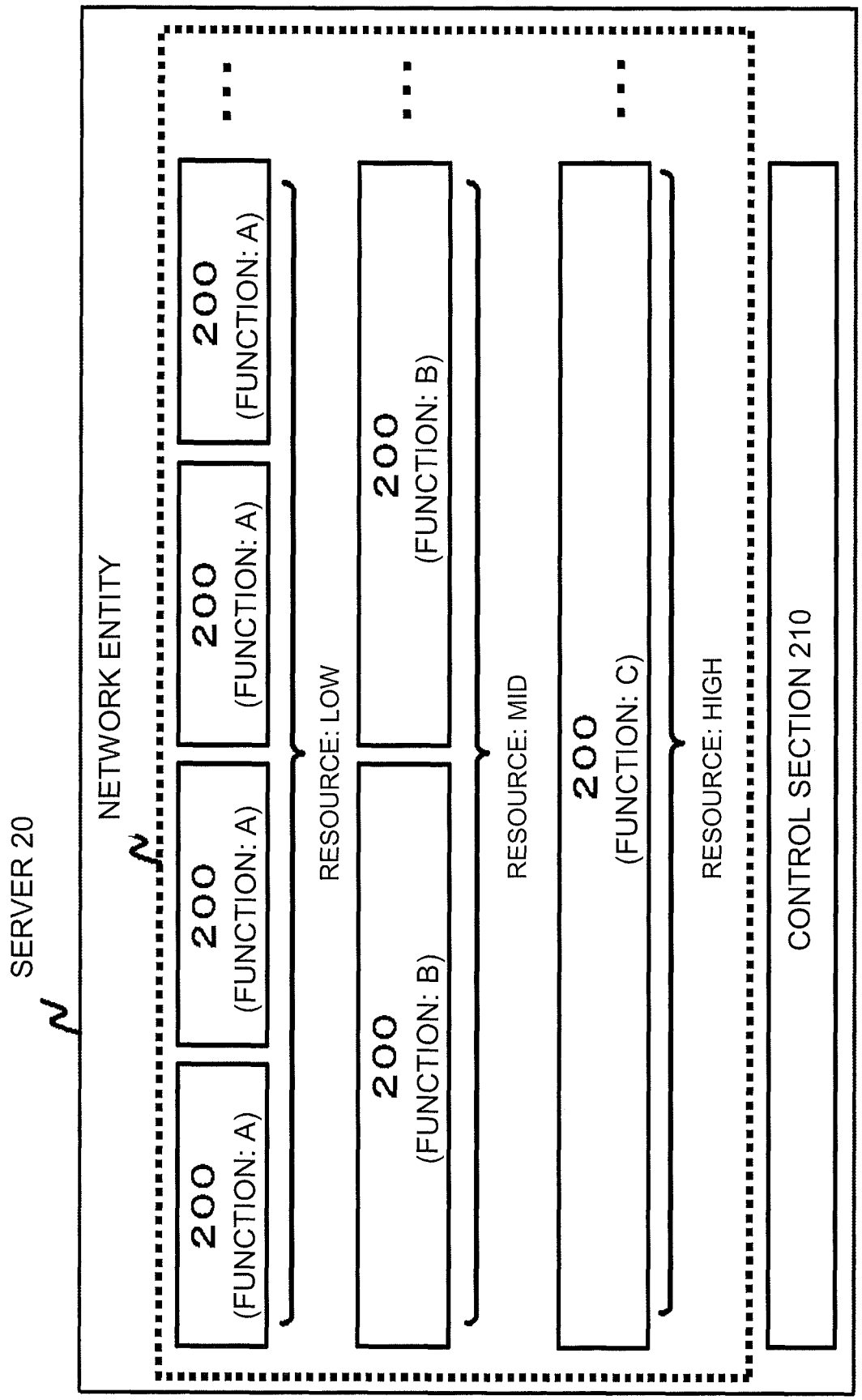
FIG. 10 is a block diagram showing a fourth example of the functional configuration of the server 20 that virtualizes a communication apparatus 10, according to the second exemplary embodiment.

FIG. 10 shows another example of the configuration of the server 20 that virtualizes a communication apparatus 10, according to the second exemplary embodiment.

The VM control section 2100 of the control section 210 can control computing resources to allocate to a virtual machine corresponding to a VNF 200, depending on the function provided by the VNF 200. In the example of FIG. 10, the VM control section 2100 changes the proportions of computing resources to allocate to the VNFs 200, depending on the respective functions (functions "A", "B", "C") provided by the VNFs 200. In the example of FIG. 10, the VM control section 2100 controls the amount of resources ("LAW", "MID", "HIGH") to allocate to each VNF 200, depending on the function of the VNF 200.

Some communication apparatuses 10 include a function that requires management of communication status changing in response to signal processing. As an example of such functions, the MME 5 includes a function of managing the context of a bearer. For example, the bearer context is described in Section 5.7 and others of a document (TS23.401 V12.3.0) with respect to technical specifications related to radio communication (3GPP: 3rd Generation Partnership Project). Moreover, as another example, the P-GW 4 includes a function of management of charging depending on the amount of communication.

In case a VNF 200 manages communication status, the VM control section 2100, for example, when migrating this VNF 200 onto another virtual machine, migrates the VNF 200 inclusive of the communication status thereof to the another virtual machine. The larger amount of information the communication status has, the longer time it takes to migrate the communication status, and it is therefore anticipated that the performance of a communication service related to the VNF 200 under migration is lowered. Accordingly, for example, if a VNF 200 provides a function of managing communication status, execution of scale-out, such as installation or migration, of such a VNF 200 is suppressed, which can suppress the lowered performance of a communication service.

The VM control section 2100 can allocate more resources than the amount of resources that is set based on a performance requirement or the like, to a VNF 200 including the communication status management function. That is, the VM control section 2100 allocates redundant resources to the VNF 200, whereby VNF scale-out such as installation or migration can be suppressed, and lowering of performance as described above can be avoided. The VM control section 2100 can control the amount of resources to allocate to a VNF 200, based on the frequency of updating communication status by the VNF 200. For example, the VM control section 2100 may allocate redundant resources to a VNF 200 that provides a function with a high frequency of updating communication status (e.g., PCEF of the P-GW 4 or the like).

2.5) Server Configuration (Fifth Example)

Figure 11:
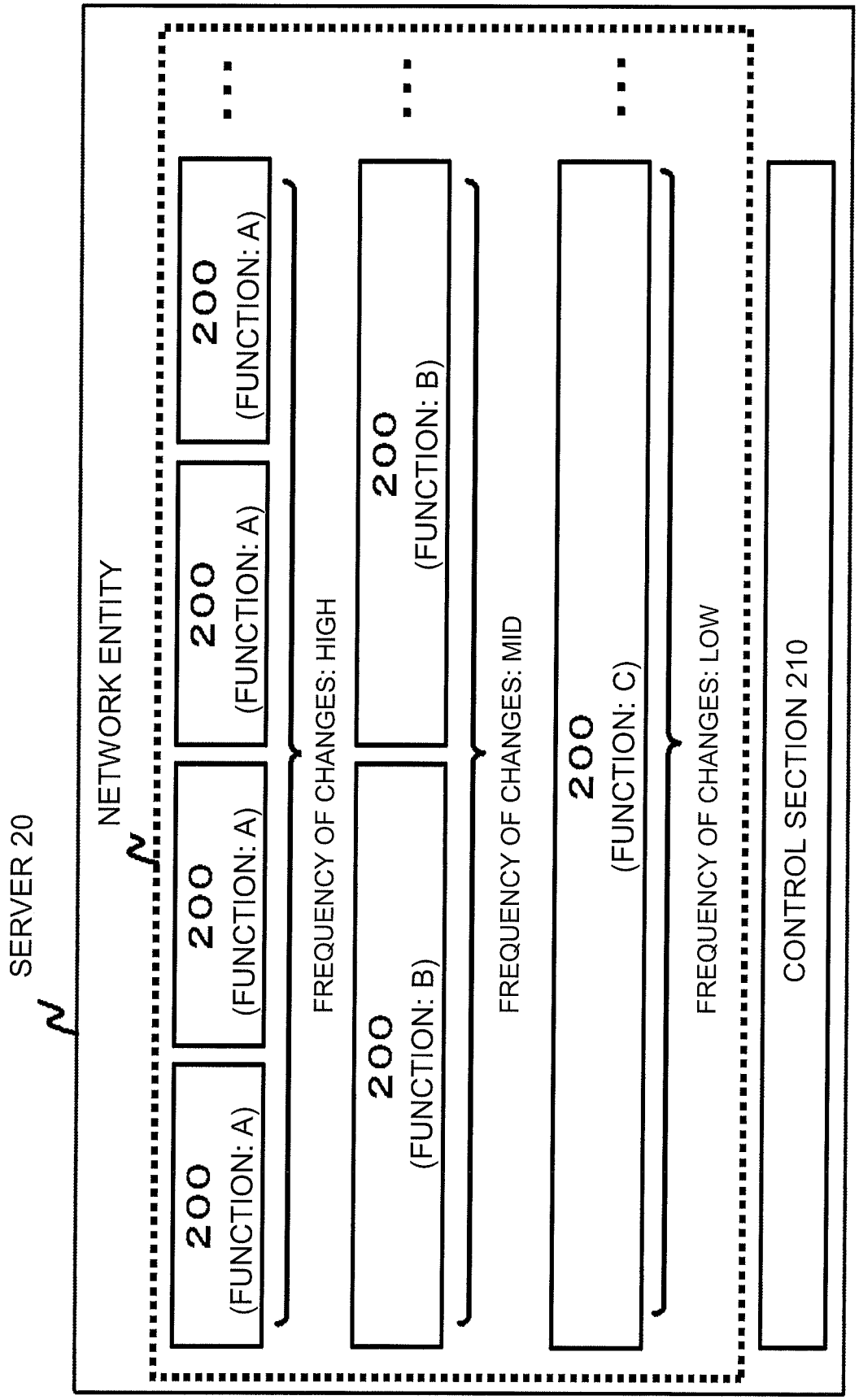
FIG. 11 is a block diagram showing a fifth example of the functional configuration of the server 20 that virtualizes a communication apparatus 10, according to the second exemplary embodiment.

FIG. 11 shows another example of the configuration of the server 20 that virtualizes a communication apparatus 10, according to the second exemplary embodiment.

In the example of FIG. 11, the VM control section 2100 can control the frequency of dynamic scaling (hereinafter, the frequency of changes) such as installation and migration of a VNF 200, depending on the function of the VNF 200. Installation or migration of a VNF 200 is performed, for example, depending on the load status of the communication system or a virtual machine or the like. The VM control section 2100 controls the frequency of VNF changes, for example, by adjusting a load status threshold for performing installation or migration of a VNF 200.

For example, the VM control section 2100 controls the frequency of VNF changes, depending on the presence/absence of the communication status management function or the frequency of updating communication status. For example, when a VNF 200 includes a function that frequently updates communication status (e.g., PCEF), the VM control section 2100 sets the frequency of changes of such a VNF 200 lower than the frequency of changes that is set based on a performance requirement or the like. Moreover, for example, when a VNF 200 includes a function with a low frequency of updating communication status (e.g., U-Plane function), the VM control section 2100 sets the frequency of changes of such a VNF 200 higher than the frequency of changes that is set based on a performance requirement or the like. Note that in case a VNF 200 includes a function with a low frequency of updating communication status, the VM control section 2100 may set the frequency of changes of such a VNF 200 at the same level as the frequency of changes that is set based on a performance requirement or the like.

The frequency of VNF changes is controlled as in the example shown in FIG. 11, whereby lowering of performance due to scale-out of a VNF 200 is prevented.

2.6) Operation

Figure 12:
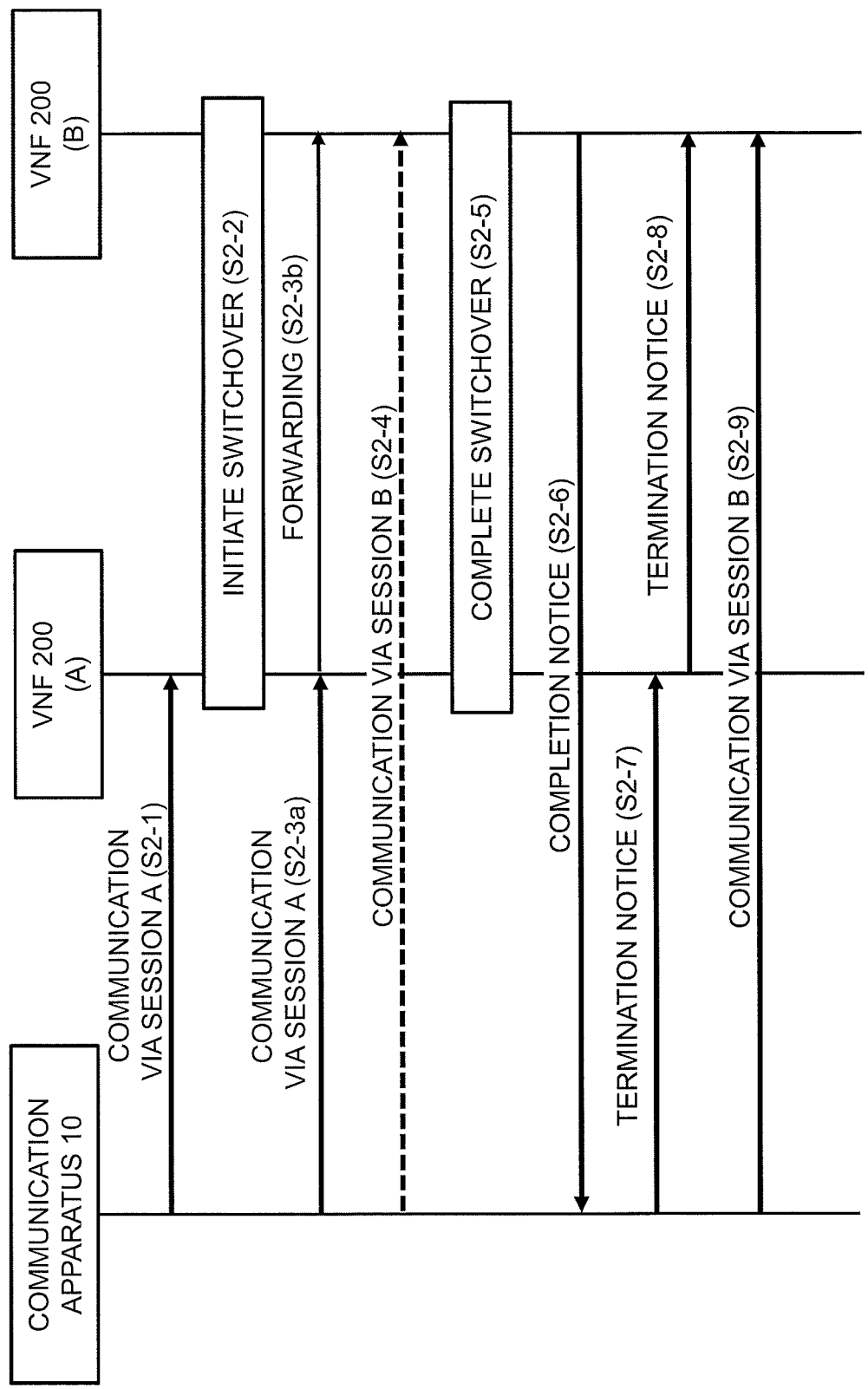
FIG. 12 is a sequence chart showing an example of operation in a communication system according to the second exemplary embodiment.

FIG. 12 is a sequence chart showing an example of operation in the communication system according to the second exemplary embodiment.

It is assumed that the signal processing section 12 of a communication apparatus 10 is performing communication via a session A with a VNF 200(A) (Operation S2-1).

In this state, it is assumed that switchover from the VNF 200(A) to a VNF 200(B) is initiated (Operation S2-2). For example, the control function 201 of the VNF 200(A) initiates the switchover to the VNF 200(B).

In response to the initiation of the switchover from the VNF 200(A) to the VNF 200(B), the signal processing section 12 of the communication apparatus 10 performs communication via the session A with the VNF 200(A) and communication via a session B with the VNF 200(B) (Operations S2-3a and S2-4). For example, the signal processing section 12 of the communication apparatus 10 can send the same data to each of the VNFs 200(A) and 200(B) via the sessions A and B, respectively. At that time, the signal processing function 202 of the VNF 200(A) forwards the data received from the communication apparatus 10 to the VNF 200(B) (S2-3b).

In response to completion of the switchover from the VNF 200(A) to the VNF 200(B) (Operation S2-5), the control function 201 of the VNF 200(B) notifies the communication apparatus 10 of the completion of this switchover (Operation S2-6).

In response to reception of the completion notice from the VNF 200(B), the control section 11 of the communication apparatus 10 notifies the VNF 200(A) of termination of the communication via the session A (Operation S2-7). For example, the control section 11 of the communication apparatus 10 notifies the VNF 200(A) of a message indicating the termination of the communication via the session A. Moreover, for example, it is also possible that the control section 11 of the communication apparatus 10 controls the signal processing section 12 so as to send a packet indicating the session termination to the VNF 200(A). Subsequent to the last packet to be sent to the VNF 200(A), the signal processing section 12 sends an end marker packet (a termination notice packet) indicating the termination of packet forwarding. With the end marker packet, the VNF 200(A) recognizes the termination of the communication via the session A.

In response to reception of the termination notice from the communication apparatus 10, the control function 201 of the VNF 200(A) notifies the VNF 200(B) of the termination of the communication via the session A (Operation S2-8). Moreover, for example, it is also possible that the signal processing function 202 of the VNF 200(A) forwards the received end marker packet to the switching-target VNF 200(B), thereby notifying the termination of the communication via the switching-source session.

In response to reception of the termination notice from the VNF 200(A), the control function 201 of the VNF 200(B) requests the signal processing function 202 to switch the packets to refer to, from packets received via each of the sessions A and B to packets received via the session B, thereby shifting to communication via the session B (Operation S2-9).

2.7) Effects

As described above, according to the second exemplary embodiment of the present invention, the switchover-target VNF 200 (VNF 200(B)) switches the session in response to reception of the notice of termination of the communication via the switchover-source session. This allows the VNF 200(B) to receive packets sent from the communication apparatus 10 without any loss even when the session is switched over in cooperation with the switching from the VNF 200(A) to the VNF 200(B). Accordingly, according to the second exemplary embodiment, even in case the functions provided by communication apparatuses are executed by virtual machines or the like, packet loss can be prevented at the time of path switching in association with communication apparatus switching.

3. THIRD EXEMPLARY EMBODIMENT

A third exemplary embodiment of the present invention will be described with reference to drawings. The technique according to the third exemplary embodiment can be also applied to each of the above-described embodiments and any of the techniques according to the under-described embodiments.

According to the third exemplary embodiment, when a communication apparatus 10 is switched over, the switchover of the communication apparatus 10 is hidden from an opposite communication apparatus 10.

3.1) First Example

<System Architecture>

Figure 13:
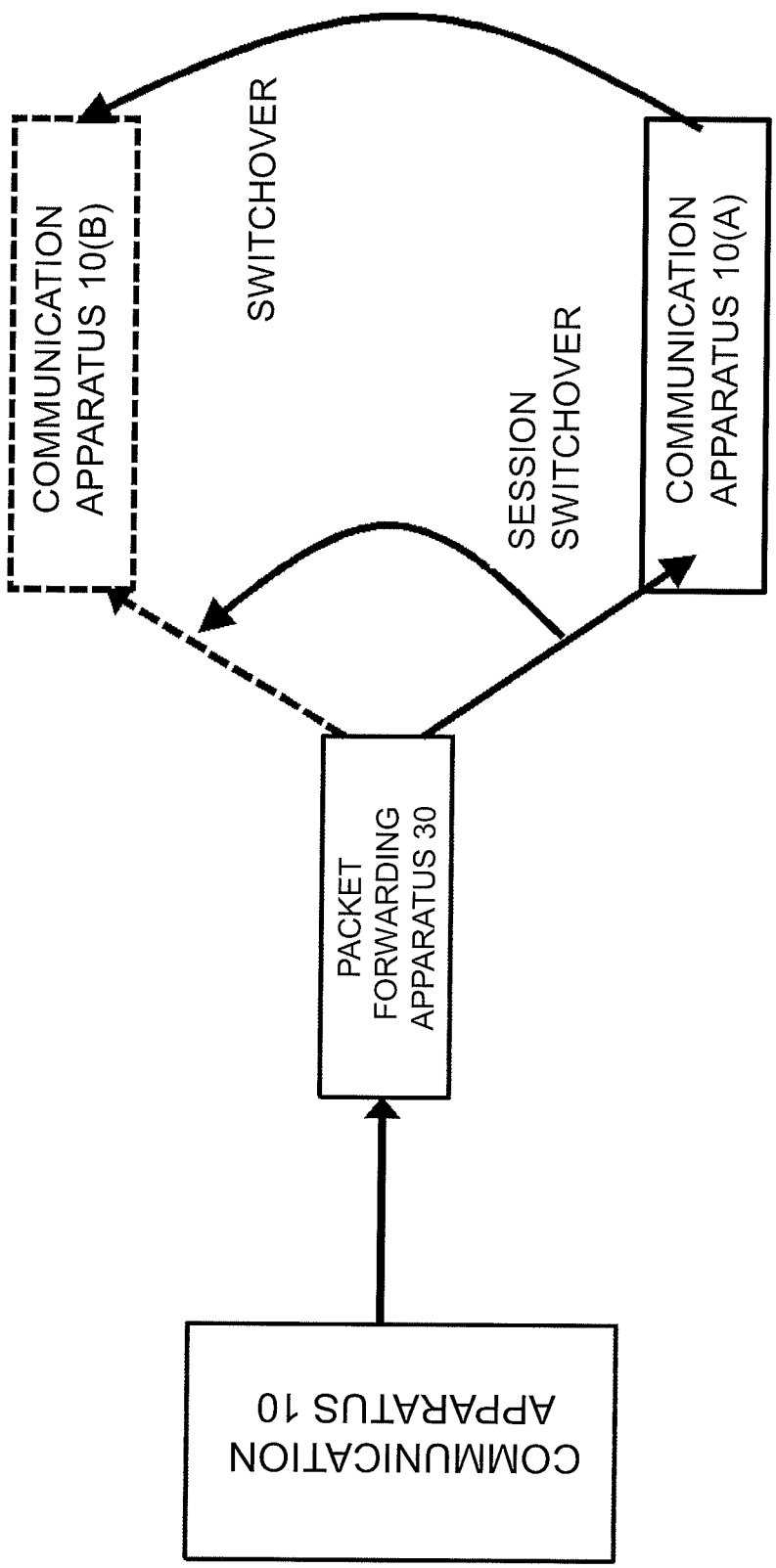
FIG. 13 is a schematic diagram showing an outline of session switchover operation in association with communication apparatus relocation in a communication system according to a third exemplary embodiment of the present invention.

As illustrated in FIG. 13, it is assumed that a communication apparatus 10(A) is switched to a communication apparatus 10(B). In this switchover, the communication apparatus 10(B) can take over, from the communication apparatus 10(A), the communication status of the communication apparatus 10(A) such as the IP (Internet Protocol) address thereof.

When the communication apparatus 10(A) is switched, a packet forwarding apparatus 30 switches a session sent from the opposite communication apparatus 10 to the communication apparatus 10(A), to the switchover-target communication apparatus 10(B). That is, the packet forwarding apparatus 30 can switch the destination of the session on behalf of the opposite communication apparatus 10. Accordingly, in the third exemplary embodiment, the packet forwarding apparatus 30 can hide the switchover of the communication apparatus 10(A) from the opposite communication apparatus 10.

Figure 14:
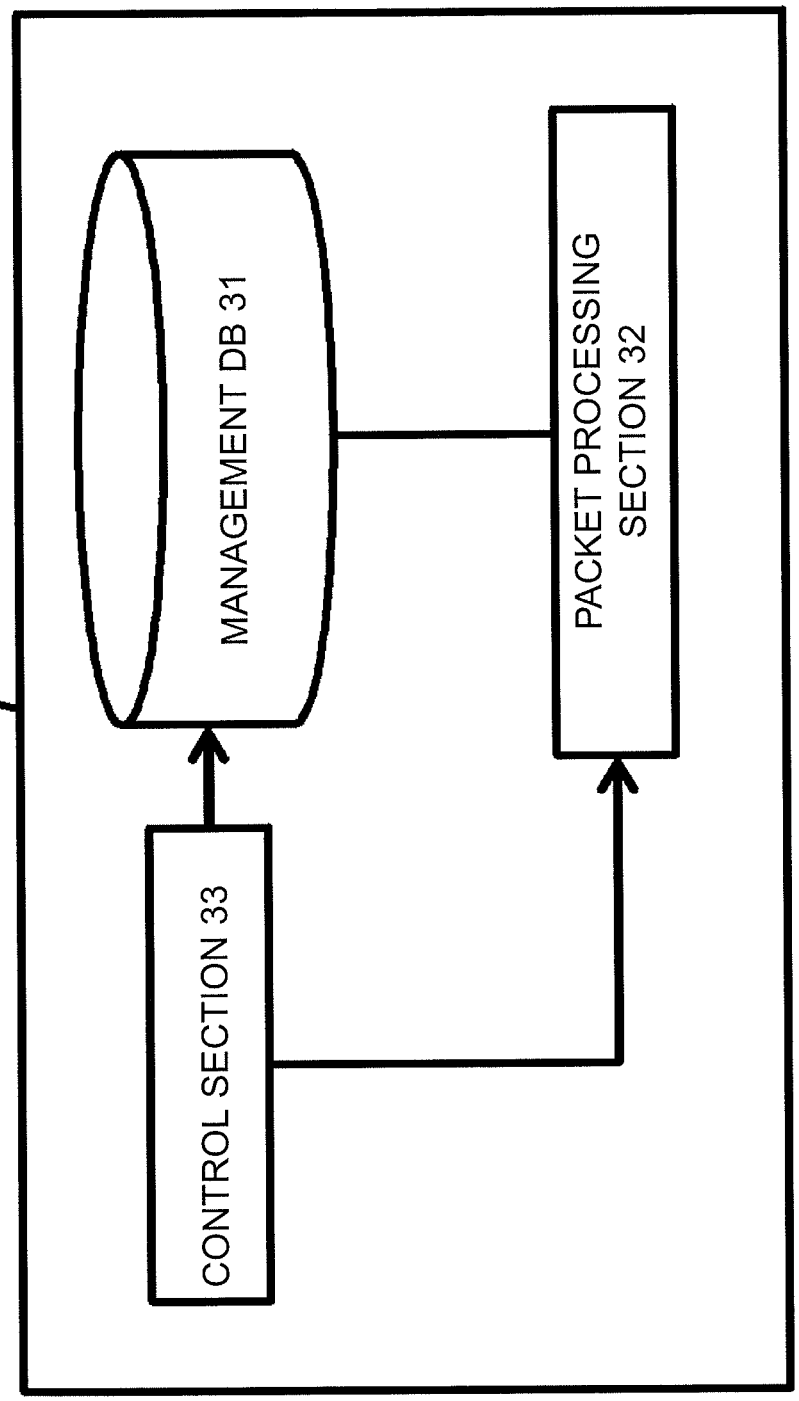
FIG. 14 is a block diagram showing an example of the functional configuration of a packet forwarding apparatus 30 in the third exemplary embodiment.
Figure 15:
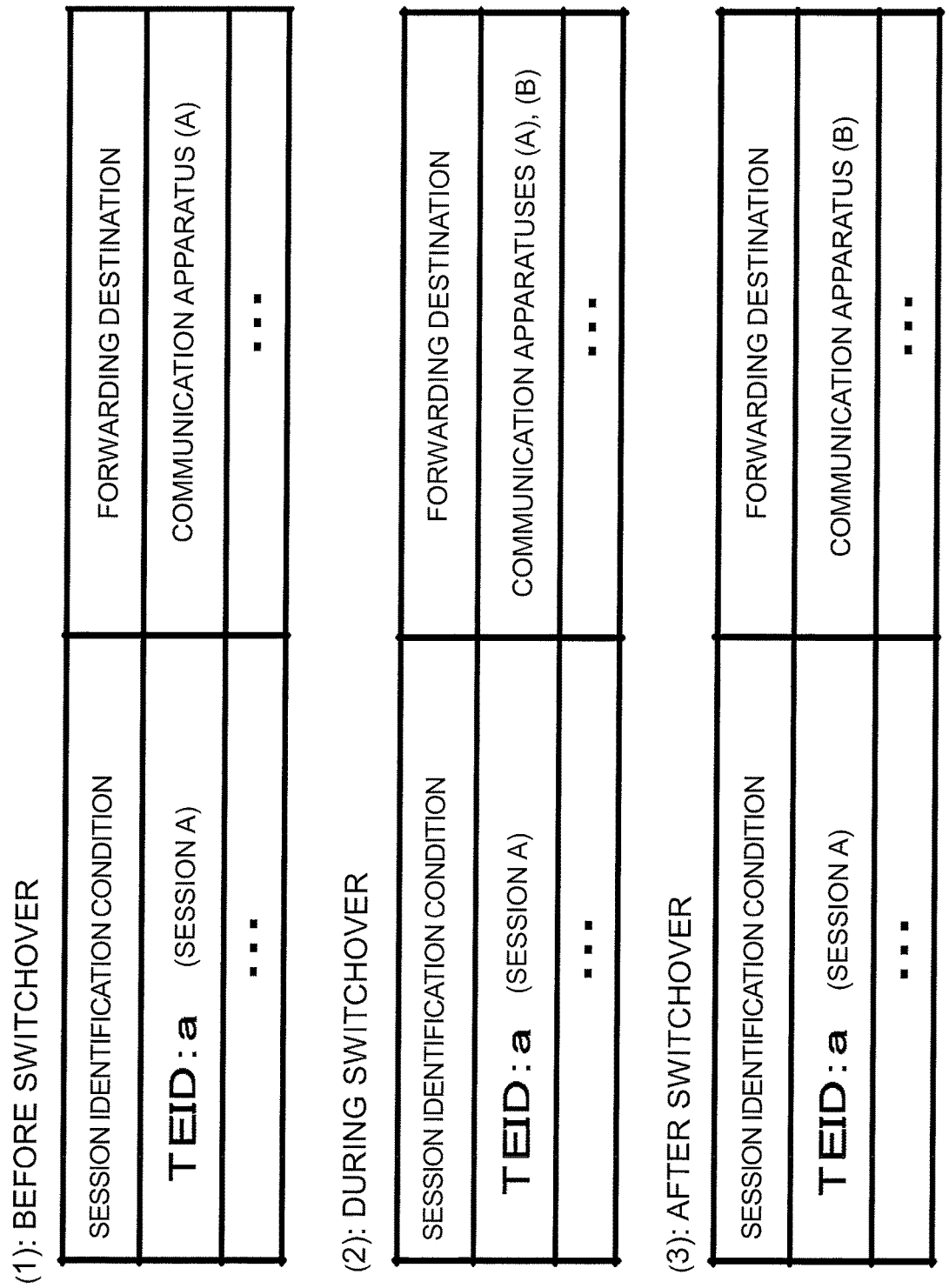
FIG. 15 is a diagram showing an example of the structure of information stored in a management DB 31 in the third exemplary embodiment.

FIG. 14 shows an example of the configuration of the packet forwarding apparatus 30 according to the third exemplary embodiment, and FIG. 15 shows an example of management information in the present exemplary embodiment. The packet forwarding apparatus 30 includes a management DB (DataBase) 31, a packet processing section 32, and a control section 33, as shown in FIG. 14.

The management DB 31 manages a condition for identifying a session ("SESSION IDENTIFICATION CONDITION" in FIG. 15) and a session forwarding destination that matches the condition. The session identification condition includes, for example, an identifier associated with a session. The session identifier is, for example, a TEID (Tunnel Endpoint Identifier) or GRE (Generic Routing Encapsulation) key.

The packet processing section 32 refers to the management DB 31 to forward a packet received via a session. For example, the packet processing section 32 compares the session identification conditions in the management DB 31 to information included in the received packet and forwards the received packet to a forwarding destination corresponding to a session identification condition that has matched. As illustrated in FIG. 15, (1) before switchover, the forwarding destination is only the communication apparatus (A), but (2) once switchover takes place, the forwarding destinations are both the communication apparatuses (A) and (B), and (3) when the switchover has been completed, the forwarding destination becomes only the communication apparatus (B).

The control section 33 processes control signals received from the communication apparatuses 10. For example, the control section 33 can change an entry in the table stored in the management DB 31, based on a control signal received from the communication apparatuses 10. Moreover, for example, the control section 33 can control the operation of the packet processing section 32, based on a control signal received from the communication apparatuses 10.

<Operation>

Figure 16:
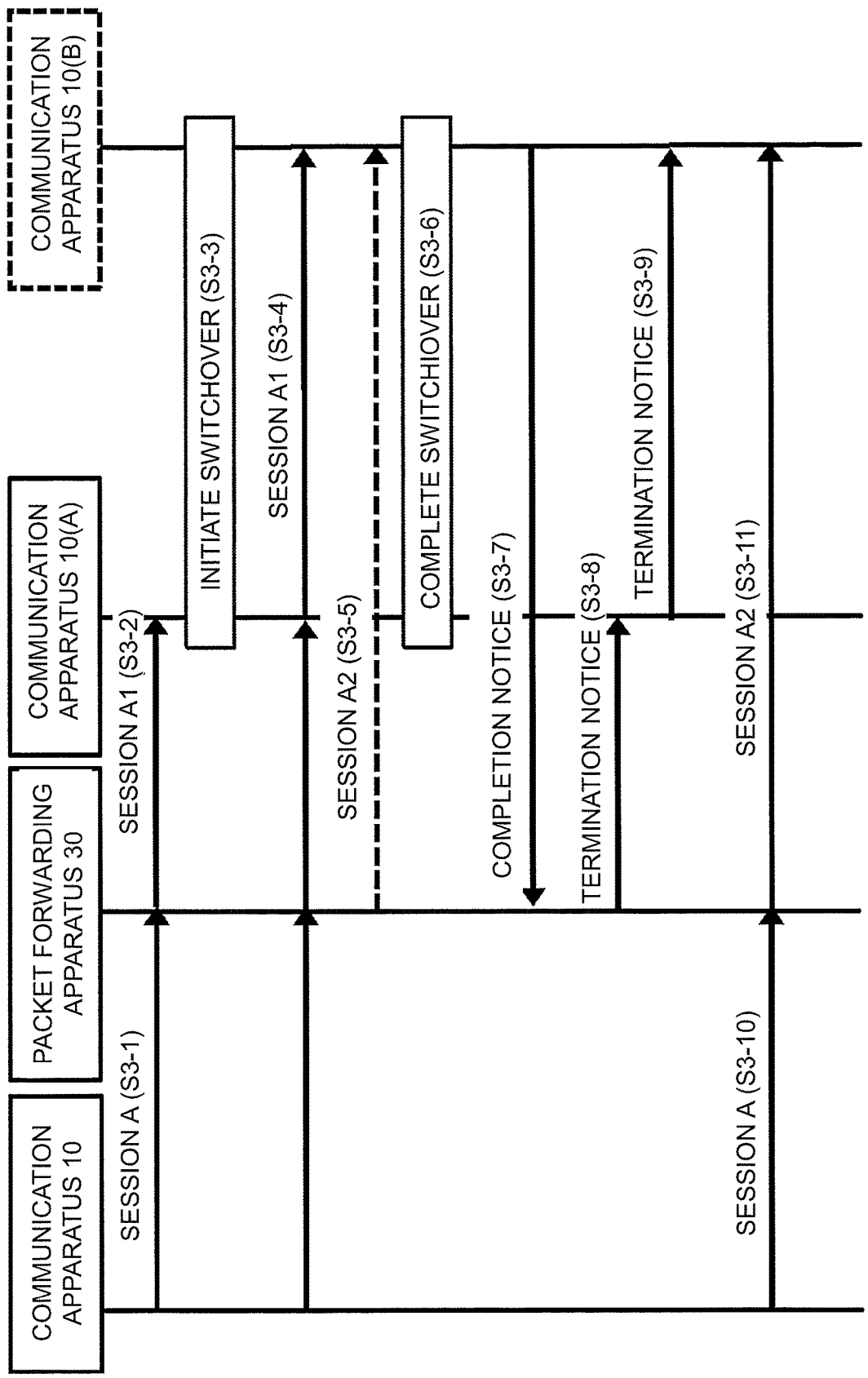
FIG. 16 is a sequence chart showing an example of operation in the communication system according to the third exemplary embodiment.

FIG. 16 is a sequence chart showing an example of operation in a communication system according to the third exemplary embodiment.

Referring to FIG. 16, the signal processing section 12 of the communication apparatus 10 performs session-A communication with the communication apparatus 10(A) through the packet forwarding apparatus 30 (Operation S3-1). The packet processing section 32 of the packet forwarding apparatus 30 forwards a packet received via the session A to the communication apparatus 10(A) (Operation S3-2). In the example of FIG. 16, the session forwarded from the packet forwarding apparatus 30 to the communication apparatus 10(A) is denoted as "SESSION A1", but the sessions A and A1 are substantially the same session. The packet forwarding apparatus 30 relays the session A and forwards it as the session A1 to the communication apparatus 10(A).

In this state, it is assumed that switchover from the communication apparatus 10(A) to the communication apparatus 10(B) is initiated (Operation S3-3). For example, the control section 11 of the communication apparatus 10(A) initiates the switchover to the communication apparatus 10(B).

Upon initiating the switchover, the control section 11 of the communication apparatus 10(A) sends a switchover initiation notice to the packet forwarding apparatus 30. The control section 33 of the packet forwarding apparatus 30 changes an entry in the management DB 31 according to the received switchover initiation notice. For example, the control section 33 changes the forwarding destination of the session A from only the communication apparatus (A) to the communication apparatuses (A) and (B) as in the example shown in FIG. 15 (see "(2) DURING SWITCHOVER" in FIG. 15).

In response to the initiation of the switchover from the communication apparatus 10(A) to the communication apparatus 10(B), the packet processing section 32 of the packet forwarding apparatus 30 forwards the session A to both the communication apparatuses 10(A) and 10(B) (Operations S3-4, S3-5). Note that in FIG. 16, the sessions forwarded to the communication apparatuses 10(A) and 10(B) are denoted as "SESSION A1" and "SESSION A2", respectively, but the "session A", "session A1", and "session A2" are substantially the same session. For example, assuming that a "session" represents all packets belonging to a connection that is configured based on a protocol such as TCP or UDP, then if the same packet received from the communication apparatus 10 is forwarded to the communication apparatuses 10(A) and 10(B) by the packet forwarding apparatus 30, the "session A", "session A1", and "session A2" are substantially the same session. For example, the packet processing section 32 compares the session identification conditions in the management DB 31 to the information in a received packet and forwards the packet to a forwarding destination corresponding to the session A. In the example of FIG. 16, since the switchover from the communication apparatus 10(A) to the communication apparatus 10(B) is under way, an entry in the management DB 31 is changed to the state under "(2): DURING SWITCHOVER" in FIG. 15. The packet processing section 32 refers to the changed management DB 31 and forwards the session A to the communication apparatuses 10(A) and 10(B).

The signal processing section 12 of the communication apparatus 10(A) forwards the packet received via the session A1 from the packet forwarding apparatus 30 to the communication apparatus 10(B) (Operation S3-4).

In response to completion of the switchover from the communication apparatus 10(A) to the communication apparatus 10(B) (Operation S3-6), the control section 11 of the communication apparatus 10(B) notifies the packet forwarding apparatus 30 of the completion of this switchover (Operation S3-7).

In response to reception of the completion notice from the communication apparatus 10(B), the control section 33 of the packet forwarding apparatus 30 notifies the communication apparatus 10(A) of termination of the communication via the session A1 (Operation S3-8). For example, the control section 33 controls the packet processing section 32 to send a packet indicating the session termination to the communication apparatus 10(A).

In response to reception of the termination notice from the packet forwarding apparatus 30, the control section 11 of the communication apparatus 10(A) notifies the communication apparatus 10(B) of the termination of the communication via the session A1 (Operation S3-9). For example, the control section 11 controls the signal processing section 12 to send a received end marker packet to the switchover-target communication apparatus 10(B).

In response to reception of the termination notice (or end marker packet) from the communication apparatus 10(A), the communication apparatus 10(B) shifts from an operation for receiving packets via the sessions A1 and A2 to an operation for receiving packets via the session A2, thus performing communication via the sessions A and A2 (Operations S3-10, S3-11).

While the switchover between the communication apparatuses 10(A) and (B) is being performed (Operations S3-3 to S3-9), the signal processing section 12 of the communication apparatus 10 continues the communication via the session A (Operations S3-1, S3-10). Even if the switchover between the communication apparatuses 10(A) and (B) is performed, the packet forwarding apparatus 30 switches the destination of the session on behalf of the opposite communication apparatus 10, and therefore the switchover can be hidden from the communication apparatus 10. Accordingly, the opposite communication apparatus 10 can continue the communication via the session A even during the switchover between the communication apparatuses 10(A) and (B).

3.2) Second Example

<System Architecture>

Figure 17:
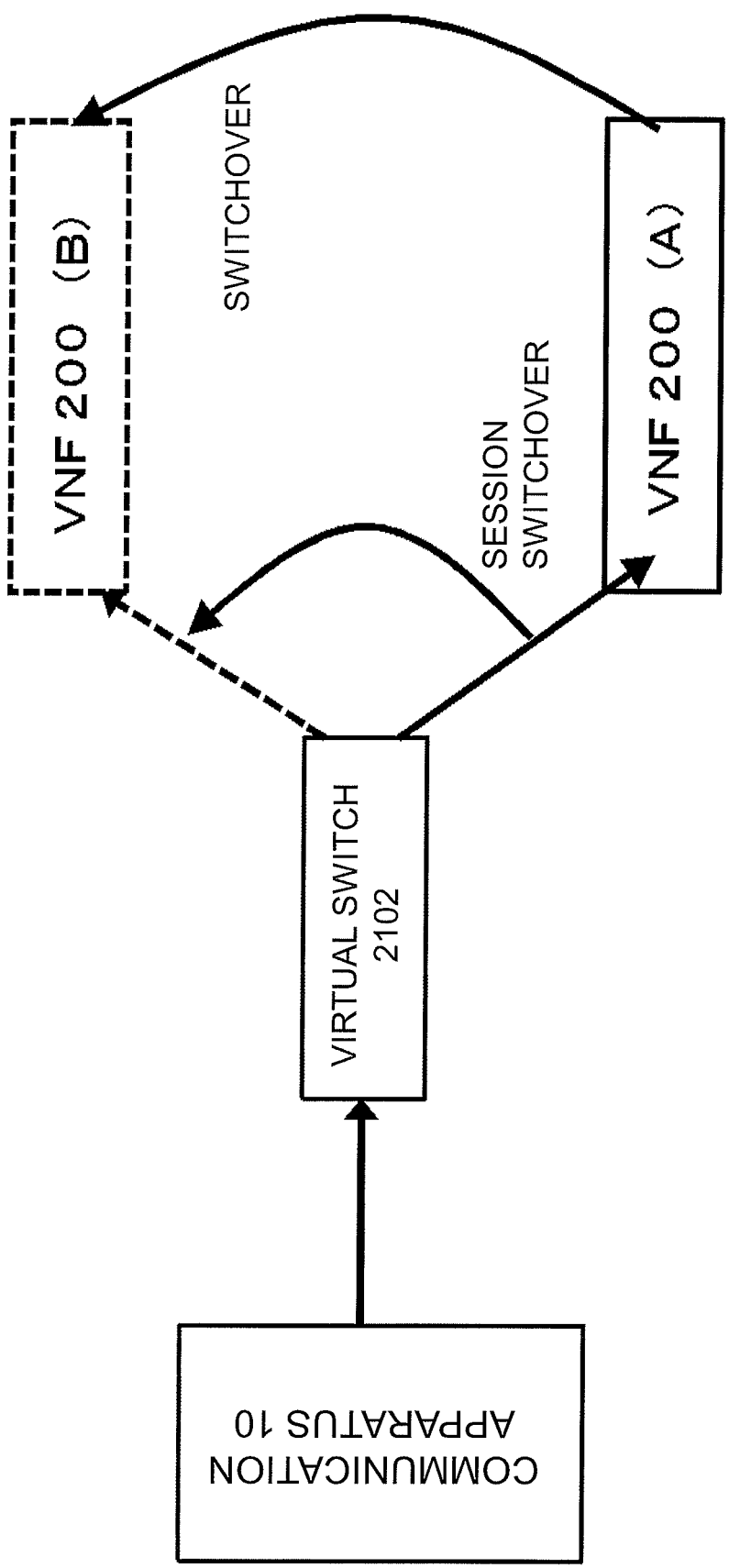
FIG. 17 is a schematic diagram showing an outline of another example of the session switchover operation in association with communication apparatus relocation in the communication system according to the third exemplary embodiment.

In an example shown in FIG. 17, switchover is performed between VNFs 200 illustrated in the second exemplary embodiment. Operation for switching over between VNFs 200 is similar to the above-described second exemplary embodiment, and therefore a detailed description thereof will be omitted.

In the switchover, for example, the VNF 200(B) takes over the communication status of the VNF 200(A) such as the IP (Internet Protocol) address thereof.

When the VNF 200(A) is switched over, a virtual switch 2102 switches a session between the VNF 200(A) and its opposite communication apparatus 10, to the switchover-target VNF 200(B). That is, the virtual switch 2102 can switch the destination of the session on behalf of the opposite communication apparatus 10. Accordingly, the virtual switch 2102 can hide the switching of the VNF 200(A) from the opposite communication apparatus 10.

In the example of FIG. 17, the VNF 200(A) may be switched over to the another VNF 200(B) that is operated on the server 20 where this VNF 200(A) is operating. Moreover, the VNF 200(A) may be switched over to the VNF 200(B) that is operated on a different server 20 from the server 20 where this VNF 200(A) is operating.

The virtual switch 2102 is implemented, for example, by the control section 210 of the server 20. In the example of FIG. 17, in case the VNFs 200 (A) and (B) are operated on the same server 20, the virtual switch 2102 implemented on this server 20 switches the session.

Moreover, in case the VNFs 200(A) and (B) are operated on the different servers 20, the virtual switch 2102 implemented on the server 20 on which the switchover-source VNF 200(A) is operated switches the session. In this case, the virtual switch 2102 switches the session toward a virtual switch implemented on the server 20 on which the VNF 200(B) is operated. The switched session is forwarded to the virtual switch implemented on the server 20 on which the VNF 200(B) is operated, for example, via a switch, router, or the like.

Figure 18:
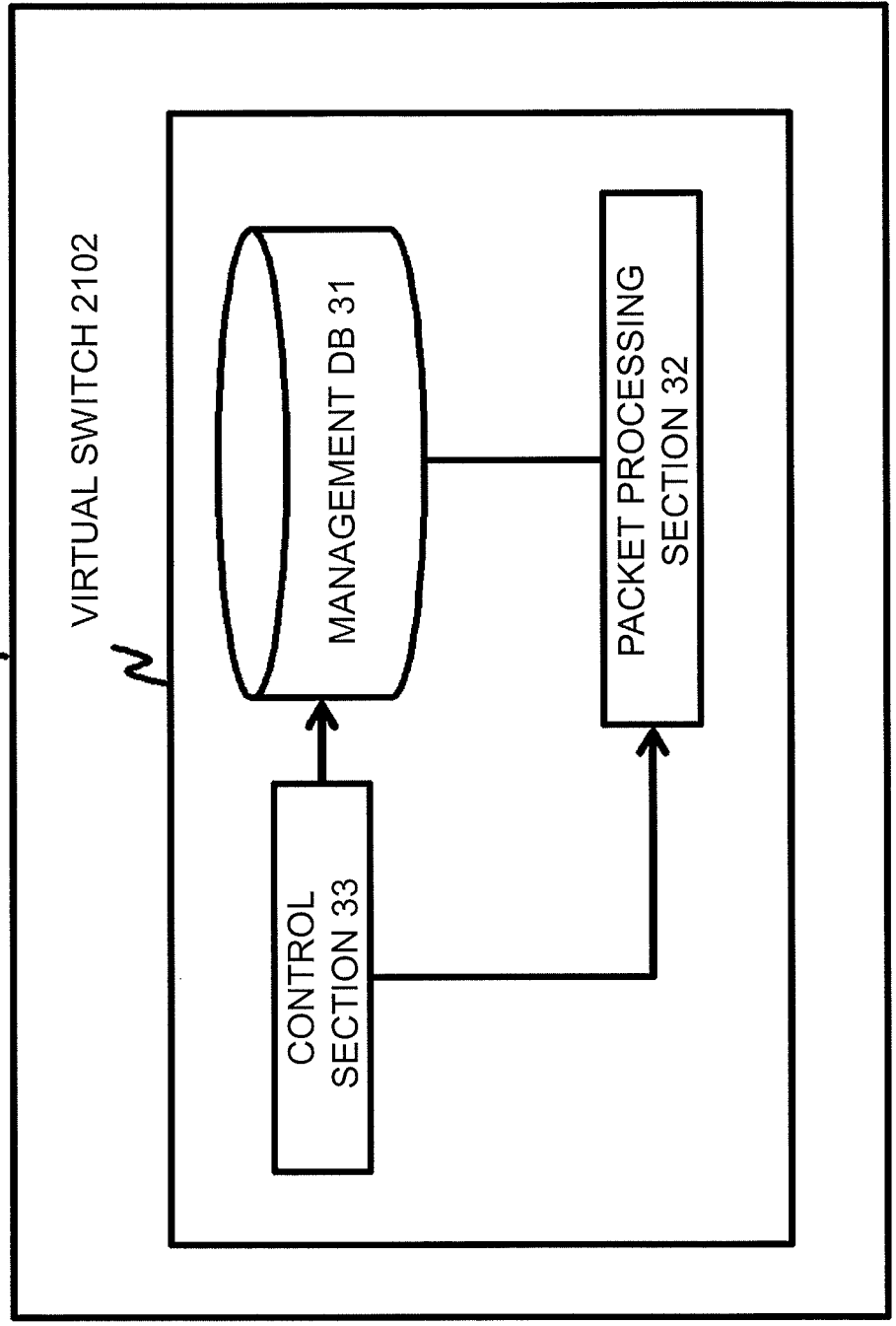
FIG. 18 is a block diagram showing an example of the functional configuration of a virtual switch 2102 in the third exemplary embodiment.

FIG. 18 shows an example of the configuration of the virtual switch 2102 according to the third exemplary embodiment. The virtual switch 2102, as shown in FIG. 18, has functions similar to those of the packet forwarding apparatus 30 illustrated in FIG. 14, and therefore a detailed description thereof will be omitted.

<Operation>

Figure 19:
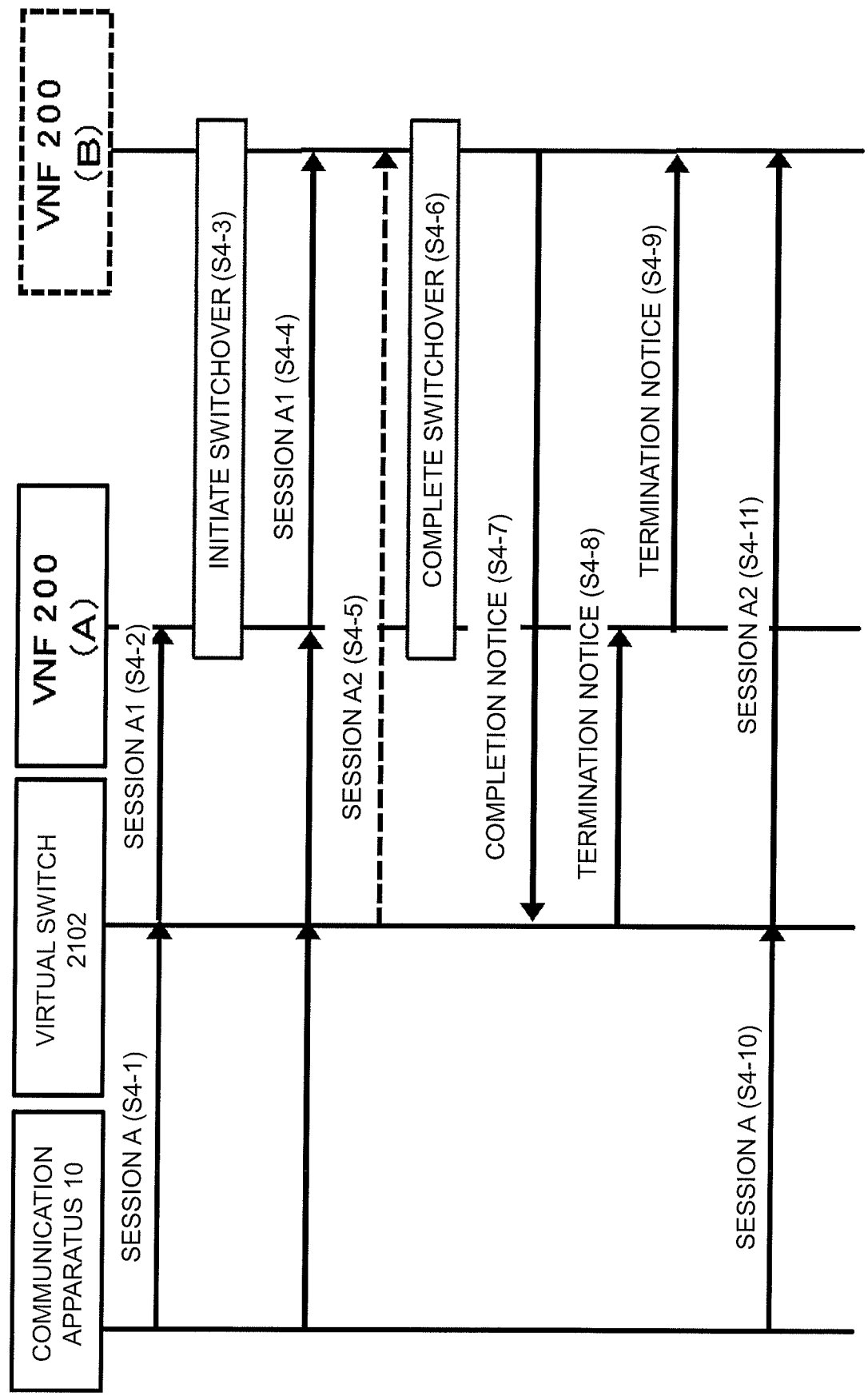
FIG. 19 is a sequence chart showing an example of operation in the communication system illustrated in FIG. 17.

FIG. 19 is a sequence chart showing an example of operation in the communication system illustrated in FIG. 17.

The signal processing section 12 of the communication apparatus 10 performs session-A communication with the VNF 200(A) via the virtual switch 2102 (Operation S4-1). The packet processing section 32 of the virtual switch 2102 forwards a packet received via the session A to the VNF 200(A) (Operation S4-2). In the example of FIG. 19, the session forwarded from the virtual switch 2102 to the VNF 200(A) is denoted as "SESSION A1", but the sessions A and A1 are substantially the same session. The virtual switch 2102 relays the session A and forwards it as the session A1 to the VNF 200(A).

In this state, it is assumed that switchover from the VNF 200(A) to the VNF 200(B) is initiated (Operation S4-3). For example, the control function 201 of the VNF 200(A) initiates the switchover to the VNF 200(B).

For example, the control function 201 of the VNF 200(A) sends a switching initiation notice to the virtual switch 2102, and the control section 33 of the virtual switch 2102 changes an entry in the management DB 31 according to the received notice. For example, the control section 33 changes the forwarding destination of the session A to the VNFs 200(A) and 200(B).

In response to the initiation of the switchover from the VNF 200(A) to the VNF 200(B), the packet processing section 32 of the virtual switch 2102 forwards the session A to both the VNFs 200(A) and (B) (Operations S4-4, S4-5). In FIG. 19, the sessions forwarded to the VNFs 200(A) and (B) are denoted as "SESSION A1" and "SESSION A2", respectively, but the "session A", "session A1", and "session A2" are substantially the same session. For example, the packet processing section 32 compares the session identification conditions in the management DB 31 to the information in a received packet and forwards the packet to a forwarding destination corresponding to the session A. The packet processing section 32 refers to the management DB 31 and forwards the session A to the VNFs 200(A) and (B).

The signal processing function 202 of the VNF 200(A) forwards the packet received via the session A1 from the virtual switch 2102 to the VNF 200(B) (Operation S4-4).

In response to completion of the switchover from the VNF 200(A) to the VNF 200(B) (Operation S4-6), the control function 201 of the VNF 200(B) notifies the virtual switch 2102 of the completion of this switchover (Operation S4-7).

In response to reception of the completion notice from the VNF 200(B), the control section 33 of the virtual switch 2102 notifies the VNF 200(A) of termination of the communication via the session A1 (Operation S4-8). For example, the control section 33 controls the packet processing section 32 to send a packet indicating the session termination to the VNF 200(A).

In response to reception of the termination notice from the virtual switch 2102, the control function 201 of the VNF 200(A) notifies the VNF 200(B) of the termination of the communication via the session A1 (Operation S4-9). For example, the control function 201 controls the signal processing function 202 to forward a received end marker packet to the switchover-target VNF 200(B).

In response to reception of the termination notice (or end marker packet) from the VNF 200(A), the VNF 200(B) shifts from an operation for receiving packets via the sessions A1 and A2 to an operation for receiving packets via the session A2, thus performing communication via the sessions A and A2 (Operations S4-10, S4-11).

While the switchover between the VNFs 200(A) and (B) is being performed (Operations S4-3 to S4-9), the signal processing section 12 of the communication apparatus 10 continues the communication via the session A (Operations S4-1, S4-10). Even if the switchover between the VNFs 200(A) and (B) is performed, the virtual switch 2102 switches the destination of the session on behalf of the opposite communication apparatus 10, and accordingly the opposite communication apparatus 10 can continue the communication via the session A even during the switchover between the VNFs 200(A) and (B).

4. FOURTH EXEMPLARY EMBODIMENT

A fourth exemplary embodiment of the present invention will be described with reference to drawings. The technique according to the fourth exemplary embodiment can be also applied to each of the above-described embodiments and any of the techniques according to the under-described embodiments.

4.1) System Architecture

Figure 20:
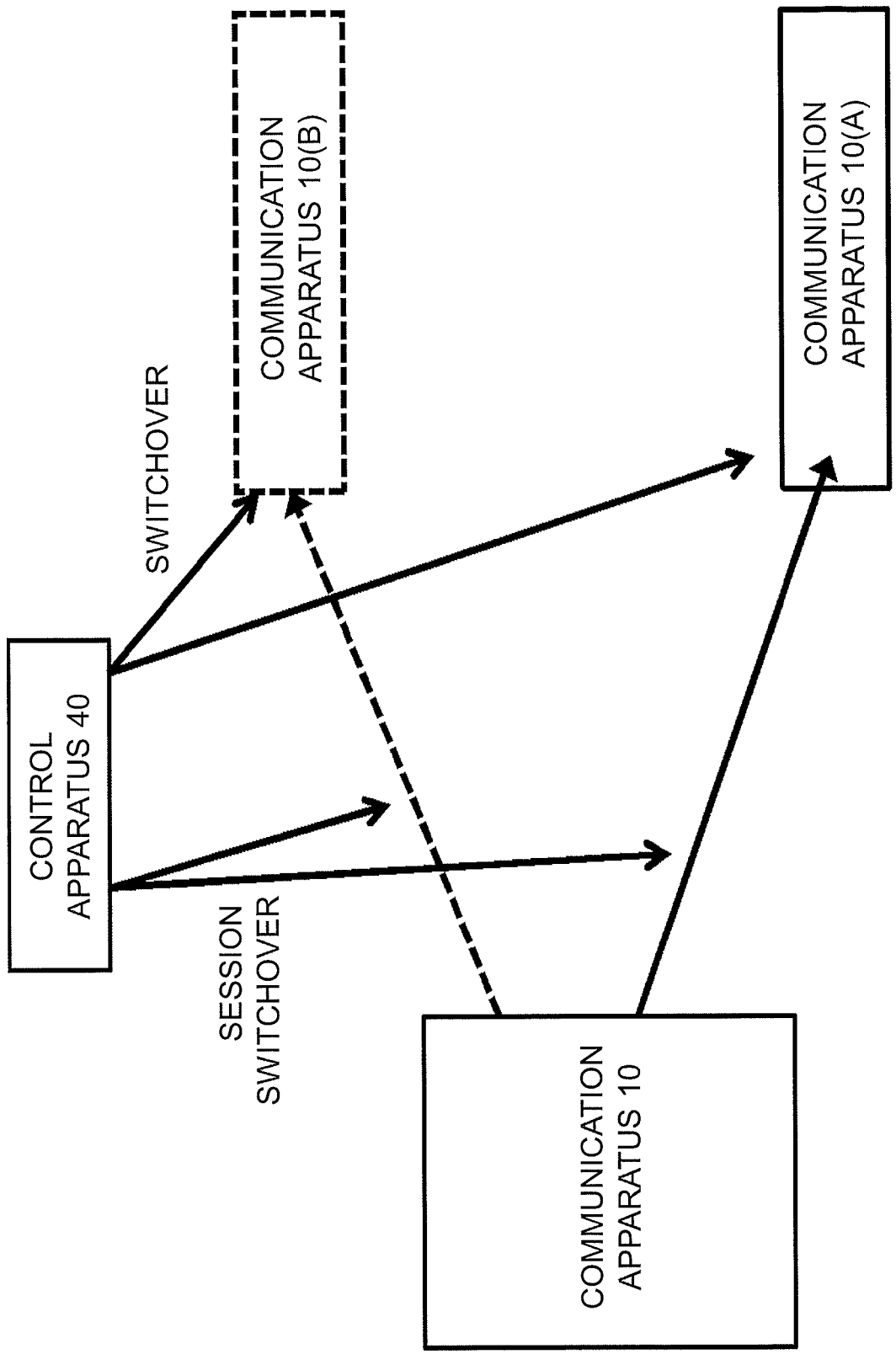
FIG. 20 is a schematic diagram showing an outline of session switchover operation in association with communication apparatus relocation in a communication system according to a fourth exemplary embodiment of the present invention.

As illustrated in FIG. 20, a communication system according to the fourth exemplary embodiment includes communication apparatuses 10 and a control apparatus 40 that controls session switchover. The control apparatus 40 sends a control signal related to session switchover on behalf of the communication apparatuses 10. Accordingly, control signals transmitted by the communication apparatuses 10 can be reduced, and the loads on the communication apparatuses 10 can be lightened.

In the example of FIG. 20, the control apparatus 40 controls switchover from a communication apparatus 10(A) to a communication apparatus 10(B). For example, the control apparatus 40 instructs the communication apparatus 10(A) or 10(B) to initiate the switchover from the communication apparatus 10(A) to the communication apparatus 10(B). Moreover, the control apparatus 40 controls session switchover attending the switchover between the communication apparatuses 10. For example, in response to the switchover between the communication apparatuses 10, the control apparatus 40 initiates the switching from a session A to a session B.

Figure 21:
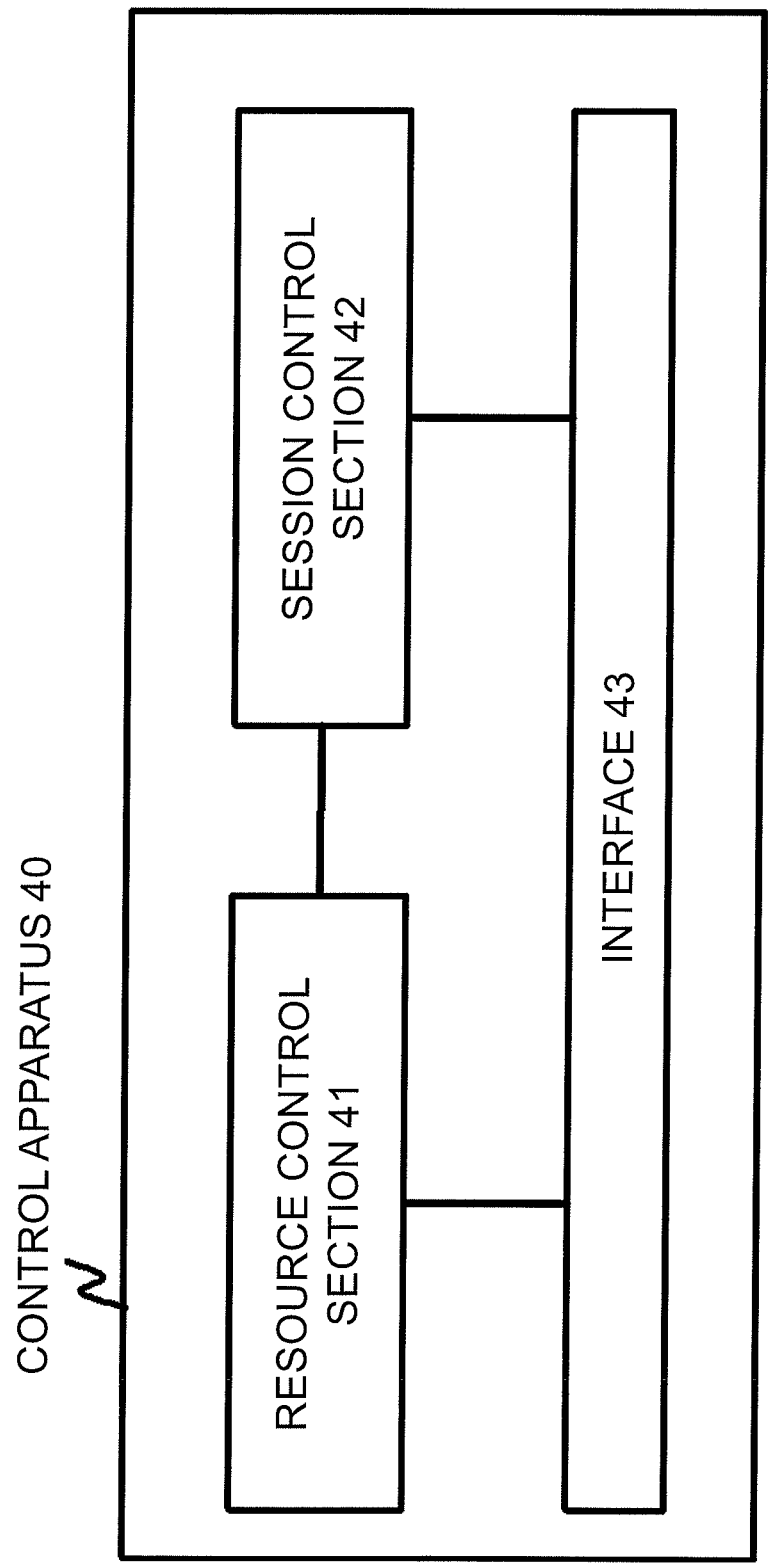
FIG. 21 is a block diagram showing an example of the functional configuration of a control apparatus 40 in the fourth exemplary embodiment.

FIG. 21 shows an example of the configuration of the control apparatus 40 according to the fourth exemplary embodiment. The control apparatus 40 includes a resource control section 41, a session control section 42, and an interface 43, as shown in FIG. 21. The control apparatus 40 communicates with the communication apparatuses 10 via the interface 43.

The resource control section 41 controls the switchover from the communication apparatus 10(A) to the communication apparatus 10(B). For example, the resource control section 41 may instruct the control section 11 of the communication apparatus 10(A) to initiate the switchover to the communication apparatus 10(B), or may instruct the control section 11 of the communication apparatus 10(B) about the switchover from the communication apparatus 10(A) to the communication apparatus 10(B). The resource control section 41 can switch over communication apparatuses 10, for example, depending on the load, the communication congestion status or the like on a communication apparatus 10.

The session control section 42 controls session switchover. For example, the session control section 42, in response to initiation of the switchover between the communication apparatuses 10, notifies a communication apparatus 10 opposite to the communication apparatus 10 under switchover that the switchover has been initiated. Moreover, for example, the session control section 42, in response to completion of the switchover between the communication apparatuses 10, notifies the communication apparatus 10 opposite to the switched communication apparatus 10 that the switchover has been completed. The session control section 42 can control the timing of session switchover by notifying the completion of the switchover.

Note that in case the network functions provided by each of the communication apparatuses 10 are executed by software such as virtual machine as in the second or third exemplary embodiment, for example, the resource control section 41 may instruct the VM control section 2100 of the control section 210 about switchover between VNFs 200.

Moreover, in case a packet forwarding apparatus 30 switches the destination of a session on behalf of the opposite communication apparatus 10 as in the third exemplary embodiment, for example, the session control section 42 may instruct the control section 33 of the packet forwarding apparatus 30 about session switchover.

4.2) First Operation

Figure 22:
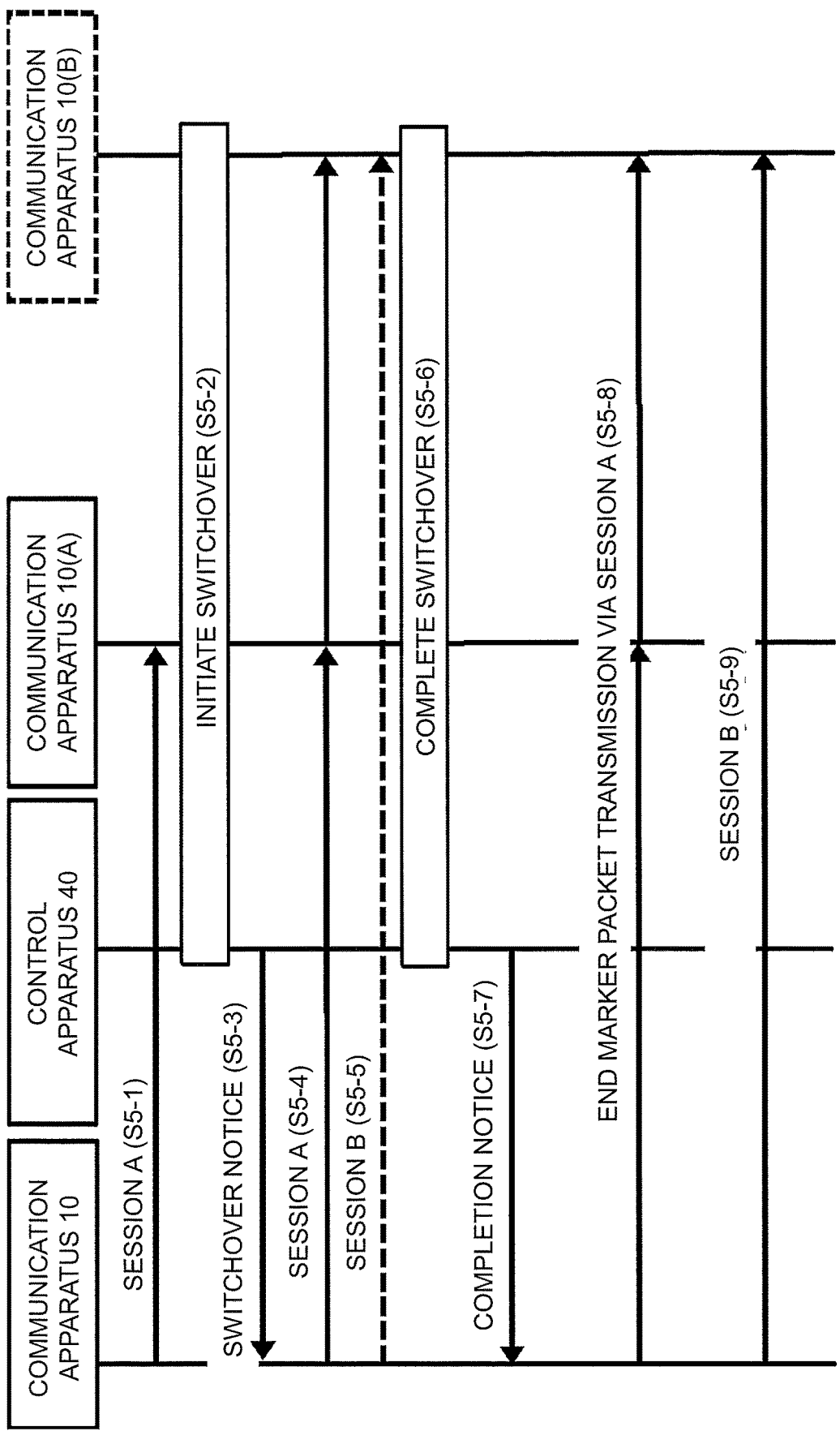
FIG. 22 is a sequence chart showing an example of operation in the communication system illustrated in FIG. 20.

FIG. 22 is a sequence chart showing an example of operation in the communication system illustrated in FIG. 20.

It is assumed that the signal processing section 12 of the communication apparatus 10 is performing communication via a session A with the communication apparatus 10(A) (Operation S5-1).

In this state, it is assumed that switchover from the communication apparatus 10(A) to the communication apparatus 10(B) is initiated (Operation S5-2). For example, the resource control section 41 of the control apparatus 40 instructs the control section 11 of the communication apparatus 10(A) or 10(B) to initiate the switchover from the communication apparatus 10(A) to the communication apparatus 10(B).

The session control section 42 of the control apparatus 40 sends a switchover initiation notice to the communication apparatus 10 opposite to the communication apparatus 10(A) (Operation S5-3).

In response to reception of the switchover initiation notice, the signal processing section 12 of the communication apparatus 10 performs session-A communication with the communication apparatus 10(A) and session-B communication with the communication apparatus 10(B) (Operations S5-4, S5-5). For example, the signal processing section 12 of the communication apparatus 10 sends the same data to each of the communication apparatuses 10(A) and 10(B) via the sessions A and B, respectively. Note that in Operation S5-4, the signal processing section 12 of the communication apparatus 10(A) forwards the data received from the communication apparatus 10 to the communication apparatus 10(B).

In response to completion of the switchover from the communication apparatus 10(A) to the communication apparatus 10(B) (Operation S5-6), the resource control section 41 of the control apparatus 40 notifies the completion of the switchover to the communication apparatus 10 opposite to the communication apparatus 10(A) (Operation S5-7).

In response to reception of the completion notice from the control apparatus 40, the control section 11 of the communication apparatus 10 controls the signal processing section 12 to send a packet indicating session termination to the communication apparatus 10(A) (Operation S5-8). Subsequent to the last packet to be sent to the communication apparatus 10(A), the signal processing section 12 sends an end marker packet (a termination notice packet) indicating the termination of packet forwarding. With the end marker packet, the communication apparatus 10(A) recognizes the termination of the communication via the session A, and the signal processing section 12 of the communication apparatus 10(A) forwards the received end marker packet to the switchover-target communication apparatus 10(B) (Operation S5-8).

In response to reception of the termination notice from the communication apparatus 10(A), the communication apparatus 10(B) shifts from an operation for receiving packets via each of the sessions A and B to an operation for receiving packets via the session B. The communication apparatus 10(B) shifts to the operation for receiving packets via the session B, thus performing communication via the session B (Operation S5-9).

4.3) Second Operation

Figure 23:
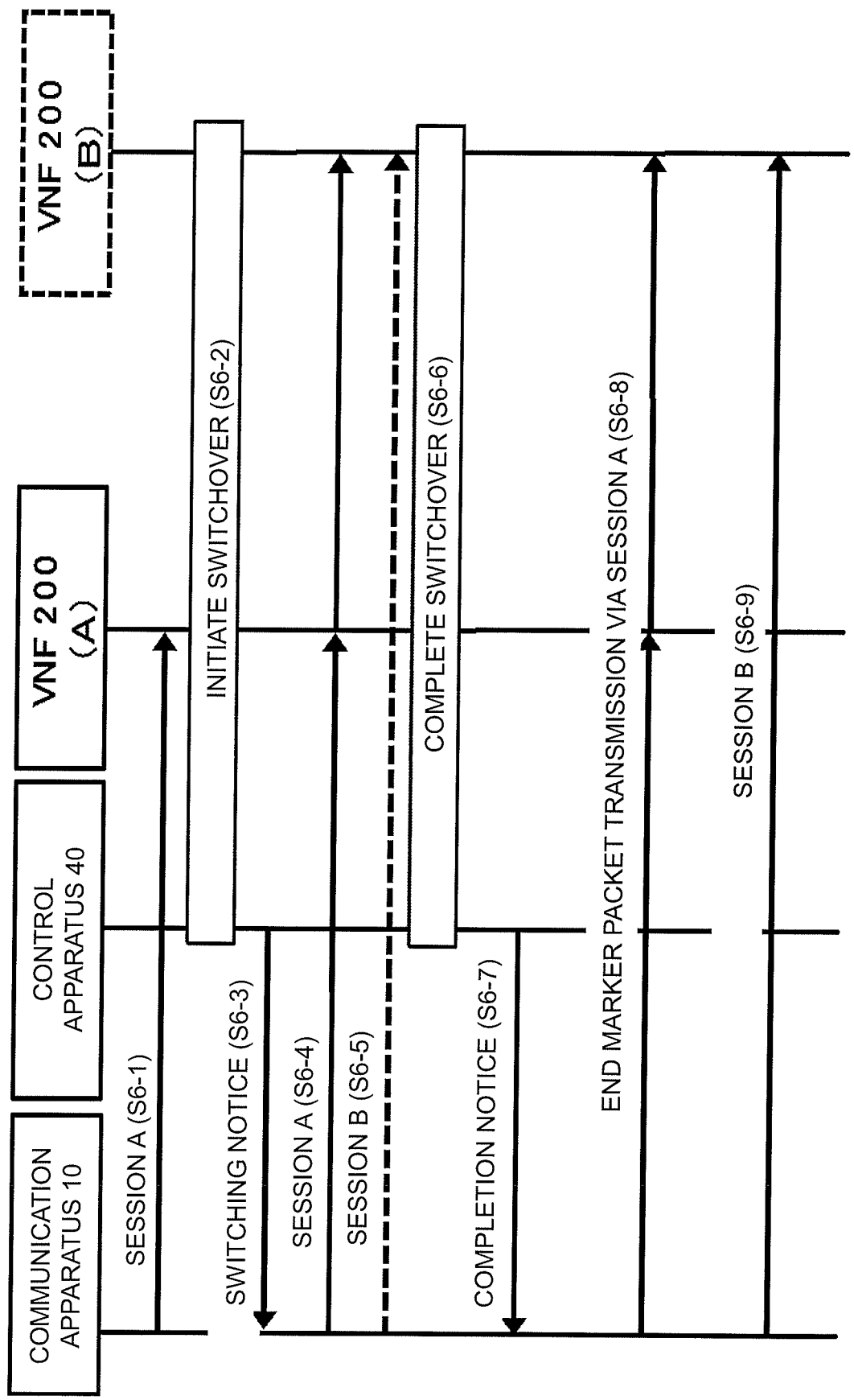
FIG. 23 is a sequence chart showing a first example of operation in the communication system according to the fourth exemplary embodiment.

FIG. 23 is a sequence chart showing another example of operation in the communication system according to the fourth exemplary embodiment. FIG. 23 illustrates a case where the network functions provided by each of the communication apparatuses 10 are executed by software such as virtual machine.

Note that the example of operation in FIG. 23 (Operations S6-1 to S6-9) is similar to the operation in FIG. 22 (Operations S5-1 to S5-9), only with the difference that the communication apparatuses 10(A) and 10(B) in FIG. 20 are replaced with VNFs 200(A) and 200(B), respectively, and therefore a detailed description thereof will be omitted.

4.4) Third Operation

Figure 24:
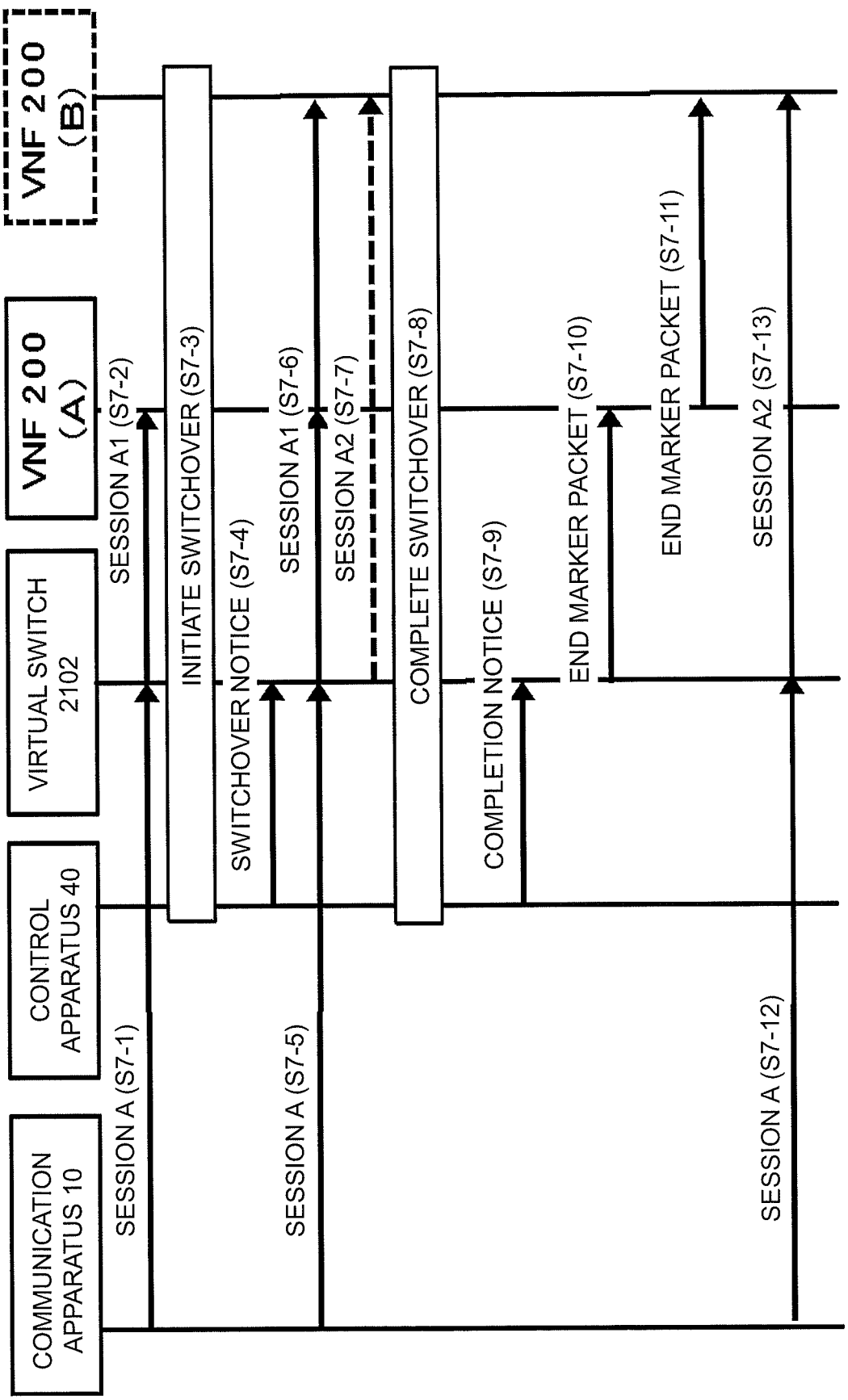
FIG. 24 is a sequence chart showing a second example of operation in the communication system according to the fourth exemplary embodiment.

FIG. 24 is a sequence chart showing another example of operation in the communication system according to the fourth exemplary embodiment. FIG. 24 illustrates a case where a virtual switch 2102 switches the destination of a session on behalf of the opposite communication apparatus 10.

It is assumed that the signal processing section 12 of the communication apparatus 10 is performing session-A communication with a VNF 200(A) via the virtual switch 2102 (Operation S7-1). The packet processing section 32 of the virtual switch 2102 forwards a packet received via the session A to the VNF 200(A) (Operation S7-2). In the example of FIG. 24, the session forwarded from the virtual switch 2102 to the VNF 200(A) is denoted as "SESSION A1", but the sessions A and A1 are substantially the same session. The virtual switch 2102 relays the session A and forwards it as the session A1 to the VNF 200(A).

In this state, it is assumed that switchover from the VNF 200(A) to a VNF 200(B) is initiated (Operation S7-3). For example, the resource control section 41 of the control apparatus 40 instructs the control function 201 of the VNF 200(A) or 200(B) to initiate the switchover from the VNF 200(A) to the VNF 200(B).

The session control section 42 of the control apparatus 40 sends a switchover initiation notice to the virtual switch 2102 (Operation S7-4). The control section 33 of the virtual switch 2102 changes an entry in the management DB 31 according to the received switchover initiation notice. For example, the control section 33 changes the forwarding destination of the session A to the VNFs 200(A) and 200(B).

While the switchover between the VNFs 200(A) and (B) is being performed (Operations S7-3 to S7-11), the signal processing section 12 of the communication apparatus 10 continues the communication via the session A (Operations S7-1, S7-5, S7-12).

In response to the initiation of the switchover from the VNF 200(A) to the VNF 200(B), the packet processing section 32 of the virtual switch 2102 forwards the session A to both the VNFs 200(A) and (B) (Operations S7-6, S7-7). In FIG. 24, the sessions forwarded to the VNFs 200(A) and (B) are denoted as "SESSION A1" and "SESSION A2", respectively, but the "session A", "session A1", and "session A2" are substantially the same session. For example, the packet processing section 32 compares the session identification conditions in the management DB 31 and information in a received packet and forwards the packet to a forwarding destination corresponding to the session A. The packet processing section 32 refers to the management DB 31 and forwards the session A to the VNFs 200(A) and (B).

The signal processing function 202 of the VNF 200(A) forwards the packet received via the session A from the virtual switch 2102 to the VNF 200(B) (Operation S7-6).

In response to completion of the switchover from the VNF 200(A) to the VNF 200(B) (Operation S7-8), the resource control section 41 of the control apparatus 40 notifies the virtual switch 2102 of the completion of this switchover (Operation S7-9).

In response to reception of the completion notice from the resource control section 41 of the control apparatus 40, the control section 33 of the virtual switch 2102 causes the packet processing section 32 to send a packet indicating session termination (an end marker packet) to the VNF 200(A) (Operation S7-10).

The control function 201 of the VNF 200(A) causes the signal processing function 202 to forward the received end marker packet to the switchover-target VNF 200(B) (Operation S7-11).

In response to reception of the end marker packet from the VNF 200(A), the control function 201 of the VNF 200(B) shifts from an operation for receiving packets via the sessions A1 and A2 to an operation for receiving packets via the session A2, thus performing communication via the sessions A and A2 (Operation S7-12, S7-13).

4.5) Effects

As described above, according to the fourth exemplary embodiment, the control apparatus 40, on behalf of the communication apparatuses 10, sends control signals in association with their relevant switchover. Accordingly, control signals transmitted by the communication apparatuses 10 can be reduced, and the loads on the communication apparatuses 10 can be lightened.

5. FIFTH EXEMPLARY EMBODIMENT

A fifth exemplary embodiment of the present invention will be described with reference to drawings. The fifth exemplary embodiment is used to describe operational examples in a case where each embodiment described above is applied to 3GPP standard specifications (e.g., 3GPP TS23.401).

5.1) First Operational Example

Figure 25:
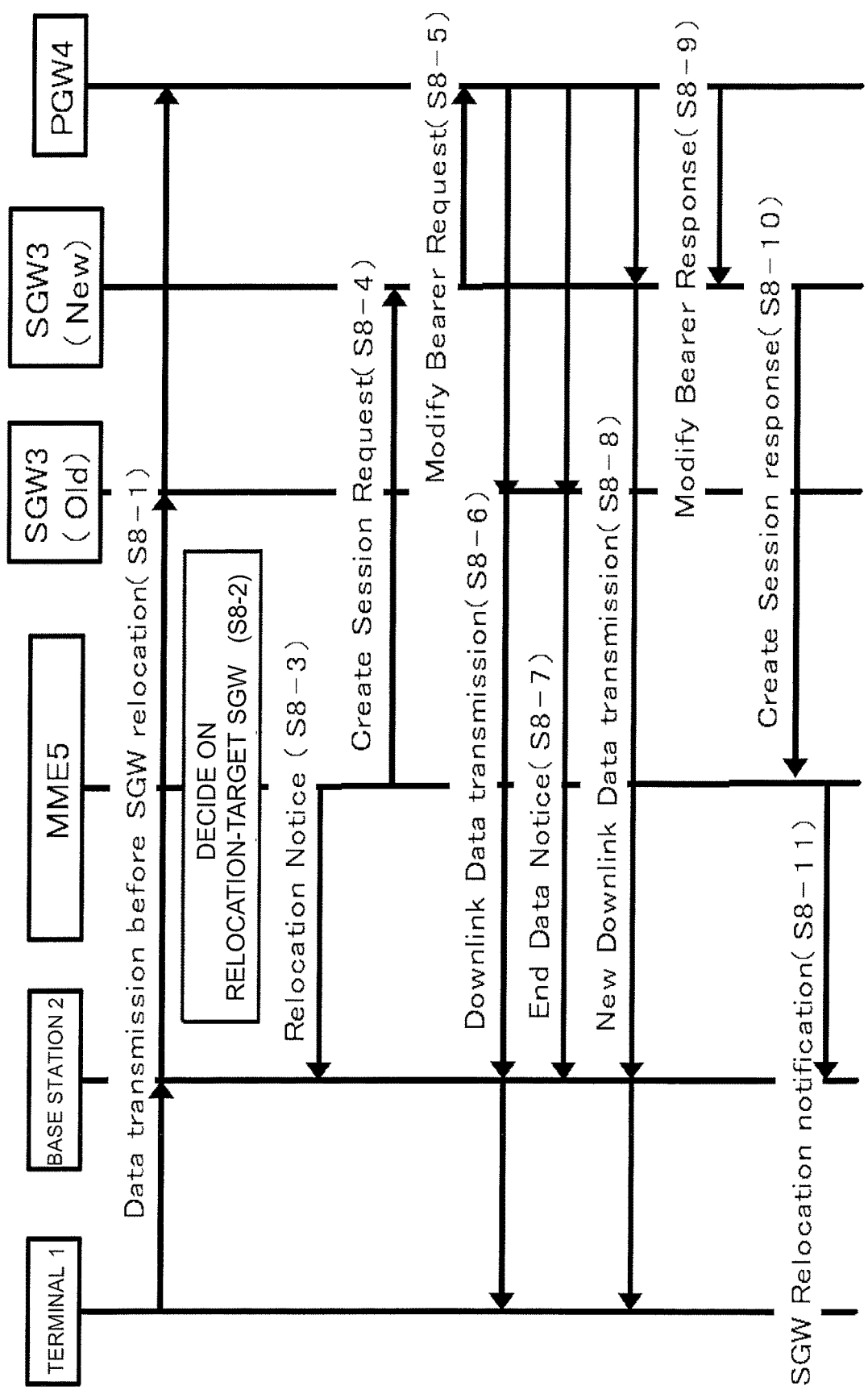
FIG. 25 is a sequence chart showing a first operational example of a communication system according to a fifth exemplary embodiment of the present invention.
Figure 26:
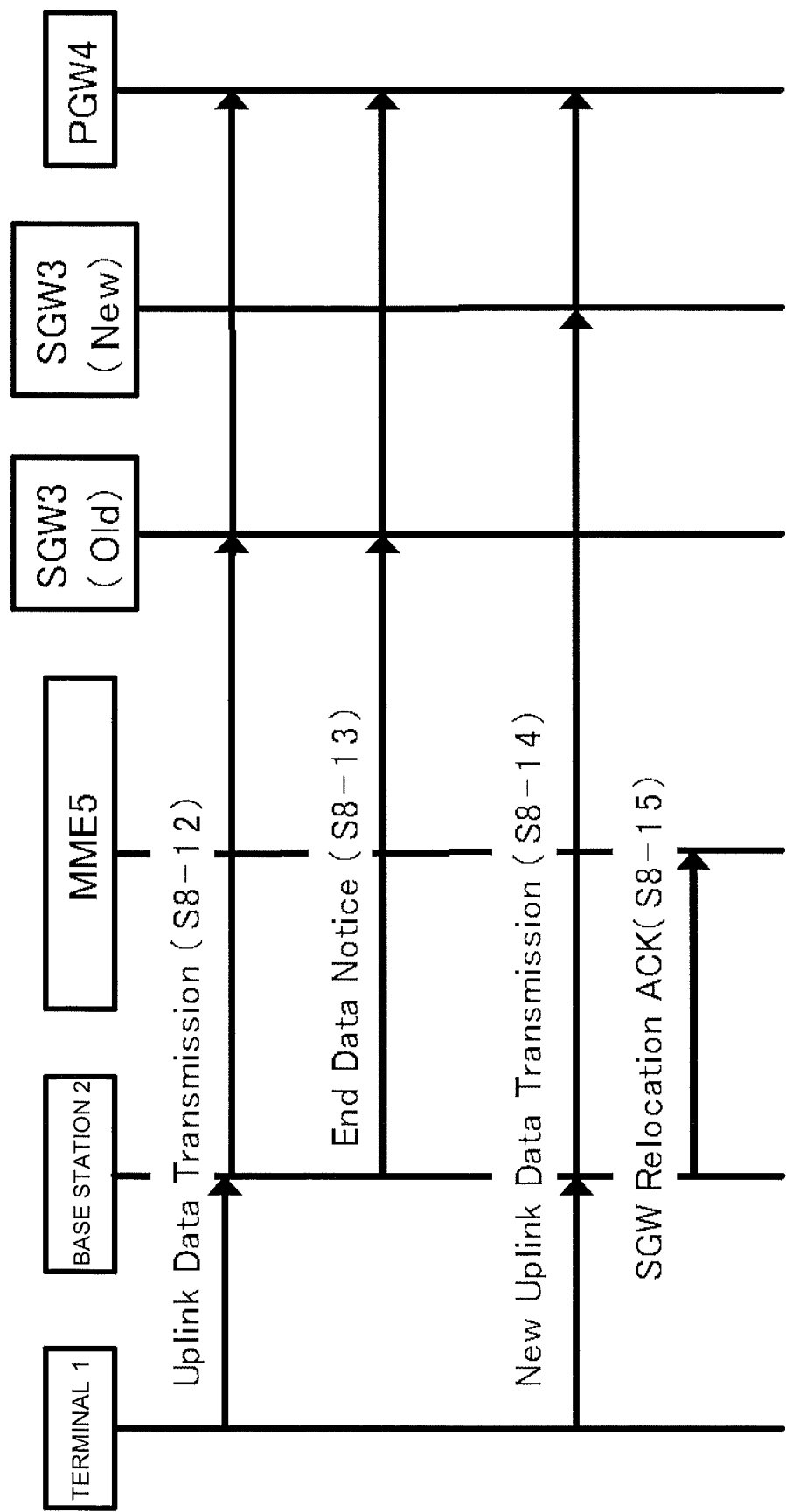
FIG. 26 is a sequence chart showing the first operational example of operation in the communication system according to the fifth exemplary embodiment.

FIGS. 25 and 26 show an example in a case where the present invention is applied to the sequence according to Section 5.10.4 of TS23.401 V12.4.0. Section 5.10.4 of TS23.401 V12.4.0 discloses a sequence in which MME triggers S-GW relocation.

First, before relocation between S-GWs 3, a terminal 1 performs communication with a P-GW 4 via a base station 2 and the S-GW 3 (Old), as illustrated in FIG. 25 (Operation S8-1).

An MME 5, when deciding on the relocation-target S-GW 3 (New) (Operation S8-2), notifies the base station 2 opposite to the S-GWs 3 of initiation of the relocation (Operation S8-3: Relocation Notice). In case the relocation-target S-GW 3 (New) is a VNF 200 operated on a virtual machine, the MME 5 issues "Relocation Notice", for example, in response to completion of VM activation.

Moreover, the MME 5 issues "Create Session Request" to the S-GW 3 (New) (Operation S8-4). The MME 5 notifies the S-GW 3 (New) of the address of the P-GW 4 and a tunnel ID (e.g., a TEID) for uplink communication and also the address of the base station 2 and a tunnel ID for downlink communication by using the "Create Session Request".

When receiving the "Create Session Request", the S-GW 3 (New) issues "Modify Bearer Request" to the P-GW 4 (Operation S8-5). The S-GW 3 (New) notifies the P-GW 4 of the address of the S-GW 3 (New) and a tunnel ID for downlink communication by using the "Modify Bearer Request".

During the switchover between paths for downlink communication (Operations S8-3 to S8-5), the base station 2 continues receiving downlink communication traffic via a path before the switchover (the path passing through the P-GW 4, S-GW 3 (Old), and base station 2) (Operation S8-6). Note that the base station 2 may receive the downlink communication traffic via both the above-mentioned path before switchover and the path after switchover (the path passing through the P-GW 4, S-GW 3 (New), and base station 2) while a path for downlink communication is being switched.

In response to completion of the switchover of the path for downlink communication (e.g., completion of Operation S8-5), the P-GW 4 sends a session termination notice ("End Data Notice") via the path before switchover. For example, in response to completion of the switchover of the path for downlink communication, the P-GW 4 sends a packet indicating session termination (an end marker packet) via the path before switchover.

In response to reception of the "End Data Notice", the base station 2 switches the path for receiving downlink packets from the path before switching to the path after switching (the path passing through the P-GW 4, S-GW 3 (New), and base station 2) and receives downlink data (Operation S8-8). For example, in response to reception of the end marker packet from the P-GW 4, the base station 2 switches the path for receiving downlink packets from the path before switching to the path after switching.

The P-GW 4 notifies the S-GW 3 (New) of a response ("Modify Bearer Response") to the "Modify Bearer Request" (Operation S8-9).

The S-GW 3 (New) notifies the MME 5 of the address of the S-GW 3 (New) and a tunnel ID for uplink communication by using "Create Session Response" (Operation S8-10).

The MME 5 notifies the base station 2 of the address of the S-GW 3 (New) and the tunnel ID for uplink communication by using "S-GW Relocation Notification" (Operation S8-11).

While performing the switchover between paths for uplink communication (Operations S8-9 to S8-11), the P-GW 4 receives uplink communication traffic via a path before switchover (a path passing through the base station 2, S-GW 3 (Old), and P-GW 4), as illustrated in FIG. 26 (Operation S8-12). Note that the P-GW 4 may receive the uplink communication traffic via both the above-mentioned path before switchover and a path after switchover (a path passing through the base station 2, S-GW 3 (New), and P-GW 4) while a path for uplink communication is being switched.

In response to completion of the switchover of the path for uplink communication (e.g., completion of Operation S8-11), the base station 2 sends a session termination notice ("End Data Notice") via the path before switchover (the path passing through the base station 2, S-GW 3 (Old), and P-GW 4) (Operation S8-13). For example, in response to completion of the switchover of the path for uplink communication, the base station 2 sends a packet indicating session termination (an end marker packet) via the path before switchover.

In response to reception of the "End Data Notice", the P-GW 4 switches the path for receiving uplink packets from the path before switchover to the path after switchover (the path passing through the base station 2, S-GW 3 (New), and P-GW 4) and receives uplink data (Operation S8-14). For example, in response to reception of the end marker packet from the base station 2, the P-GW 4 switches the path for receiving uplink packets from the path before switchover to the path after switchover.

The base station 2 sends "S-GW 4 Relocation ACK" to the MME 5 (Operation S8-15).

5.2) Second Operational Example

Figure 27:
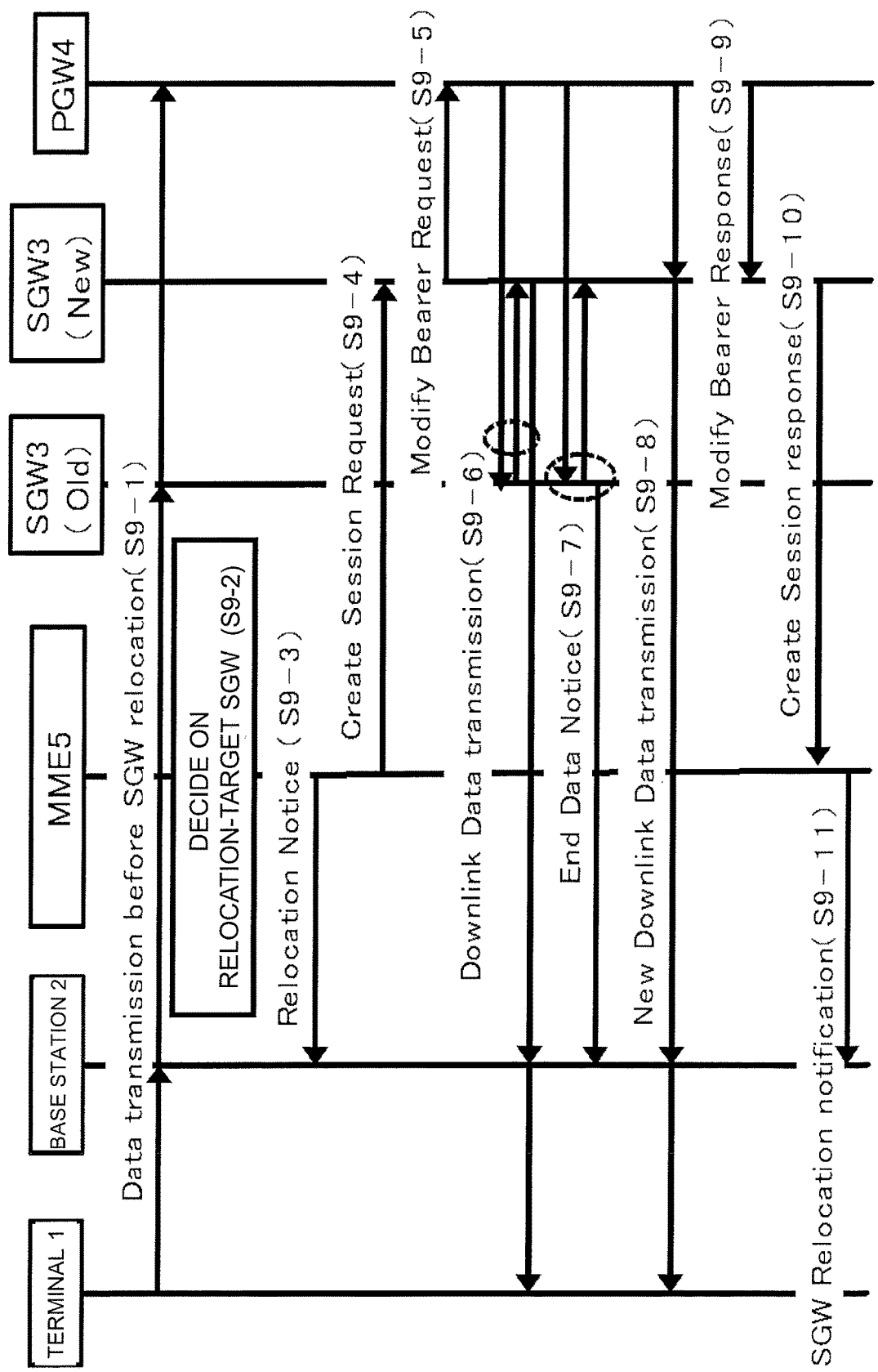
FIG. 27 is a sequence chart showing a second operational example of the communication system according to the fifth exemplary embodiment.
Figure 28:
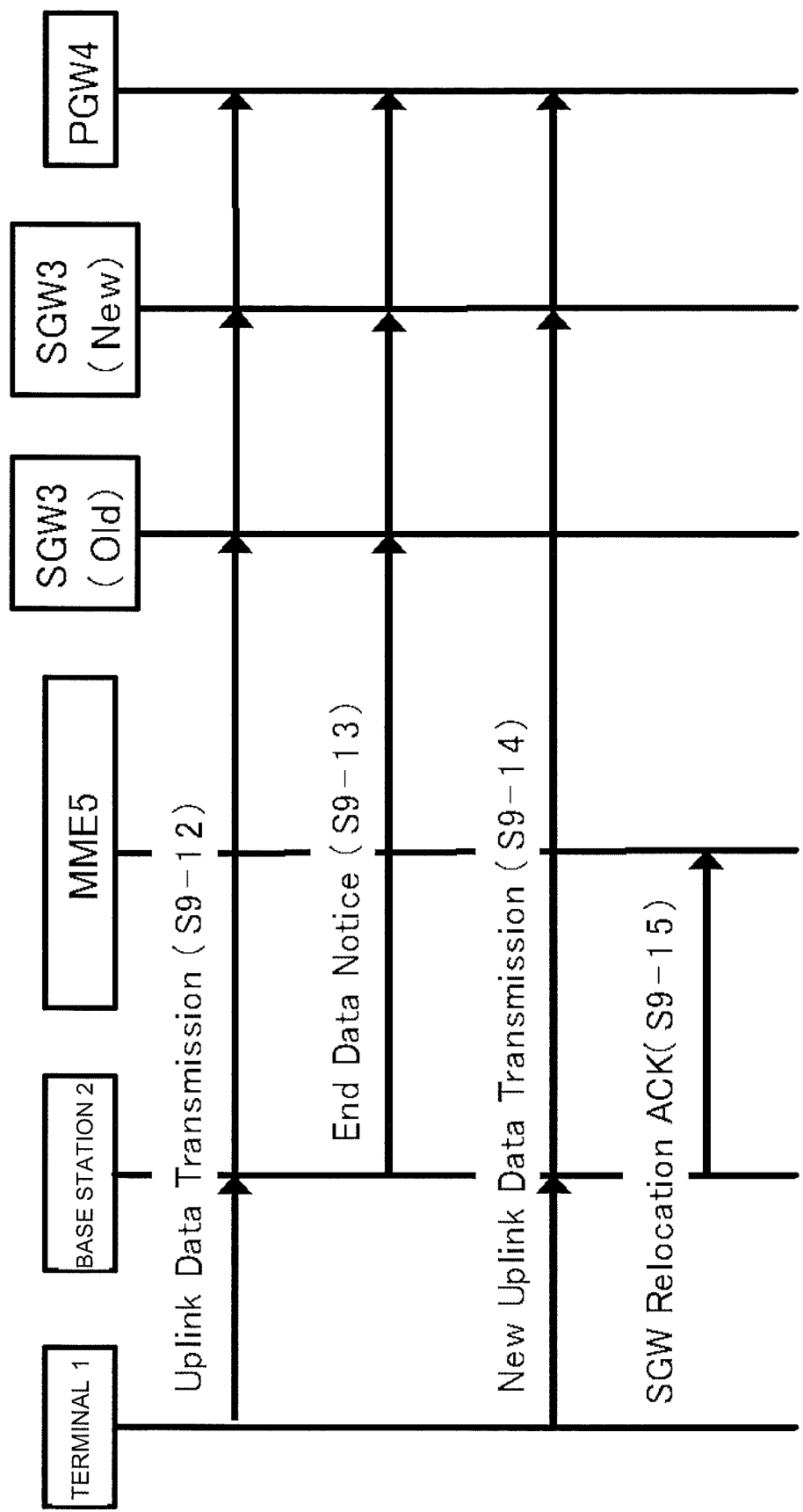
FIG. 28 is a sequence chart showing the second operational example of the communication system according to the fifth exemplary embodiment.

A second operational example shown in FIGS. 27 and 28 is different from the first operational example shown in FIGS. 25 and 26 in traffic path during gateway switchover and the transmission path of "End Data Notice". Note that the second operational example is similar to the first operational example except that Operations S9-6, S9-7, S9-12, and S9-13 are different, and therefore a detailed description of similar operations will be omitted.

Referring to FIG. 27, while switchover of the path for downlink communication is being performed (Operations S9-3 to S9-5), the base station 2 receives downlink communication traffic via a path passing through the P-GW 4, S-GW 3 (Old), S-GW 3 (New), and base station 2 (Operation S9-6). Note that the base station 2 may receive the downlink communication traffic via both the above-mentioned path and a path passing through the P-GW 4, S-GW 3 (New), and base station 2 while the switchover of the path for downlink communication is being performed.

In response to completion of the switchover of the path for downlink communication (e.g., completion of Operation S9-5), the P-GW 4 sends a session termination notice ("End Data Notice") via the path passing through the P-GW 4, S-GW 3 (Old), S-GW 3 (New), and base station 2 (Operation S9-7). For example, in response to completion of the switchover of the path for downlink communication, the P-GW 4 sends a packet indicating session termination (an end marker packet) via the path passing through the P-GW 4, S-GW 3 (Old), S-GW 3 (new), and base station 2.

Referring to FIG. 28, while switchover of the path for uplink communication is being performed (Operations S9-9 to S9-11), the P-GW 4 receives uplink communication traffic via a path passing through the base station 2, S-GW 3 (Old), S-GW 3 (New), and P-GW 4 (Operation S9-12). Note that the P-GW 4 may receive the uplink communication traffic via both the above-mentioned path and a path after switchover (a path passing through the base station 2, S-GW 3 (New), and P-GW 4) while the switchover of the path for uplink communication is being performed.

In response to completion of the switchover of the path for uplink communication (e.g., completion of Operation S9-11), the base station 2 sends a session termination notice ("End Data Notice") via the path passing through the base station 2, S-GW 3 (Old), S-GW 3 (New), and P-GW 4 (Operation S9-13). For example, in response to completion of the switchover of the path for uplink communication, the base station 2 sends a packet indicating session termination (an end marker packet) via the path passing through the base station 2, S-GW 3 (Old), S-GW 3 (New), and P-GW 4.

5.3) Third Operational Example

Figure 29:
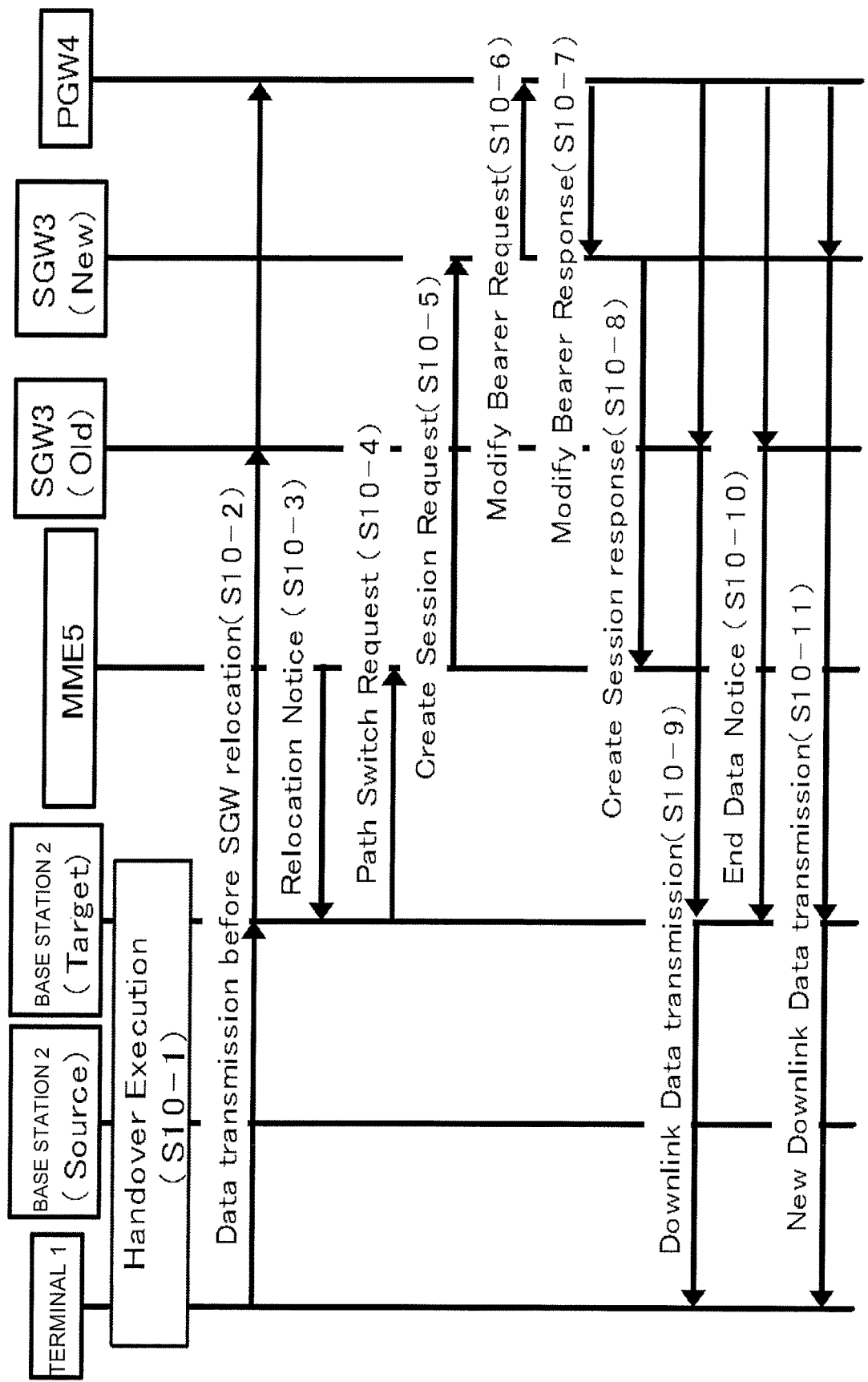
FIG. 29 is a sequence chart showing a third operational example of the communication system according to the fifth exemplary embodiment.
Figure 30:
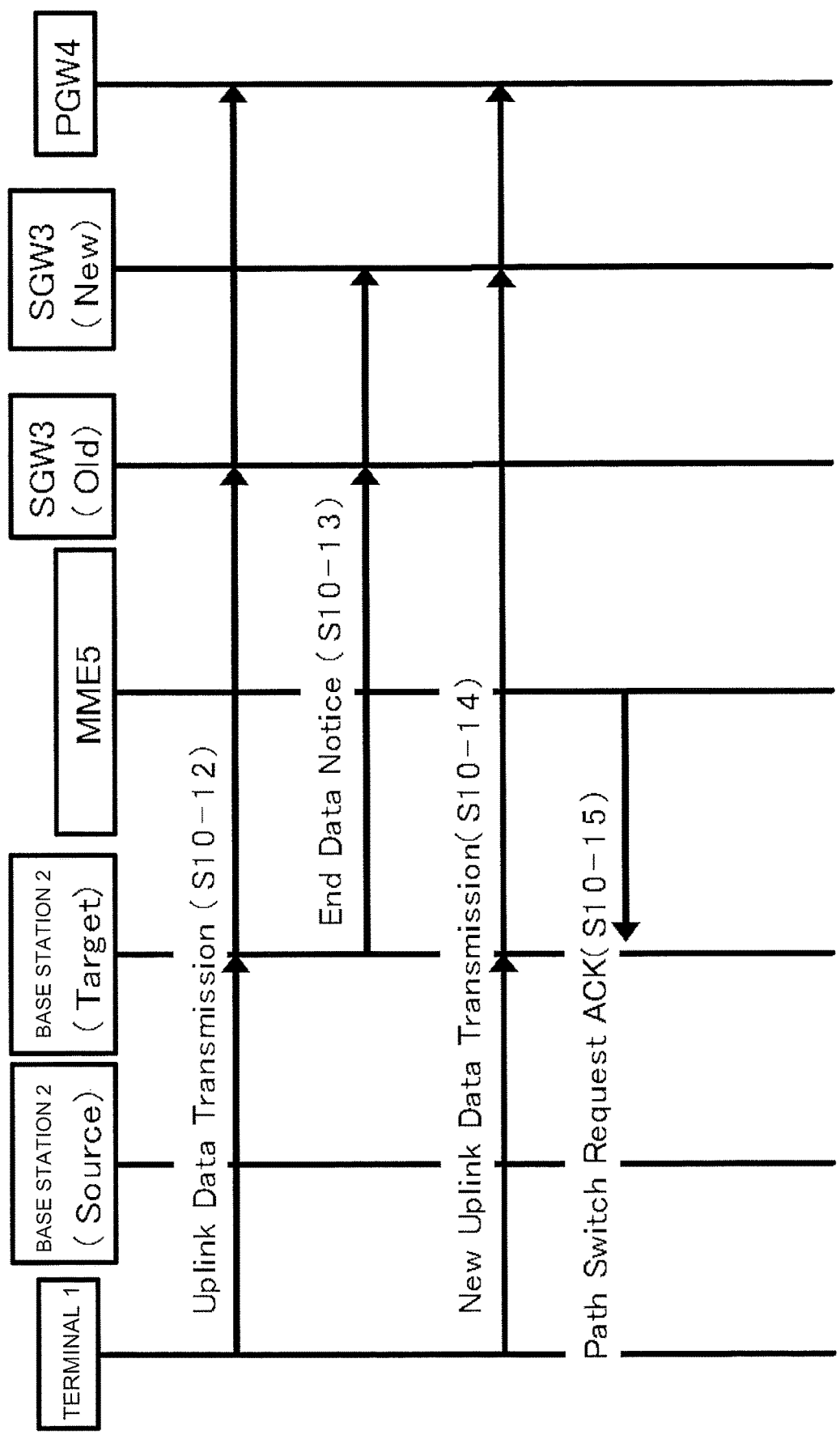
FIG. 30 is a sequence chart showing the third operational example of the communication system according to the fifth exemplary embodiment.

FIGS. 29 and 30 illustrate a sequence in a case where the present invention is applied to the sequence according to Section 5.5.1.1.3 of TS23.401 V12.4.0. Section 5.5.1.1.3 of TS23.401 V12.4.0 discloses a sequence in which S-GW relocation is triggered by X2-based handover.

Referring to FIG. 29, it is assumed that the terminal 1 performs X2-based handover between a base station 2 (Source) and a base station 2 (Target) (Operation S10-1).

After the X2-based handover has been executed, if before the switchover of S-GW 3, the terminal 1 sends uplink data to the P-GW 4 via a path before switchover (a path passing through the base station 2 (Target) and S-GW 3 (Old)) (Operation S10-2).

The MME 5 sends a switchover initiation message (Relocation Notice) to the base station 2 (Target) that is a base station opposite to the S-GWs 3 (Operation S10-3). In case the relocation-target S-GW 3 (New) is a VNF 200 operated on a virtual machine, the MME 5 notifies "Relocation Notice", for example, in response to completion of VM activation.

The base station 2 (Target) sends "Path Switch Request" to the MME 5 (Operation S10-4). With the "Path Switch Request", the base station 2 (Target) can notify the MME 5 that the cell where the terminal 1 (UE: User Equipment) is staying has been changed.

The MME 5 sends "Create Session Request" to the S-GW 3 (New) (Operation S10-5). With the "Create Session Request", the MME 5 can notify the S-GW 3 (New) of the address of the P-GW 4 and a tunnel ID for uplink communication and also the address of the base station 2 and a tunnel ID for downlink communication.

The S-GW 3 (New) sends "Modify Bearer Request" to the P-GW 4 (Operation S10-6). With the "Modify Bearer Request", the S-GW 3 (New) can notify the P-GW 4 of the address of the S-GW 3 (New) and a tunnel ID for downlink communication.

The P-GW 4 notifies the S-GW 3 (New) of a response ("Modify Bearer Response") to the "Modify Bearer Request" (Operation S10-7).

When receiving the "Modify Bearer Response", the S-GW 3 (New) notifies the MME 5 of the address of the S-GW 3 (New) and a tunnel ID for uplink communication by using "Create Session Response" (Operation S10-8).

While the switchover of the communication path is being performed (Operations S10-3 to S10-8), the base station 2 receives downlink communication traffic via a path before switchover (a path passing through the P-GW 4, S-GW 3 (Old), and base station 2 (Target)) (Operation S10-9). Note that the base station 2 may receive the downlink communication traffic via both the above-mentioned path before switchover and a path after switchover (a path passing through the P-GW 4, S-GW 3 (New), and base station 2 (Target)) while the switchover of the communication path is being performed.

In response to completion of the communication path switching (e.g., completion of Operation S10-7), the P-GW 4 sends a session termination notice ("End Data Notice") via the path before switchover (the path passing through the P-GW 4, S-GW 3 (Old), and base station 2 (Target)) (Operation S10-10). For example, in response to completion of the communication path switchover, the P-GW 4 sends a packet indicating session termination (an end marker packet) via the path before switchover.

In response to reception of the "End Data Notice", the base station 2 (Target) switches the path for receiving downlink packets from the path before switchover to the path after switchover and receives new downlink data (Operation S10-11). For example, in response to reception of the end marker packet from the P-GW 4, the base station 2 (Target) switches the path for receiving downlink packets from the path before switchover to the path after switchover.

Referring to FIG. 30, while switchover of the communication path is being performed (e.g., Operations S10-3 to S10-8), the P-GW 4 receives uplink communication traffic via the path before switchover (the path passing through the base station 2 (Target), S-GW 3 (Old), and P-GW 4) (Operation S10-12). Note that the P-GW 4, for example, may receive the uplink communication traffic via both the above-mentioned path before switchover and a path after switchover (a path passing through the base station 2 (Target), S-GW 3 (New), and P-GW 4) while the switchover of the communication path is being performed.

In response to completion of the communication path switchover (e.g., completion of Operation S10-8 or reception of the "End Data Notice" (Operation S10-10)), the base station 2 (Target) sends a session termination notice ("End Data Notice") via the path before switchover (the path passing through the base station 2 (Target), S-GW 3 (Old), and P-GW 4) (Operation S10-13). For example, in response to completion of the communication path switchover, the base station 2 (Target) sends a packet indicating session termination (an end marker packet) via the path before switchover.

In response to reception of the "End Data Notice", the P-GW 4 switches the path for receiving uplink packets from the path before switchover to the path after switchover (the path passing through the base station 2 (Target), S-GW 3 (New), and P-GW 4) and receives new uplink data (Operation S10-14). For example, in response to reception of the end marker packet, the P-GW 4 switches the path for receiving uplink packets from the path before switchover to the path after switchover.

The MME 5 notifies "Path Switch Request ACK" to the base station 2 (Target) (Operation S10-15).

5.4) Fourth Operational Example

Figure 31:
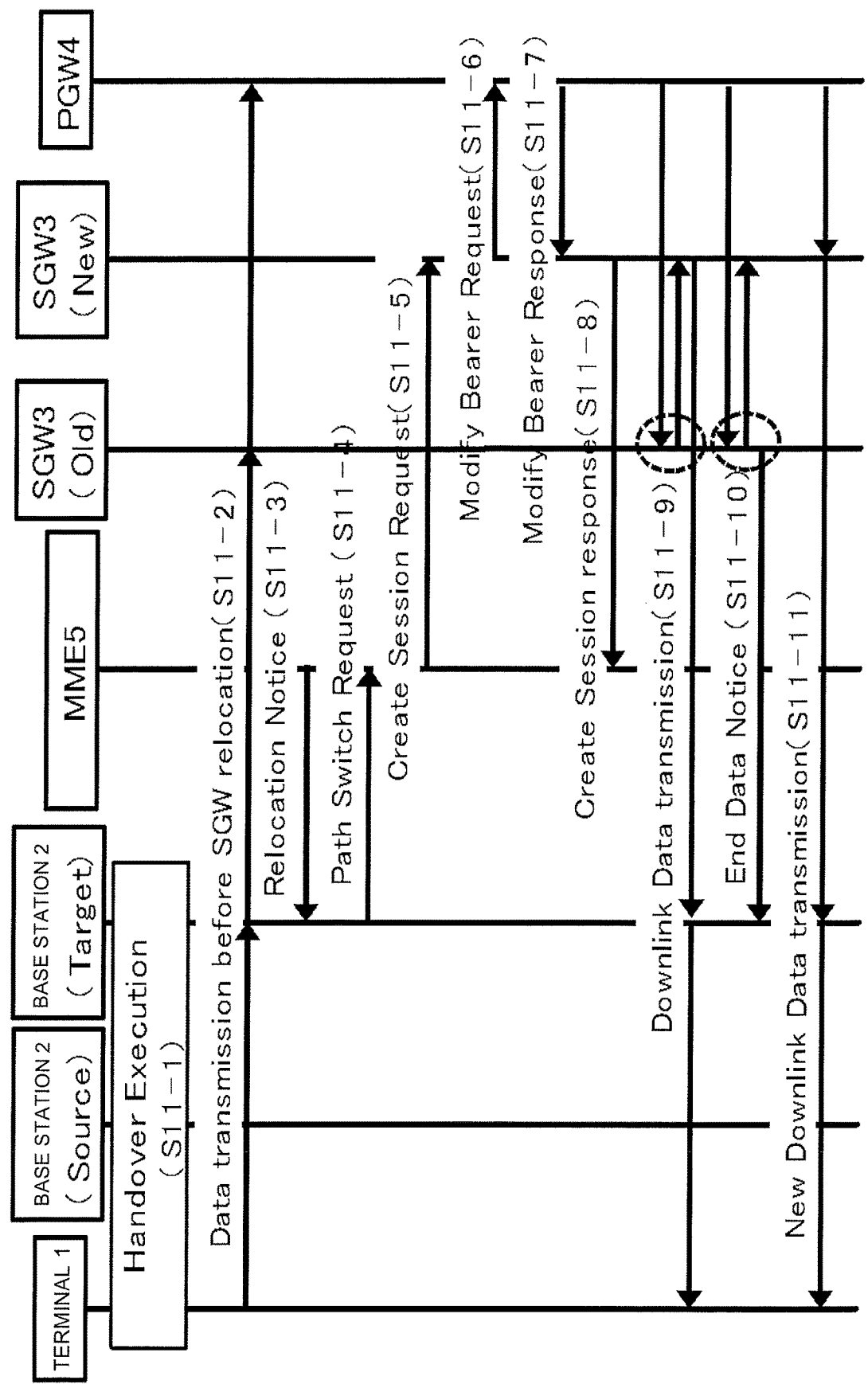
FIG. 31 is a sequence chart showing a fourth operational example of the communication system according to the fifth exemplary embodiment.
Figure 32:
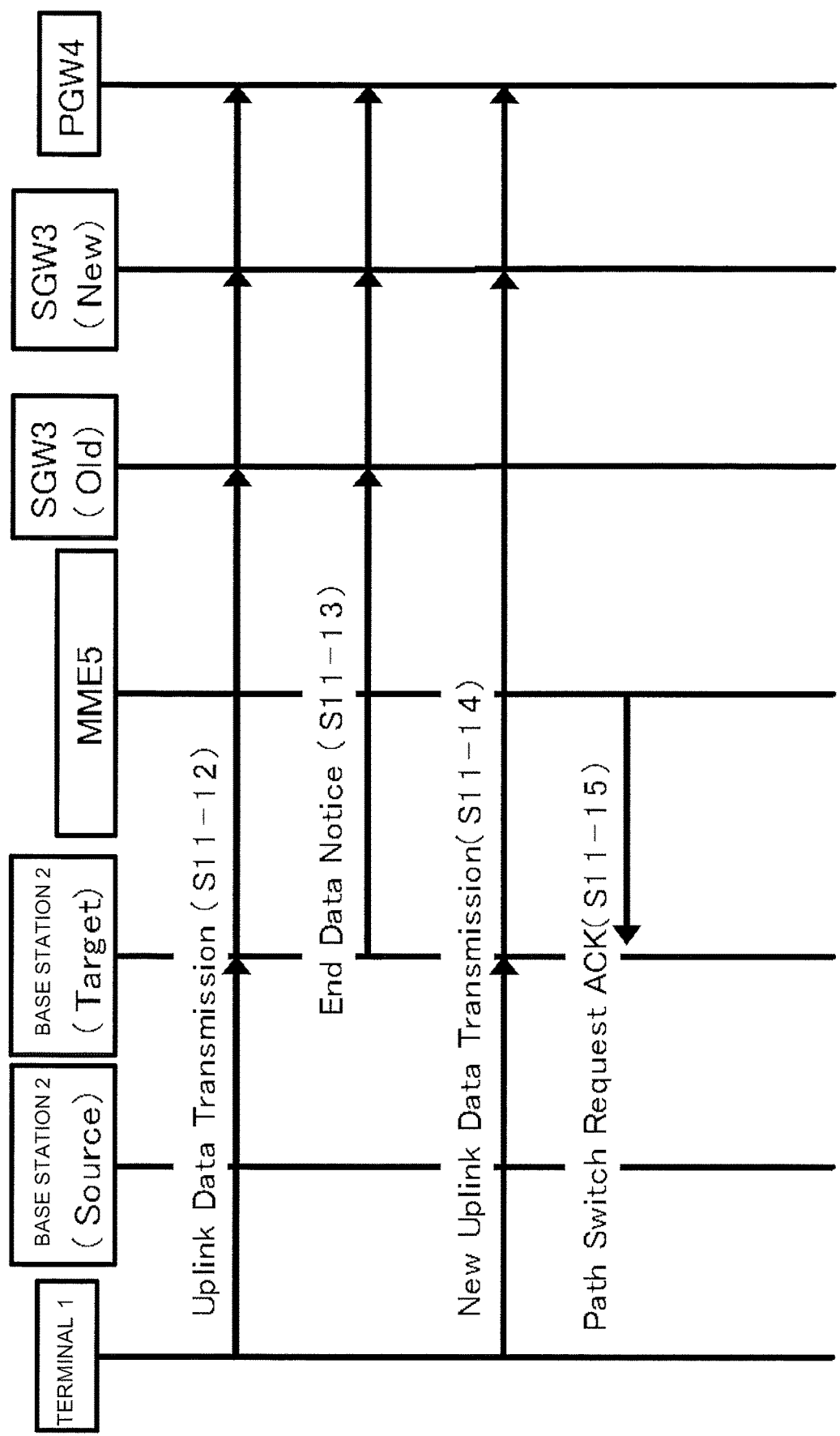
FIG. 32 is a sequence chart showing the fourth operational example of the communication system according to the fifth exemplary embodiment.

A fourth operational example shown in FIGS. 31 and 32 is different from the above-described third operational example (FIGS. 29 and 30) in the path of traffic during gateway switchover and the path for transmitting "End Data Notice". Note that the fourth operational example shown in FIGS. 31 and 32 is similar to the third operational example except that Operations S11-9, S11-10, S11-12, and S11-13 are different, and therefore a detailed description of operations similar to the third operational example (FIGS. 29 and 30) will be omitted.

Referring to FIG. 31, while switchover of the path for downlink communication is being performed (e.g., Operations S11-3 to S11-8), the base station 2 receives downlink communication traffic via a path passing through the P-GW 4, S-GW 3 (Old), S-GW 3 (New), and base station 2 (Operation S11-9). Note that the base station 2 may receive the downlink communication traffic via both the above-mentioned path and a path after switchover (a path passing through the P-GW 4, S-GW 3 (New), and base station 2) while the switchover of the path for downlink communication is being performed.

In response to completion of the switchover of the path for downlink communication (e.g., completion of Operation S11-7), the P-GW 4 sends a session termination notice ("End Data Notice") via the path passing through the P-GW-4, S-GW 3 (Old), S-GW 3 (New), and base station 2 (Operation S11-10). For example, in response to completion of the switchover of the path for downlink communication, the P-GW 4 sends a packet indicating session termination (an end marker packet) via the path passing through the P-GW 4, S-GW 3 (Old), S-GW 3 (New), and base station 2.

Referring to FIG. 32, while switchover of the path for uplink communication continues (Operations S11-3 to S11-8), the P-GW 4 receives uplink communication traffic via a path passing through the base station 2, S-GW 3 (Old), S-GW 3 (New), and P-GW 4 (Operation S11-12). Note that the P-GW 4 may receive the uplink communication traffic via both the above-mentioned path and a path after switchover (a path passing through the base station 2, S-GW 3 (New), and P-GW 4) while he switchover of the path for uplink communication is being performed.

In response to completion of the switchover of the path for uplink communication (e.g., completion of Operation S11-8, reception of "End Data Notice" (Operation S11-10)), the base station 2 sends a session termination notice ("End Data Notice") via the path passing through the base station 2, S-GW 3 (Old), S-GW 3 (New), and P-GW 4 (Operation S11-13). For example, in response to completion of the switchover of the path for uplink communication, the base station 2 sends a packet indicating session termination (an end marker packet) via the path passing through the base station 2, S-GW 3 (Old), S-GW 3 (New), and P-GW 4.

5.5) Fifth Operational Example

FIGS. 33 to 37 show operational examples in a case where the present invention is applied to the technique for updating a partial bearer included in an EPS (Evolved Packet System) bearer configured in a communication system.

Various types of bearers (S5/S8 bearer and the like) included in an EPS bearer are configured in a communication system through the "Attach Procedure" disclosed in Section 5.3.2 of 3GPP TS23.401 V12.4.0. However, when a communication apparatus 10 (S-GW 3, P-GW 4, or the like) through which the bearer passes is changed due to resource installation or the like, the "Initial Attach" procedure disclosed in Section 5.3.2.1 is re-performed to configure a new bearer corresponding to a communication apparatus 10 after change. If the "Initial Attach" is re-performed, various impacts on communication services are expected, such as a disruption of the communication services.

Accordingly, in the fifth operational examples shown in FIGS. 33 to 37, a partial bearer included in an EPS bearer is updated. For example, when a resource of the communication system is installed (installation of a network node or the like), a bearer related to the installed resource is updated. In the case where a partial bearer included in the EPS bearer is updated, re-execution of the bearer configuration procedure allows a disruption of the communication services and the like to be avoided.

However, a packet may be lost when a bearer is partially updated. For example, if a bearer is switched before communication via the switchover-source bearer is terminated, a packet transmitted via the switchover-source bearer is not forwarded to a switchover-target communication apparatus 10, resulting in possible packet losses.

Accordingly, in the fifth operational examples, the switchover-target communication apparatus 10 switches a bearer in response to reception of a notice indicating that communication via the switchover-source bearer has been terminated. With this configuration, packet loss due to bearer switchover can be avoided.

5.5.1) First Example

Figure 33:
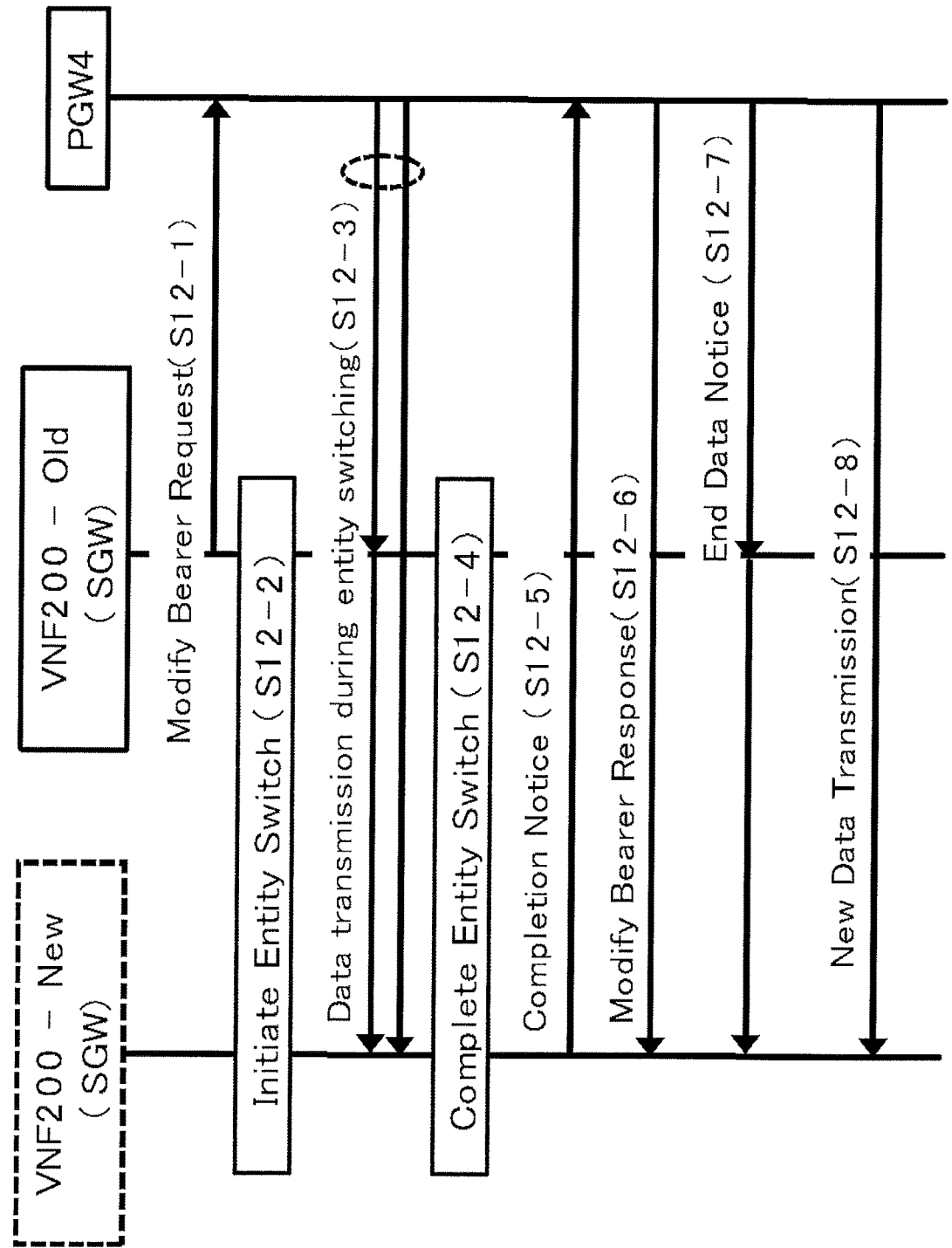
FIG. 33 is a sequence chart showing a first example of a fifth operational example of the communication system according to the fifth exemplary embodiment.

FIG. 33 shows an operational example in a case where S-GW (VNF 200) operated on a virtual machine is switched over.

When a VNF 200 (Old) is switched over to a VNF 200 (New), for example, the control function 201 of the VNF 200 (Old) initiates that switchover. In this case, the VNF 200 (Old) notifies the P-GW 4 of, for example, the address of the VNF 200 (New) and a tunnel ID after switchover by using "Modify Bearer Request" (Operation S12-1).

While the switchover between the VNF 200 (Old) and VNF 200 (New) is being performed (Operations S12-2 to S12-4), traffic from the P-GW 4 is transmitted, for example, via both a path before switchover and a path after switchover (Operation S12-3).

In response to completion of the switchover between the VNF 200 (Old) and VNF 200 (New) (Operation S12-4), the VNF 200 (New) notifies the P-GW 4 of a switchover completion notice ("Completion Notice") (Operation S12-5).

The P-GW 4 notifies the VNF 200 (New) of a response ("Modify Bearer Response") to the "Modify Bearer Request" (Operation S12-6).

In response to reception of the "Completion Notice", the P-GW 4 notifies "End Data Notice" via the path before switchover (Operation S12-7). For example, in response to reception of the "Completion Notice", the P-GW 4 sends a packet indicating session termination (an end marker packet) via the path before switchover.

In response to reception of the "End Data Notice", the VNF 200 (New) switches the path for receiving packets from the path before switchover to the path after switchover and receives new downlink data (Operation S12-8). For example, in response to reception of the end marker packet from the P-GW 4, the VNF 200 (New) switches the path for receiving packets from the path before switchover to the path after switchover.

5.5.2) Second Example

Figure 34:
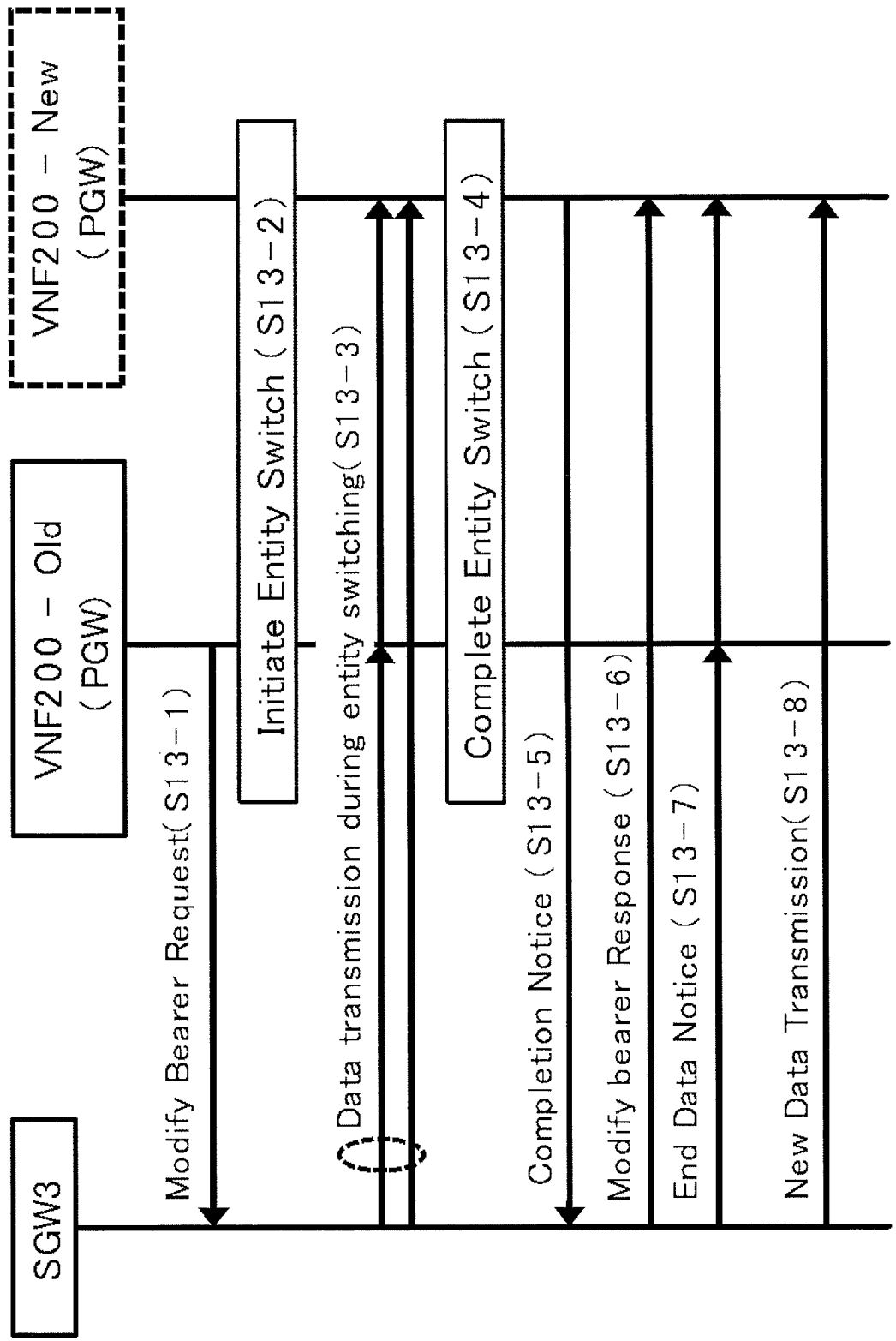
FIG. 34 is a sequence chart showing a second example of the fifth operational example of the communication system according to the fifth exemplary embodiment.

FIG. 34 shows an operational example in a case where P-GW (VNF 200) operated on a virtual machine is switched.

When a VNF 200 (Old) is switched to a VNF 200 (New), for example, the control function 201 of the VNF 200 (Old) initiates that switchover. In this case, the VNF 200 (Old) notifies the S-GW 3 of, for example, the address of the VNF 200 (New) and a tunnel ID after switchover by using "Modify Bearer Request" (Operation S13-1).

While the switchover between the VNF 200 (Old) and VNF 200 (New) is being performed (Operations S13-2 to S13-4), traffic from the S-GW 3 is transmitted via both a path before switchover and a path after switchover (Operation S13-3).

In response to completion of the switchover between the VNF 200 (Old) and VNF 200 (New) (Operation S13-4), the VNF 200 (New) notifies the S-GW 3 of a switchover completion notice ("Completion Notice") (Operation S13-5).

The S-GW 3 notifies the VNF 200 (New) of a response ("Modify Bearer Response") to the "Modify Bearer Request" (Operation S13-6).

In response to reception of the "Completion Notice", the S-GW 3 notifies "End Data Notice" via the path before switchover (Operation S13-7). For example, in response to reception of the "Completion Notice", the S-GW 3 sends a packet indicating session termination (an end marker packet) via the path before switchover.

In response to reception of the "End Data Notice", the VNF 200 (New) switches the path for receiving packets from the path before switchover to the path after switchover and receives new data (Operation S13-8). For example, in response to reception of the end marker packet from the S-GW 3, the VNF 200 (New) switches the path for receiving packets from the path before switchover to the path after switchover.

5.5.3) Third Example

Figure 35:
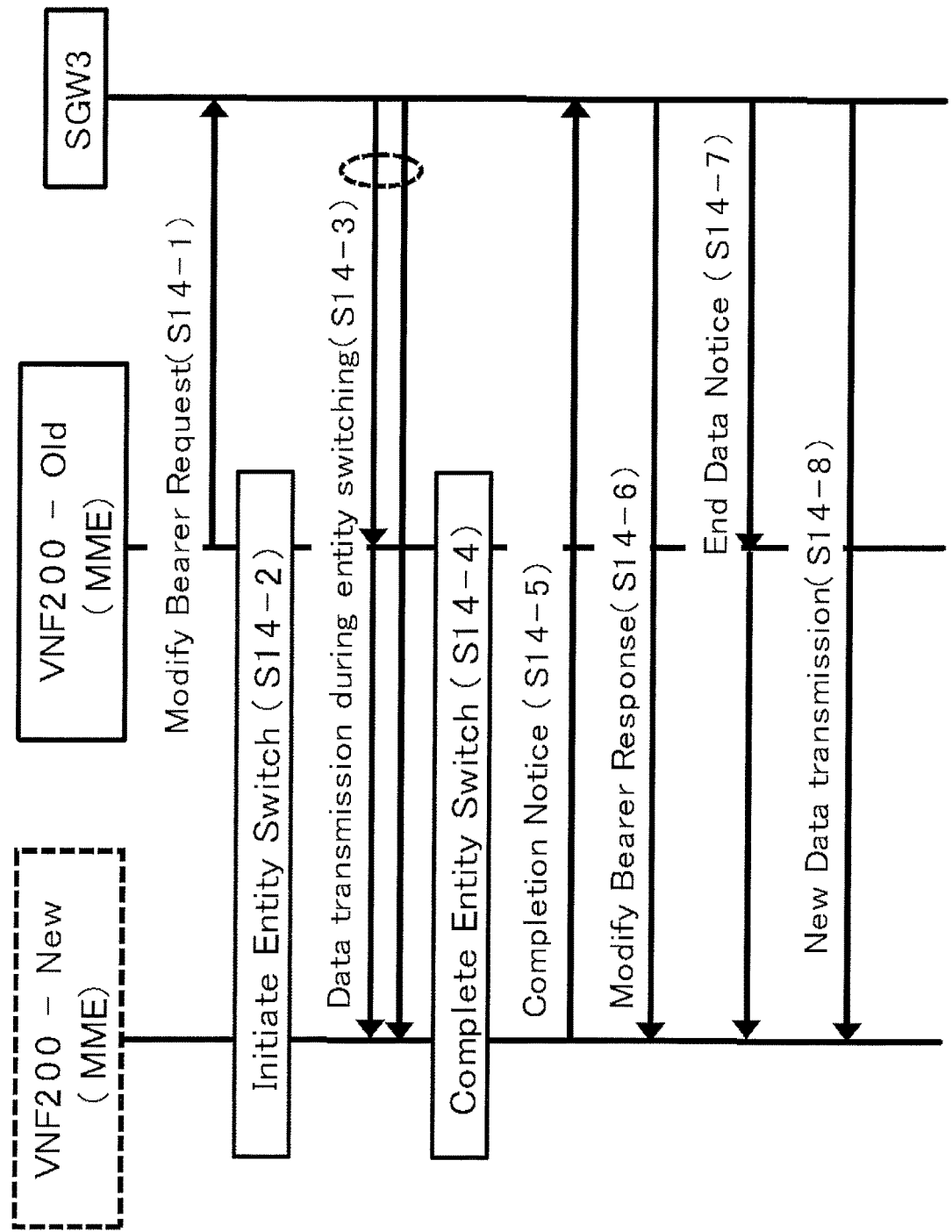
FIG. 35 is a sequence chart showing a third example of the fifth operational example of the communication system according to the fifth exemplary embodiment.

FIG. 35 shows a sequence between MME and S-GW in a case where MME (VNF 200) operated on a virtual machine is switched.

When a VNF 200 (Old) is switched to a VNF 200 (New), for example, the control function 201 of the VNF 200 (Old) initiates that switchover. In this case, the VNF 200 (Old) notifies the S-GW 3 of the address of the VNF 200 (New) after switchover by using "Modify Bearer Request" (Operation S14-1).

While the switchover between the VNF 200 (Old) and VNF 200 (New) is being performed (Operations S14-2 to S14-4), traffic from the S-GW 3 is transmitted via both a path before switchover and a path after switchover (Operation S14-3).

In response to completion of the switchover between the VNF 200 (Old) and VNF 200 (New) (Operation S14-4), the VNF 200 (New) notifies the S-GW 3 of a switchover completion notice ("Completion Notice") (Operation S14-5).

The S-GW 3 notifies the VNF 200 (New) of a response ("Modify Bearer Response") to the "Modify Bearer Request" (Operation S14-6).

In response to reception of the "Completion Notice", the S-GW 3 notifies "End Data Notice" via the path before switchover (Operation S14-7). For example, in response to reception of the "Completion Notice", the S-GW 3 sends a packet indicating session termination (an end marker packet) via the path before switchover.

In response to reception of the "End Data Notice", the VNF 200 (New) switches the path for receiving packets from the path before switchover to the path after switchover and receives new data (Operation S14-8). For example, in response to reception of the end marker packet from the S-GW 3, the VNF 200 (New) switches the path for receiving packets from the path before switchover to the path after switchover.

5.5.4) Fourth Example

Figure 36:
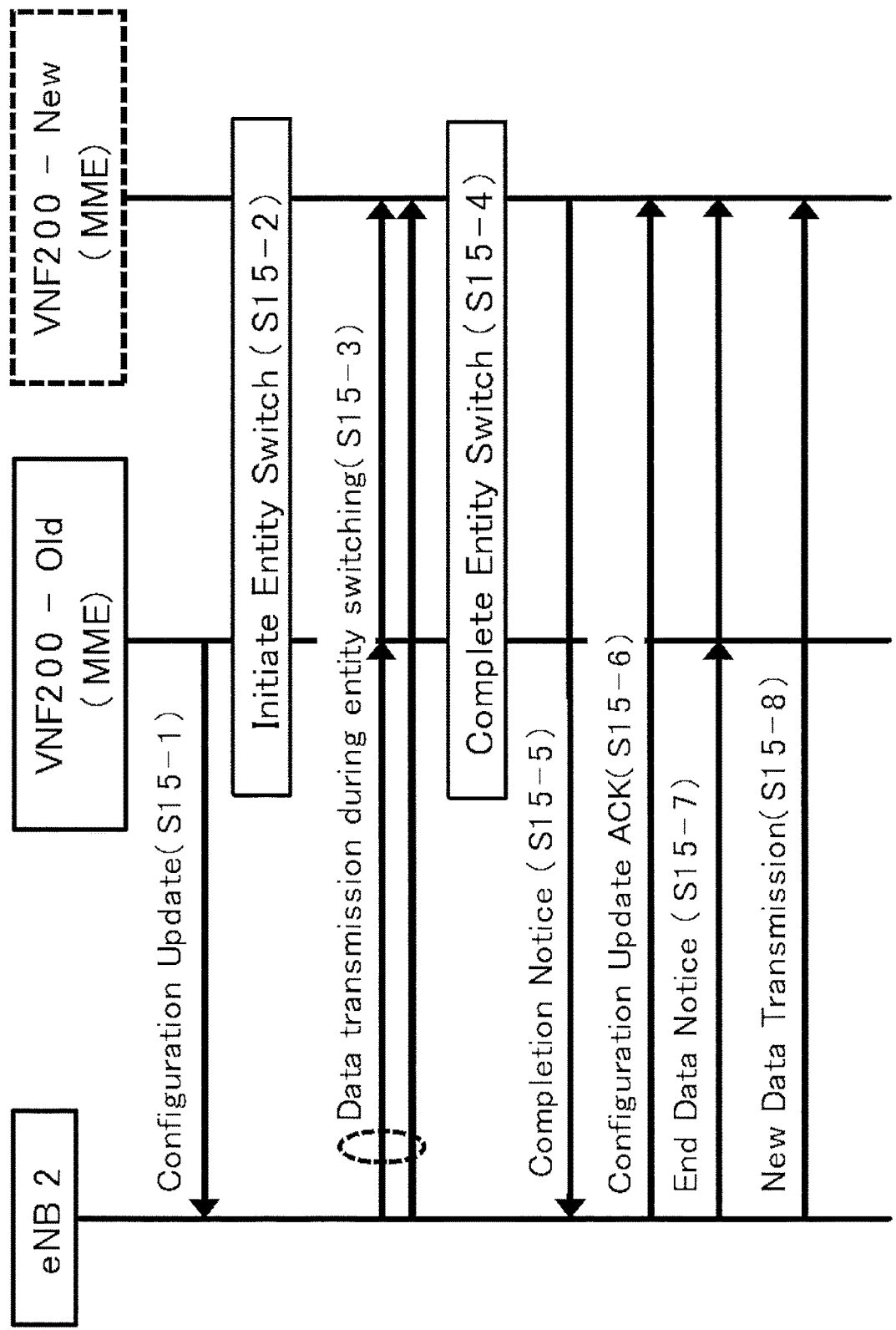
FIG. 36 is a sequence chart showing a fourth example of the fifth operational example of the communication system according to the fifth exemplary embodiment.

FIG. 36 shows a sequence between MME and base station eNB in a case where MME (VNF 200) operated on a virtual machine is switched.

When a VNF 200 (Old) is switched to a VNF 200 (New), for example, the control function 201 of the VNF 200 (Old) initiates that switchover. In this case, the VNF 200 (Old) notifies the eNB (base station) 2 of the address of the VNF 200 (New) after switchover by using "Configuration Update" (Operation S15-1).

While the switchover between the VNF 200 (Old) and VNF 200 (New) is being performed (Operations S15-2 to S15-4), traffic from the eNB 2 is transmitted via both a path before switchover and a path after switchover (Operation S15-3).

In response to completion of the switchover between the VNF 200 (Old) and VNF 200 (New) (Operation S15-4), the VNF 200 (New) notifies the eNB 2 of a switchover completion notice ("Completion Notice") (Operation S15-5).

The eNB 2 notifies the VNF 200 (New) of a response ("Completion Update ACK") to the "Completion Notice" (Operation S 15-6).

In response to reception of the "Completion Notice", the eNB 2 notifies "End Data Notice" via the path before switchover (Operation S15-7). For example, in response to reception of the "Completion Notice", the eNB 2 sends a packet indicating session termination (an end marker packet) via the path before switchover.

In response to reception of the "End Data Notice", the VNF 200 (New) switches the path for receiving packets from the path before switchover to the path after switchover and receives new data (Operation S15-8). For example, in response to reception of the end marker packet from the eNB 2, the VNF 200 (New) switches the path for receiving packets from the path before switchover to the path after switchover.

5.5.5) Fifth Example

Figure 37:
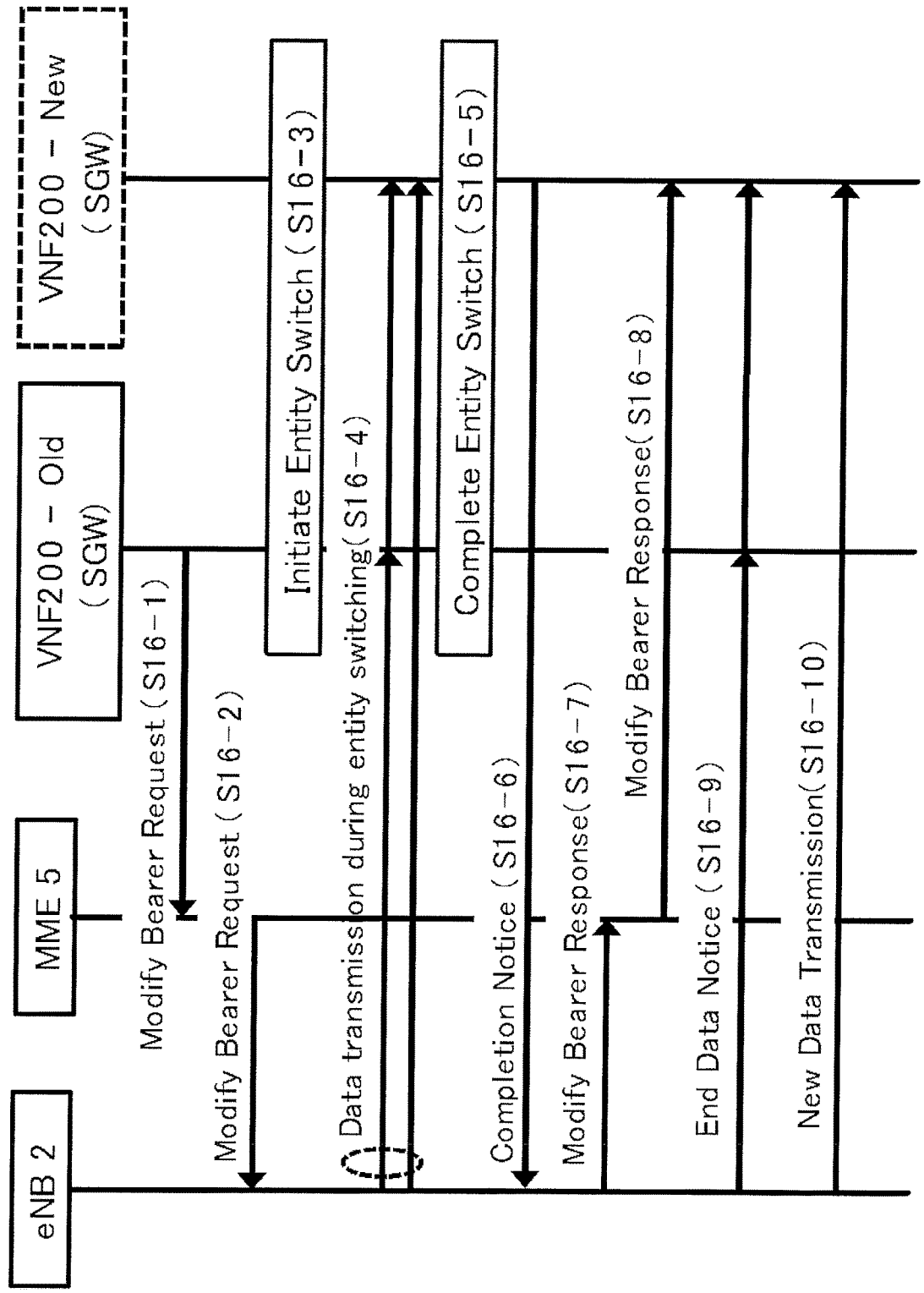
FIG. 37 is a sequence chart showing a fifth example of the fifth operational example of the communication system according to the fifth exemplary embodiment.

FIG. 37 illustrates a sequence between S-GW and MME and eNB in a case where S-GW (VNF 200) operated on a virtual machine is switched.

When a VNF 200 (Old) is switched to a VNF 200 (New), for example, the control function 201 of the VNF 200 (Old) initiates that switchover. In this case, the VNF 200 (Old) notifies the MME 5 of the address of the VNF 200 (New) and a tunnel ID after switchover by using a "Modify Bearer Request" message (Operation S16-1).

The MME 5 forwards the received "Modify Bearer Request" to the eNB 2 (Operation S16-2).

While the switchover between the VNF 200 (Old) and VNF 200 (New) is being performed (Operations S16-3 to S16-5), traffic from the eNB 2 is transmitted via both a path before switchover and a path after switchover (Operation S16-4).

In response to completion of the switchover between the VNF 200 (Old) and VNF 200 (New) (Operation S16-5), the VNF 200 (New) notifies the eNB 2 of a switchover completion notice ("Completion Notice") (Operation S16-6).

The eNB 2 notifies the MME 5 of a response ("Modify Bearer Response") to the "Modify Bearer Request" (Operation S16-7).

The MME 5 forwards the received "Modify Bearer Response" to the VNF 200 (New) after switchover (Operation S16-8).

In response to reception of the "Completion Notice", the eNB 2 notifies "End Data Notice" via the path before switchover (Operation S16-9). For example, in response to reception of the "Completion Notice", the eNB 2 sends a packet indicating session termination (an end marker packet) via the path before switchover.

In response to reception of the "End Data Notice", the VNF 200 (New) switches the path for receiving packets from the path before switchover to the path after switchover and receives new data (Operation S16-10). For example, in response to reception of the end marker packet from the eNB 2, the VNF 200 (New) switches the path for receiving packets from the path before switchover to the path after switchover.

6. SIXTH EXEMPLARY EMBODIMENT

A sixth exemplary embodiment of the present invention will be described with reference to drawings. The technique according to the sixth exemplary embodiment can be also applied to any of the techniques according to the above-described embodiments.

According to the sixth exemplary embodiment, bearers can be switched per group to which a plurality of bearers belong. Since bearers can be switched per group, time required for bearer switchover can be reduced. There is a possibility that some packets are lost when bearers are switched per group. For example, if the bearers are switched before communication via the switchover-source bearers is terminated, packets transmitted via the switchover-source bearers are not forwarded to a switchover-target communication apparatus 10, resulting in possible packet losses.

Accordingly, in the sixth exemplary embodiment, the switchover-target communication apparatus 10 switches bearers per group in response to reception of a notice indicating that communication via the switchover-source bearers has been terminated. With this configuration, when bearers are switched per group, packet loss due to bearer switchover is avoided.

Figure 38:
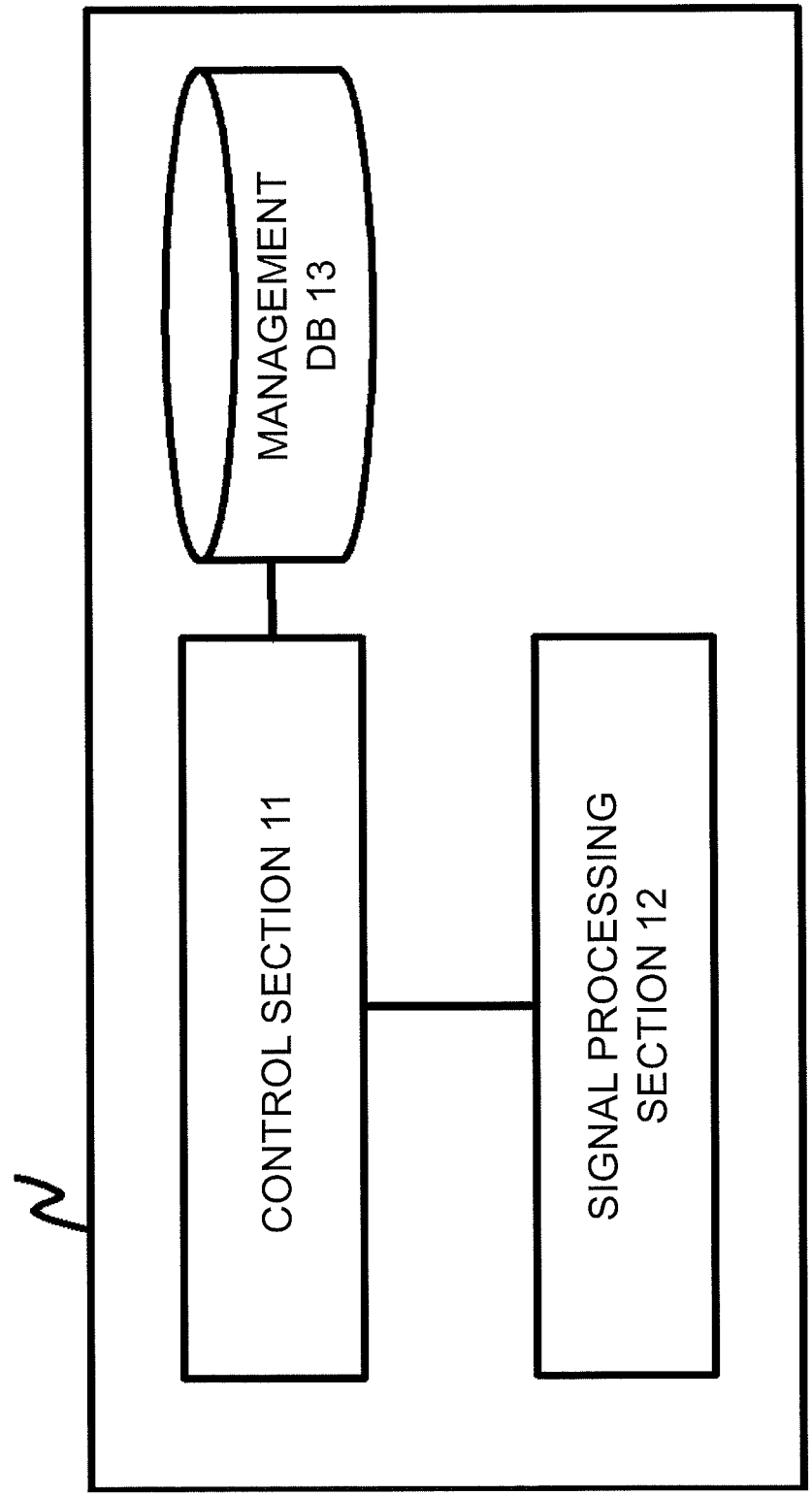
FIG. 38 is a block diagram showing an example of the functional configuration of a communication apparatus 10 according to a sixth exemplary embodiment of the present invention.

FIG. 38 shows an example of the configuration of a communication apparatus 10 according to the sixth exemplary embodiment. The communication apparatus 10 includes a management DB 13 in addition to the configuration examples illustrated in the above-described exemplary embodiments.

The management DB 13 has information about a bearer group which is set based on a bearer-related attribute or the like. Examples of that data are illustrated in FIGS. 41 and 42.

The control section 11 groups a plurality of bearers by referring to the management DB 13. The control section 11 can group a plurality of bearers and switch the bearers per group. For example, in response to reception of a notice indicating that communication via switchover-source bearers has been terminated, the control section 11 refers to the management DB 13 and switches the bearers per group.

In response to initiation of switchover between communication apparatuses 10, the signal processing section 12 performs communication via switchover-source bearers and communication via switchover-target bearers. For example, the signal processing section 12 can send the same data via each of the switchover-source bearers and switchover-target bearers.

In response to completion of the switchover between the communication apparatuses 10, the control section 11 causes the signal processing section 12 to send, via the switchover-source bearers, a notice indicating that the communication via the switchover-source bearers has been terminated. For example, subsequent to the last packet to be sent via the switchover-source bearers, the signal processing section 12 sends an end marker packet (a termination notice packet) indicating the termination of packet forwarding. In response to reception of the termination notice, the switchover-target communication apparatus 10 shifts from an operation for receiving packets via both the switchover-source bearers and switchover-target bearers to an operation for receiving packets via the switchover-target bearers.

Figure 39:
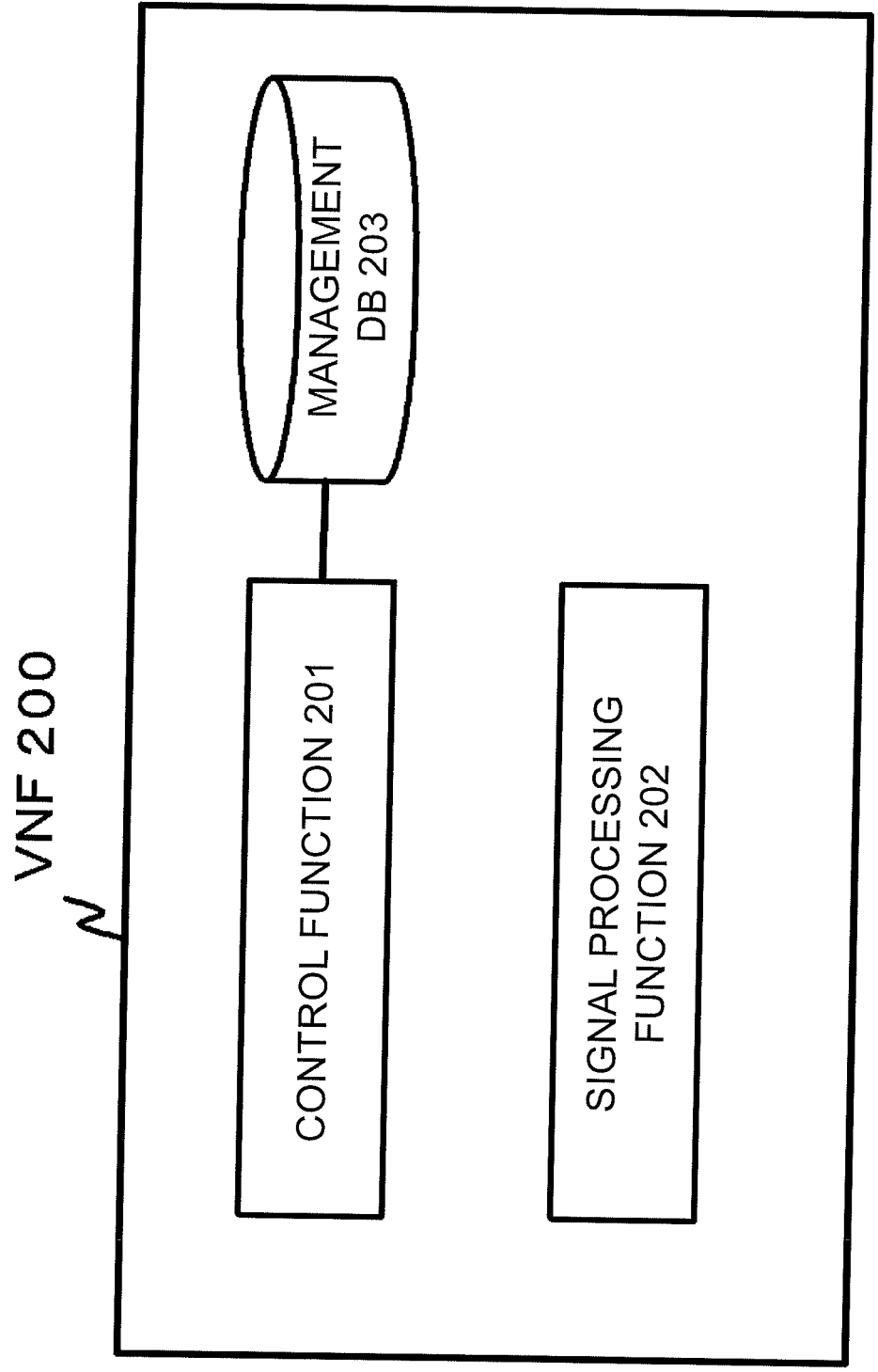
FIG. 39 is a block diagram showing an example of the functional configuration of a VNF 200 according to the sixth exemplary embodiment.

As shown in FIG. 39, in the sixth exemplary embodiment, it is also possible that the network functions provided by each of the plurality of types of communication apparatuses 10 illustrated in FIG. 1 (base station 2, S-GW 3, P-GW 4, and MME 5) are implemented by using software such as virtual machine. That is, a VNF 200 according to the sixth exemplary embodiment includes a management DB 203 in addition to the configuration examples illustrated in the above-described exemplary embodiments. The management DB 203 has a function equivalent to the management DB 13 of the communication apparatus 10.

The communication apparatus 10 can manage bearer groups based on the management DB 13 having information, for example, with the structure illustrated in FIG. 41. In the example of FIG. 41, the communication apparatus 10 groups bearers based on a bearer-related attribute. Examples of the bearer-related attribute are listed below.

Area where terminal 1 is staying (E-UTRAN Cell ID or the like)

Charging method with respect to terminal 1 (normal charging, pre-paid charging, flat rate, or the like)

Communication status of terminal 1 (whether or not it has made a certain amount of communication or more within a certain period of time)

Whether or not terminal 1 is an MTC (Machine Type Communication) device

MTC device group to which terminal 1 belongs

Type of an MTC application for terminal 1 to communicate

Operator ID (the ID of the operator of a core network to which terminal 1 is connected)

Packet Data Network (PDN) to which terminal 1 is connected

QoS characteristic

State of terminal 1 (IDLE state, CONNECTED state): IDLE state means, for example, a state where terminal 1 is not consecutively exchanging control signals for session management and mobility management with a core network, or a state where a wireless connection with a base station is released. CONNECTED state means, for example, a state where terminal 1 is consecutively exchanging control signals for session management and mobility management with a core network, or a state where terminal 1 is wirelessly connected to a base station.

Note that the above-mentioned attributes are listed for illustration, and it is also possible that the communication apparatus 10 groups bearers based on another attribute.

The communication apparatus 10 can group bearers based on UE-related information of the "EPS Bearer Contexts" disclosed in Section 5.7 of standard specifications (3GPP TS23.401).

The communication apparatus 10 can group bearers based on the content of a contract between the user of a terminal 1 and a carrier. For example, it is possible that the communication apparatus 10 groups those bearers associated with users who have made contracts for higher fees (e.g., "Premium Subscribers") than other users with a carrier. Moreover, it is possible that the communication apparatus 10 groups those bearers associated with users under normal contracts.

The communication apparatus 10 can group bearers based on information about the location of a terminal 1 (e.g., GPS information or a base station 2 to which a terminal 1 is attaching). For example, it is possible that the communication apparatus 10 groups bearers associated with terminals 1 in proximity to each other based on the GPS information or information about base stations 2 to which the terminals 1 are attaching.

The communication apparatus 10 can group bearers based on the QoS (Quality of Service) information of each bearer. For example, it is possible that the communication apparatus 10 groups bearers based on a QCI (Quality Class Indicator) corresponding to each bearer. For example, the communication apparatus 10 groups those bearers corresponding to QCIs with lower priorities than a predetermined value and, when a communication apparatus 10 is newly activated, switches the bearers belonging to that group to the newly activated communication apparatus 10. When a bearer is switched to a newly activated communication apparatus 10, it is anticipated that a delay and the like occur in communication related to the bearer due to the switching, resulting in the lowered QoE (Quality of Experience) of a user. Bearers corresponding to QCIs with lower priorities are grouped and the bearers belonging to that group are switched to a newly activated communication apparatus 10 as described above, whereby bearers that could suffer QoE lowering can be limited to the lower-priority bearers.

As an example of the above-described attribute, an MTC (Machine Type Communication)-related attribute will be described. MTC means a form of data communication that does not necessarily require human involvement such as, for example, smart meters and automatic vendor machines. Standardization of MTC is proceeding in technical standard specifications (3GPP TS22.368 and the like). It is conceivable that an MTC device performs communication at a specified time (e.g., "at 12:00 p.m. every day", "at 3:00 a.m. every Friday", or the like). In this case, it is anticipated that a number of MTC devices of the same type (e.g., smart meters) start communication at the same time, causing a large volume of traffic to occur at a specified time. For example, the communication apparatus 10 can switch bearers associated with MTC devices to a communication apparatus 10 that dedicatedly handles such bearers associated with MTC devices. The bearers associated with MTC devices are switched to the communication apparatus 10 dedicated to MTC devices, whereby it is possible to avoid a situation where communication related to the MTC devices degrades the performance of communication related to non-MTC devices.

Note that in case the network functions provided by each of the plurality of types of communication apparatuses 10 are executed by software such virtual machine as shown in FIG. 39, it is also possible that the operator of a communication system operates the communication system so that a virtual machine operating the communication apparatus 10 dedicated to MTC devices will be dynamically activated at a time at which the MTC devices are expected to start communication. Moreover, the operator may operate the communication system so that the virtual machine operating the communication apparatus 10 dedicated to MTC devices will be deleted when the communication of the MTC devices has been completed.

The communication apparatus 10 can also group a plurality of bearers based on CSID (Connection Set Identifier) for identifying a PDN connection group.

The TEID of each bearer may be allocated in such a manner that the respective TEIDs of a plurality of bearers belonging to a group can be collectively identified. For example, a TEID is allocated to each of a plurality of bearers belonging to a group such that the TEIDs, each of which is composed of 32-bit information, will have the same upper 24 bits. By allocating TEIDs in this manner, the communication apparatus 10 can collectively identify a plurality of bearers belonging to a group based on the upper 24-bit information of their TEIDs. For example, as in the example of FIG. 42, the communication apparatus 10 can manage a group of bearers based on a TEID bit mask (the upper 24 bits of a TEID in the example of FIG. 42).

Note that an example of operation in the communication system in a case where the communication apparatus 10 manages a plurality of bearers as a group is similar to the operational examples individually shown in FIGS. 33 to 37, and therefore a detailed description thereof will be omitted.

Figure 40:
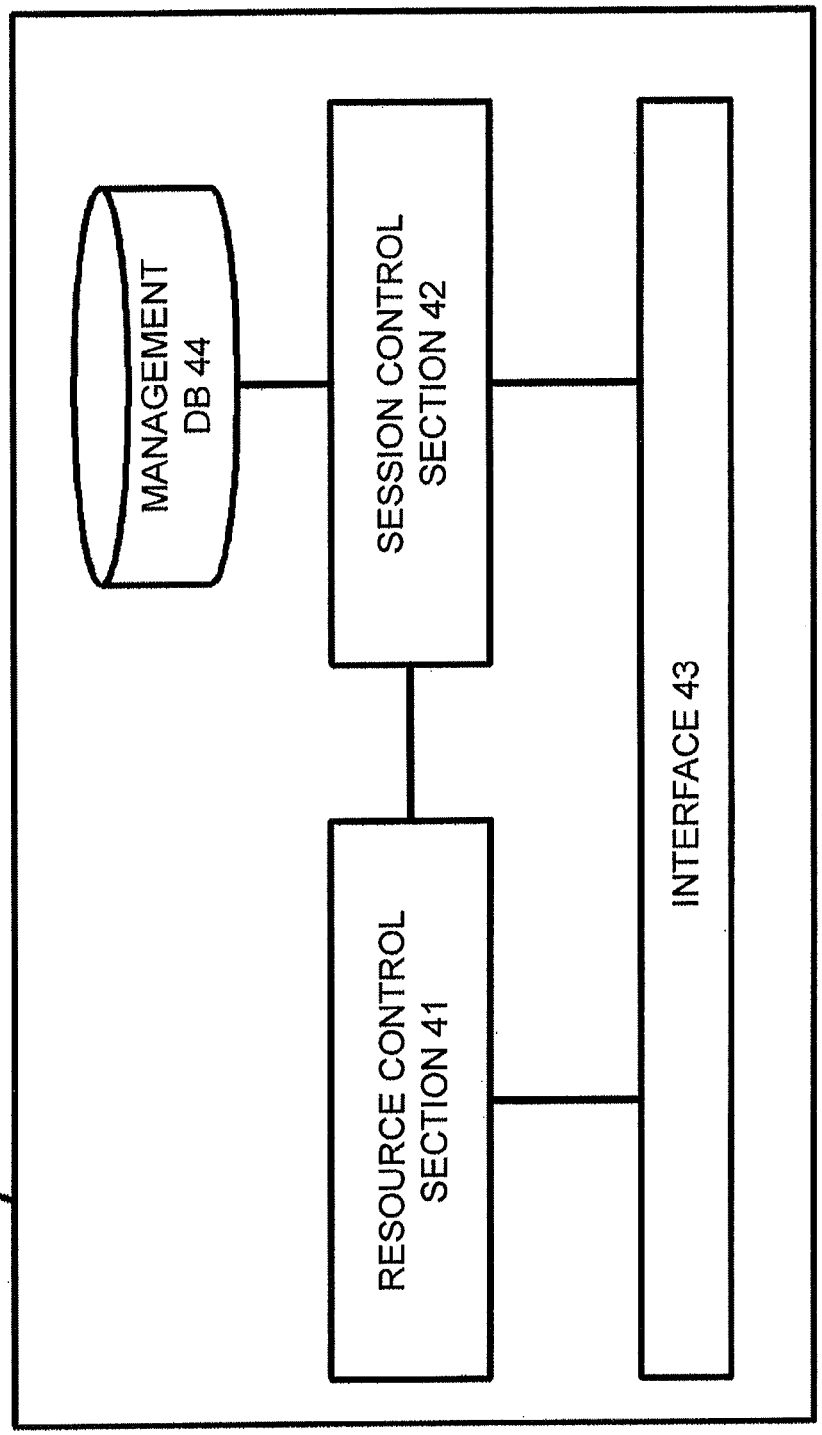
FIG. 40 is a block diagram showing an example of the functional configuration of a control apparatus 40 according to the sixth exemplary embodiment.

As illustrated in FIG. 40, a control apparatus is configured, allowing the control apparatus 40 to also manage a plurality of bearers as a group similarly to the communication apparatus 10. The control apparatus 40 includes a management DB 44 in addition to the configuration examples illustrated in the above-described exemplary embodiments.

For example, the management DB 44 has information with the structure illustrated in FIG. 41 or 42. That is, the management DB 44 has information about a bearer group that is configured based on a bearer-related attribute as described above or the like.

The resource control section 41 controls switchover from a communication apparatus 10(A) to a communication apparatus 10(B), as described in the above-described fourth exemplary embodiment.

For example, the session control section 42 controls bearer switchover by referring to the management DB 44. For example, the session control section 42 can decide on a bearer group to allocate to the relocation-target communication apparatus 10 by referring to the management DB 44. The session control section 42 allocates a bearer group based on an attribute as described above to the switchover-target communication apparatus 10. For example, the session control section 42 allocates a plurality of bearers having the same QoS characteristic to the switchover-target communication apparatus 10. Moreover, for example, the session control section 42 allocates a plurality of bearers related to the same MTC device group to the switchover-target communication apparatus 10.

The session control section 42 can instruct a communication apparatus 10 to switch bearers belonging to a group. The control section 11 of the communication apparatus 10, in response to the switchover instruction, switches the plurality of bearers belonging to the group. For example, the session control section 42 instructs the switchover-source communication apparatus 10 to switch the plurality of bearers belonging to the group. For example, the session control section 42 notifies the switchover-source communication apparatus 10 of information including an attribute corresponding to the group (e.g., a QCI value, a TEID bit mask, an MTC device group, or the like). The control section 11 of the switchover-source communication apparatus 10 switches the bearers corresponding to the notified information to the switchover-target communication apparatus 10. Note that the session control section 42 may instruct the switchover-target communication apparatus 10 to switch the bearers belonging to the group.

Note that an example of operation in the communication system in a case where the control apparatus 40 manages a plurality of bearers as a group is similar to the examples of operation individually shown in FIGS. 22 to 24, and therefore a detailed description thereof will be omitted.

As described above, according to the sixth exemplary embodiment of the present invention, the switchover-target communication apparatus 10 switches bearers per group in response to reception of a notice indicating that communication via the switchover-source bearers has been terminated. With this configuration, even if bearers are switched over per group, packet loss due to bearer switchover can be avoided.

Exemplary embodiments of the present invention have been described hereinabove. However, the present invention is not limited to each of the above-described embodiments. The present invention can be implemented based on a modification of, a substitution of, and/or an adjustment to each exemplary embodiment. Moreover, the present invention can be also implemented by combining any of the exemplary embodiments. That is, the present invention incorporates the entire disclosure of this description, and any types of modifications and adjustments thereof that can be implemented based on technical ideas. Furthermore, the present invention can be also applied to the technical field of SDN (Software-Defined Network).

REFERENCE SIGNS LIST

1 Terminal
2 Base station
3 S-GW
4 P-GW
5 MME
10, 10(A), 10(B) Communication apparatus
11 Control section
12 Signal processing section
13 Management DB
20 Communication apparatus
30 Packet forwarding apparatus
31 Management DB
32 Packet processing section
33 Control section
40 Control apparatus
41 Resource control section
42 Session control section
43 Interface
200 Virtual network function (VNF)
201 Control function
202 Signal processing function
210 Control section
2100 VM control section
2101 Session control section
2102 Virtual switch

The invention claimed is:

1. A communication apparatus comprising:
a virtual machine controller that controls virtual machines including a first virtual machine and a second virtual machine;
a first network node operating on the first virtual machine; and
a second network node operating on the second virtual machine,
wherein the first network node communicates with a third network node via a first communication session;
the first network node and the second network node initiate a switchover of communication with the third network node from the first network node to the second network node;
in response to completion of the switchover, the first network node receives, from the third network node, a control signal indicating termination of communication via the first communication session; and
the first network node forwards the control signal to the second network node,
wherein the second network node communicates with the third network node via a second communication session in response to reception of the control signal indicating the termination of communication via the first communication session.

2. The communication apparatus according to claim 1, wherein the first network node forwards a packet including the control signal to the second network node.

3. The communication apparatus according to claim 1, wherein data related to a terminal, is forwarded from the third network node to the first network node via the first communication session and to the second network node via the second communication session established with the second network node in response to initiation of the switchover from the first network node to the second network node.

4. The communication apparatus according to claim 1, wherein the third network node comprises:
a signal processor that processes data related to a terminal; and
a controller that is configured to:
establish the first communication session and the second communication session; and
send the control signal which includes control information indicating termination of communication via the first communication session, after completion of the switchover, to the second network node via the first network node.

5. A communication method comprising:
controlling, by a virtual machine controller, virtual machines including a first virtual machine and a second virtual machine;
operating a first network node on the first virtual machine;
operating a second network node on the second virtual machine;
communicating, by the first network node, with a third network node via a first communication session;
initiating, by the first network node and the second network node, a switchover of communication with the third network node from the first network node to the second network node;
receiving, by the first network node from the third network node and in response to completion of the switchover, a control signal indicating termination of communication via the first communication session; and
forwarding, by the first network node, the control signal to the second network node,
wherein the second network node communicates with the third network node via a second communication session in response to reception of the control signal indicating the termination of communication via the first communication session.

6. The communication method according to claim 5, further comprising:
establishing, by the third network node, the first communication session and the second communication session; and
sending, by the third network node, the control signal which includes control information indicating termination of communication via the first communication session, after completion of the switchover, to the second network node via the first network node.

7. A non-transitory recording medium storing a program causing a computer to execute the method according to claim 5.

8. A non-transitory recording medium storing a program causing a computer to execute the method according to claim 6.

* * * * *